(12) United States Patent
Rowell et al.

(10) Patent No.: US 10,602,126 B2
(45) Date of Patent: Mar. 24, 2020

(54) DIGITAL CAMERA DEVICE FOR 3D IMAGING

(71) Applicant: Lucid VR, Inc., Santa Clara, CA (US)

(72) Inventors: Adam Rowell, Mountain View, CA (US); Sheldon Fernandes, San Jose, CA (US); Han Jin, Milpitas, CA (US)

( * ) Notice: Subject to any disclaimer, the term of this patent is extended or adjusted under 35 U.S.C. 154(b) by 0 days.

(21) Appl. No.: 16/283,684

(22) Filed: Feb. 22, 2019

(65) Prior Publication Data
US 2019/0208181 A1 Jul. 4, 2019

Related U.S. Application Data

(60) Continuation-in-part of application No. 16/254,542, filed on Jan. 22, 2019, which is a continuation-in-part
(Continued)

(51) Int. Cl.
*H04N 13/246* (2018.01)
*H04N 5/232* (2006.01)
*G06T 7/80* (2017.01)
*H04N 9/82* (2006.01)
*H04N 5/77* (2006.01)
*H04N 13/117* (2018.01)
*H04N 9/87* (2006.01)
*H04N 13/239* (2018.01)
(Continued)

(52) U.S. Cl.
CPC ............. *H04N 13/246* (2018.05); *G06T 7/85* (2017.01); *H04N 5/23238* (2013.01); *H04N 5/23267* (2013.01); *H04N 5/772* (2013.01); *H04N 5/907* (2013.01); *H04N 9/8205* (2013.01); *H04N 9/8227* (2013.01); *H04N 9/8715* (2013.01); *H04N 13/111* (2018.05); *H04N 13/117* (2018.05); *H04N 13/122* (2018.05); *H04N 13/178* (2018.05); *H04N 13/189* (2018.05); *H04N 13/239* (2018.05); *H04N 13/296* (2018.05); *H04N 2013/0081* (2013.01)

(58) Field of Classification Search
None
See application file for complete search history.

(56) References Cited

U.S. PATENT DOCUMENTS 9,338,447 B1 *  5/2016  Crump .................... G06T 7/80
9,939,381 B1 *  4/2018  Kimmel ............ G01N 21/6458
(Continued)

OTHER PUBLICATIONS

NPL Internet Search log; 2019. (Year: 2019).*
Dual Dynamic PTZ Tracking Using Cooperating Cameras; Eslami; 2015. (Year: 2015).*

*Primary Examiner* — Luis Perez-Fuentes

(57) ABSTRACT

Described are digital camera devices for 3D Imaging. Embodiments of the invention capture and process sensory data including image data to produce 3D content and generate depth information. Digital camera devices improve upon existing camera devices by implementing dynamic calibration processes that improve the quality of image capture and image projection. In some embodiments the digital camera devices include an imaging system for performing computer vision tasks including scene reconstruction, event detection, video tracking, object recognition, 3D pose estimation, learning, indexing, motion estimation, object tracking, facial recognition, object counting, 3D imaging, image enhancement and image restoration.

20 Claims, 12 Drawing Sheets

Related U.S. Application Data of application No. 16/166,018, filed on Oct. 19, 2018, which is a continuation-in-part of application No. 15/920,160, filed on Mar. 13, 2018, which is a division of application No. 15/179,056, filed on Jun. 10, 2016, now Pat. No. 9,948,919.

(51) Int. Cl.

| | | |
|---|---|---|
| *H04N 13/296* | (2018.01) | |
| *H04N 13/178* | (2018.01) | |
| *H04N 13/189* | (2018.01) | |
| *H04N 5/907* | (2006.01) | |
| *H04N 13/122* | (2018.01) | |
| *H04N 13/111* | (2018.01) | |
| *H04N 13/00* | (2018.01) | |

(56) References Cited

U.S. PATENT DOCUMENTS

| | | | |
|---|---|---|---|
| 2003/0210329 A1* | 11/2003 | Aagaard | H04N 7/181 348/159 |
| 2010/0111489 A1* | 5/2010 | Presler | H04N 5/225 386/278 |
| 2019/0208181 A1* | 7/2019 | Rowell | G06T 7/85 |

\* cited by examiner

DIGITAL CAMERA DEVICE FOR 3D IMAGING

CROSS REFERENCE TO RELATED APPLICATIONS

This application is a continuation in part of U.S. patent application Ser. No. 16/254,542 entitled "REAL TIME RE-CALIBRATION OF STEREO CAMERAS" filed Jan. 22, 2019, which is a continuation in part of U.S. patent application Ser. No. 16/166,018 entitled "3D CAMERA CALIBRATION FOR ADJUSTABLE CAMERA SETTINGS" filed Oct. 19, 2018, which is a continuation in part of U.S. patent application Ser. No. 15/920,160 entitled "STEREOSCOPIC 3D CAMERA FOR VIRTUAL REALITY EXPERIENCE," filed Mar. 13, 2018, which is a divisional application of U.S. patent application Ser. No. 15/179,056 entitled "STEREOSCOPIC 3D CAMERA FOR VIRTUAL REALITY EXPERIENCE," filed Jun. 10, 2016; all of which are incorporated by reference herein in their entirety.

BACKGROUND

Computer vision (CV) is a technical discipline that allows computers, electronic machines, and connected devices to gain high-level understanding from digital images or videos. Typical CV tasks include scene reconstruction, event detection, video tracking, object recognition, 3D pose estimation, learning, indexing, motion estimation, object tracking, facial recognition, object counting, 3D imaging, image enhancement and image restoration. 3D imaging is the process of capturing the shape and appearance of real objects. Digital camera devices for capturing 3D content are devices that can concurrently capture image data and depth information associated with the image data. To display 3D content, these systems then perform 3D reconstruction post capture by combining of image data and depth information.

Stereo camera systems are one subset of digital camera devices for capturing 3D content. Stereo camera systems capture image data and depth information simultaneously by capturing right and left stereo views of a scene. To perform 3D imaging, depth information contained in the stereo images is extracted post capture by mapping the disparity between the right and left stereo views. In stereo vision, large disparity between right and left stereo views is associated with near objects, while objects that are further away from the capturing device are closer to the zero disparity plane and therefore have smaller disparity values. Rendering image data with its corresponding depth information generates 3D content wherein every pixel contains the distance to a point in the imaged scene.

Other digital camera devices may leverage monocular techniques for generating 3D content. Monocular systems may capture image data from one camera module and depth information from a discrete depth sensor, for example, a time of flight sensor, dot field projector, or LIDAR system. Post capture, 3D a monocular system generates 3D content by associating image data with its corresponding depth information provided by the discrete depth sensor. Stereo camera systems may also incorporate a discrete depth sensor to improve the efficiency, accuracy, precision or depth information and/or reduce the processing power, time requirements, or power consumption needed to generate depth information. Machine learning models and artificial intelligence may also be used to provide or enhance image data, depth information, or both.

Applications of 3D imaging and computer generated depth are expanding to a wide variety of critically important fields including construction, medicine, manufacturing entertainment, research, retail, security, and transportation. These applications often require devices that are portable, cheap, and capable of performing 3D imaging and calculating depth information in real time in a variety of capture conditions with low power consumption and limited processing resources. To generate accurate depth information, current 3D capture solutions typically require emissions based methods of depth detection (e.g., LIDAR, dot filed projection, and time of flight sensors). These techniques add considerable cost, increase power consumption, and require more complex processing than stereoscopic capture methods of 3D imaging.

Thus, there is a need in the field of CV to create new and useful devices for capturing 3D images and generating depth information that primarily leverage image sensors. The embodiments of the present application provide a novel digital camera device for 3D imaging that improves upon existing systems to deliver such new and useful methods for 3D image capture and depth generation.

DETAILED DESCRIPTION

Figure 1:
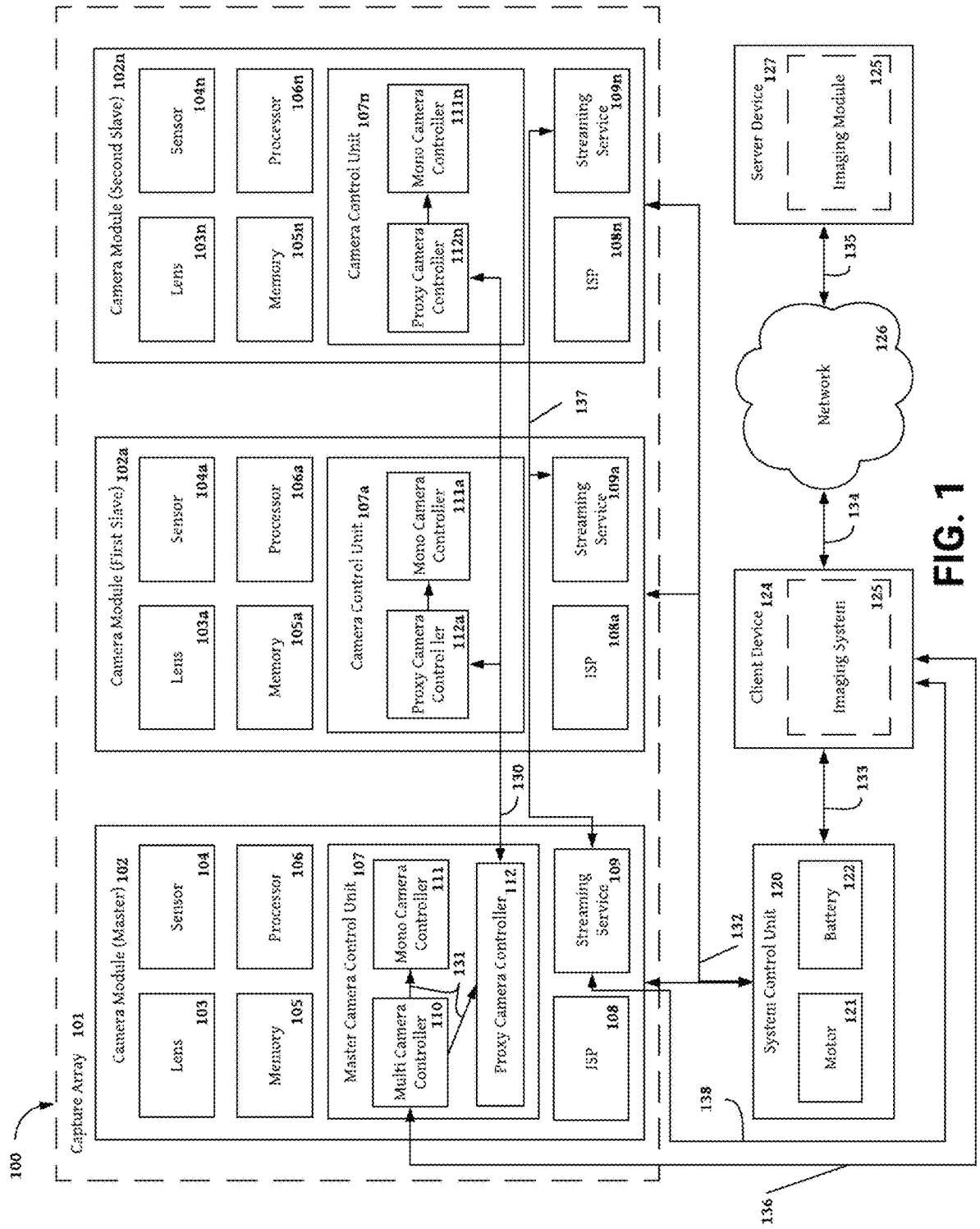
FIG. 1 is a block diagram showing components a digital camera device that generates 3D content and dynamic calibration metadata.

The present invention comprises a digital camera device for 3D imaging and computer generated depth. Methods implemented on the digital camera apparatus are also described herein, for example, processes producing 3D images and depth information, methods of synchronizing one or more image sensors, method of synchronizing one or more image sensors with one or more other discrete non-image sensors, sensor calibration methods, processes identifying and correcting calibration errors, and methods for controlling the apparatus and/or sensor subassemblies.

In one embodiment, the digital camera device described herein improves upon conventional depth cameras by offering a pure image based system for generating depth information and 3D content. The digital camera device also improves the quality of 3D content by improving camera calibration through performance of lens distortion correction, real time re-calibration of camera modules, and interpolation of calibration metadata for camera settings not associated with an initial calibration point. The digital camera device also reduces the time required for initial calibration of digital camera devices by reducing the number of calibration points needed for initial calibration and modifying the initial calibration metadata over time to account for changes in the positions and/or performance of one or more camera modules. The combination of more accurate, precise, and efficient calibration and machine learning based approaches for calculating depth allows the digital camera device to generate more accurate depth information with less processing power, time requirements, and power consumption.

The efficient computer generated depth solution provided by the digital camera device described herein is rapidly scalable and may be easily implemented in small, mobile electronics including smartphones, smart watches and other wearable electronics, and internet of things devices. Despite the processing and power efficiency, the camera calibration, image rectification, and depth generation solutions provided by the digital camera device are powerful enough to process high resolution images and video sequences captured by processional camera devices and displayed on high resolution displays. The digital camera device produces precise, accurate, and reliable depth information to provide a cheaper alternative to emissions based depth sensing methods for autonomous driving and/or driver assist applications. Other downstream applications that may use depth information generated by the digital camera device include solutions for object tracking, facial recognition, object classification, gesture tracking and control, object counting, 2D to 3D conversions, 3D scanning, simultaneous localization and mapping (SLAM), etc.

Successful capture and generation of 3D content and depth information requires precise and accurate calibration of camera modules and other sensors used in the digital camera device. In stereo camera, multi-camera, and multi-sensor embodiments, high quality camera calibration produces one or more pairs of rectified image frames and/or video channels. Conducting disparity analysis on rectified image frames produces high quality disparity maps capable of producing accurate depth information. Without proper camera calibration and rectification, the accuracy of depth information is severely compromised by inaccurate, and imprecise disparity maps. The digital camera device cannot function properly without effective calibration and rectification techniques because accurate depth information is an essential component of delivering output of every digital camera device embodiment including 3D content generation, scene reconstruction, event detection, video tracking, object recognition, 3D pose estimation, motion estimation, object tracking, facial recognition, object counting, and 3D scanning.

Calibration of cameras and other optical sensors included in the digital camera device is difficult. Calibration is extremely sensitive so small manufacturing variations between cameras and slight shifts in the position of one or more camera components (e.g., lenses or image sensors) during the life of the system can destroy spoil calibration. Calibration is also computationally complex and involves calculating numerous intrinsic parameters for each camera, then computing the relative extrinsic parameters between each pair of cameras. In multi-camera systems having more than one stereo camera, calibration is more complex because each camera module may have more then one stereo camera pair therefore may need to have more than one set of extrinsic calibration parameters. Post calibration, rectification requires additional processing to generate rectification matrices and projection matrices from the intrinsic and extrinsic calibration parameters. Rectification matrices describe how to orient the image planes of the right and left stereo image channels on the same image plane. Projection matrices align the right and left image channels vertically and/or horizontally to ensure images produced by the stereo camera satisfy an epipolar geometry, the geometry of stereo vision.

Traditionally, camera calibration is performed in a factory using dedicated calibration equipment (e.g., a calibration station and fabricated calibration target). Once a device is calibrated, a static calibration file including calibration metadata describing a calibrated camera position is loaded into memory and serves as the only calibration reference for the device throughout it's entire lifespan. This model of static calibration files and specialized factory calibration is a poor fit for mobile device implementations of the digital camera device (e.g., smart phones, wearable electronics, and IOT devices). Mobile electronics are used frequently and constantly open to the environment. In most examples, due to the precision of sensitively of proper calibration, the effect a month or less of normal wear and tear on a camera module is enough to spoil calibration. The calibration systems implemented in the digital camera device are built for the next generation of mobile devices because they run continuously run throughout the life of the device and adjust calibration parameters based on actual captured image data. By transforming camera calibration from a static to a dynamic process, the digital camera device described herein provides more accurate calibration, extends the usable life of camera devices, and customizes calibration parameters based on the capture conditions and camera settings used most frequently. By improving camera calibration and image rectification the digital camera device described herein captures higher quality images and video content and generates more accurate depth information.

Digital Camera Device

Example embodiments of the digital camera device are disclosed herein. In some examples, the digital camera device is implemented as a discrete camera for capturing and displaying 3D content. Other embodiments of the digital camera device are implemented in a smart phone, laptop computer, or other mobile electronics devices including smart watches and other wearable electronics and internet of things devices, for example, an imaging module included in a self driving car, robot, digital sign, appliance, security camera, or other home or industrial electronic device.

The digital camera device may be used as a discrete imaging device for capturing and generating images and video content including stereoscopic images and stereoscopic video, dual side by side images and video streams, 3D images and video streams formatted for playback on a flat display screen, 3D images and video streams formatted for playback on a 3D display screen, 3D images and video streams formatted for playback on a head mounted display (HMD) or other motion activated display, 180 degree field of view (FOV) VR or AR content, 360 degree FOV VR or AR content, and high resolution 2D or 3D images and video streams including full HD, 8K ultra HD, 720p, 1080p, 1080i, and 4320p content. Video steams streams captured by the digital camera device may be formatted for streaming using a streaming protocol (e.g., Adobe RTMP, RTSP/RTP, MPEG-TS, ICY, or SHOUTcast/Icecast). Video streams generated by the digital camera may be encoded in a MP4, H.265/HEVC, H.264/AVC, VP9, VP8, MPEG4 Part 2, or MPEG2 file or stream or any other streaming format.

Other embodiments of the digital camera device may be used as a depth sensing devices for capturing and generating depth information. Post generation, depth information may be provided to one or more downstream applications for additional processing. Depth information may include depth maps, disparity maps, distance measurements, image shifts, pixel shifts, and image plane convergence distances generated using computer vision or machine learning techniques. Example computer vision techniques include point cloud analysis, block matching algorithms, and surface matching algorithms, and bokeh processing. Example machine learning techniques include machine learning models for generating ground truth, disparity maps, depth maps, and other depth information using rules based classification algorithms, neural networks, and deep learning methods for example Naïve Bayes classification, decision tree classification, convolutional neural networks (CNNs), convolutional recurrent neural networks (CRNNs), hierarchical recurrent convolutional neural networks (HRNN), and HRNNs with attention vectors implemented in a machine learning framework (e.g., Keras, Scikitlearn, MXNet, or Tensorflow).

The digital camera devices described herein may include an imaging system having a plurality of systems implementing a set of processes, routines, and or algorithms for processing the video data captured by the camera array. The set of processes, routines, and/or algorithms are stored on a non-transitory memory and executed by one or more processors to perform one or more functions of the digital camera device (e.g., image signal processing, content capture, image rectification, image enhancement, for example, color correction, color smoothing, texture smoothing, or occlusion zone resolution, camera calibration, calibration correction, camera configuration, camera setting configuration, image or video encoding, image or video streaming, image or video compression, 3D content creation, content rendering, for example, rendering 3D video sequences by converting input across multiple camera modules into a single stream of 3D video (e.g., a single compressed stream of 3D video data), or stitching video data and/or depth information from multiple cameras into two large-format, panoramic video streams for left and right eye viewing.

Embodiments of the digital camera device may include a sensor section comprising one or more modular sensors oriented in different geometric arrangements (e.g., sphere, circle, square, rectangle, triangle, pyramid, etc.) with their sensing components having different orientations within a given geometric arrangement to ensure the sensing components capture different portions of an area or scene of interest. The digital camera device includes embodiments having only image sensors as well as embodiments that combine multiple sensor types. Example sensors that may be incorporated in the digital camera device include camera may include special sensors (e.g., inertial measurement units, gyroscopes, accelerometers, other motion sensors, altimeters, and magnetometers); acoustic sensors (e.g., microphones and transducers); optical sensors (e.g., structured light capture cameras, stereoscopic capture cameras, photometric capture cameras, modulated light capture cameras, visible light sensors (e.g., RGB cameras), ultraviolet (UV) cameras, near infrared cameras, infrared cameras, ambient light sensors, time of flight (TOF) sensors, and optical emitters); touch sensors (e.g., force sensors, capacitive touch sensors, resistive touch sensors, and thermal touch sensors); location sensors (e.g., GPS systems, beacons, trilateration systems, and triangulation systems); and emissions based sensors (e.g., lidar systems, dot field projectors, vertical cavity surface-emitting laser sensors and CMOS laser sensors).

Embodiments of the digital camera device may include a discrete camera device having multiple cameras for capturing 3D content. One preferred embodiment includes a stereo camera system having two Sony FCB-ER8550 or FCB-CR8550/8530 CMOS sensor color camera modules mounted with the lenses perpendicular to each other behind a beam splitter. In one example, the beam splitter is a fifty percent mirror allowing half of the captured light to pass straight through the mirror and reach a first camera module mounted directly behind an aperture. The beam splitter reflects the remaining fifty percent of the captured light toward the lens of a second camera module mounted perpendicular to the first camera module. In one preferred example, the second camera module is movably mounted above the first camera module. The second camera module can move longitudinally relative to the first camera module to adjust the baseline (i.e., the interocular distance) between the two camera modules. Adjusting the baseline changes the view disparity between the two modules thereby providing a mechanism for changing the perceived distance between the foreground and the background elements of a scene. Images and video content captured with more higher baseline values (i.e., a greater interocular distance between the two stereo cameras) have a greater perceived 3D effect compared to content captured with lower baseline values because of the increased depth between near and far objects.

To adjust the baseline camera setting, camera modules in other discrete camera device embodiments may move along one or more vertical, horizontal, diagonal, lateral, or rotational axes. Additionally, each camera module included in the digital camera device may move on a different axis to provide additional ways of adjusting baseline device. As shown in the example embodiment in FIG. 5, one camera module may move along a longitudinal axis ("B1") with the second module moving along a separate diagonal axis ("B2"). In these examples, baseline may be adjusted by moving the first camera module, the second camera module, or both. Other camera camera settings including zoom focus, baseline, aspect ratio, relative camera rotation, aperture, resolution, white balance, shutter, iris, stabilizer, and gain may are also variable on camera modules included in the digital camera device. Adjustments to the position of one or more camera modules and or camera module components may be made in order to change one or more of these camera settings.

In digital camera devices comprising more than two camera modules, the camera modules can be positioned to have a sufficient filed of view overlap so that all aspects of a scene can be seen by more than one point of view. In this arrangement, images captured by two or more cameras can be combined and otherwise processed to correct exposure or color deficiencies, calculate depth information from view disparity using computer vision, machine learning, or hybrid CV/ML implementations, perform stereoscopic reconstruction, and perform multi-camera high-dynamic range (HDR) imaging using an alternating mosaic pattern of under- and over-exposure across a selection of camera modules.

Camera modules in multi-camera systems may be positioned proximate to one or more of the sensors mentioned above to augment or enhance perception of the captured scene area. For example, an audio sensor may be positioned proximate to each camera module to capture sounds information local to a captured scene area, thereby allowing for more realistic audio during playback of video content. To enhance stereo generated depth, provide a confidence metric or accuracy check for stereo generated depth information, or measure performance of stereoscopic depth generation techniques, a depth sensor may be positioned proximate to each camera module. A system control unit or synchronizing communications protocol may be used to synchronize capture the capture time and camera settings used by each of sensor deployed by the digital camera device to capture a scene. In one example the synchronizing communications protocol is a camera control command protocol that drives one or more motors to synchronously move one or more camera modules included in the digital camera device. The camera control command protocol may synchronize the iris, zoom, and focus settings on each camera module involved in capture by performing a motor calibration on each motor driving a camera module, receiving a first status communication signaling each camera motor is calibrated, sending an message to a system control unit causing the system control unit to generate an electrical signal driving the motor to move the camera module and/or camera module components to a position having the desired camera settings, and receiving a second status communication verifying the camera module has the desired camera settings.

Sensors included in embodiments of digital camera device may be disposed inside a box having a central cavity and an external case made of a plastic and/or metallic material. The external case may be made of a material specifically desired to dissipate heat generated by electrical components during use of the digital camera device. One or more sensors or other electrical components may be wrapped in a thermal dissipation material such as a tape or wrapping. The central cavity may also include a lining composed of a heat dissipation material. In some embodiments, the outer case may include one or more openings for one or more fans disposed inside the digital camera device to blow hot air away from the electrical components and outside of the central cavity. The central cavity may also include tubes carrying cold water and or gases. The tubes may be routed proximate to one or more electrical components to further assist with heat dissipation.

Figure 2:
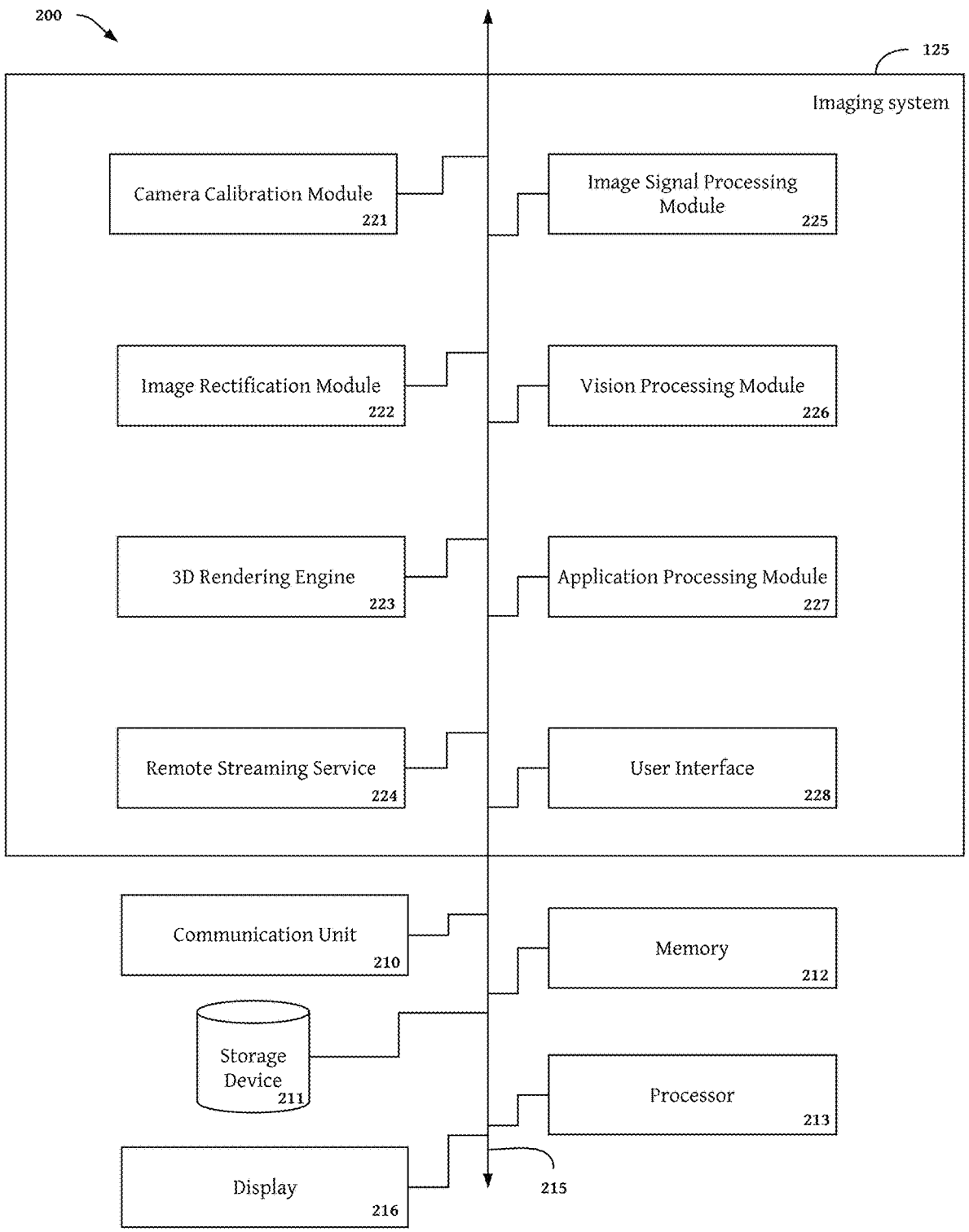
FIG. 2 is a block diagram showing various components of an imaging system.

With reference to FIGS. 1-2, non-limiting example embodiments of the digital camera device and the image module included in the system are described below. FIG. 1 provides and overview of one digital camera embodiments. Other embodiments may add, omit, and/or change the orientation or one or more components. The digital camera device 100 includes an image section 101 having a master camera module 102 and a plurality of slave camera modules 102a, 102n. The position of the camera modules and sensor components (e.g., lens and sensors included in the modules) are controlled by a system control unit 120 including a motor 121 and a battery 122. Images and video sequences produced by the camera modules are provided to a client device 124 including an imaging system 125 having a plurality of systems performing image processing tasks that delivery the functionality of the digital camera device. Content, depth information, and other data generated by—or provided to— the client device 124 may be shared with a server device 127 having an imaging system 125 over a network 126. The imaging system 125 of the server device 127 may perform additional processing on content, depth information, and data received from the client device 124. Additionally, the server device 127 may include instructions for distributing content, depth information, and other data to a plurality of client devices, for example, to share 3D video content or provide depth information to a discrete depth application or image processing device separate from the digital camera device.

The client device 124 may be a processor-based computing device. For example, the client device 124 may be a personal computer, laptop, tablet computing device, smartphone, set top box, network-enabled television or any other processor based computing device. The server device 127 may be a hardware server that includes a processor, a memory, and network communication capabilities.

The network 126 may be a conventional type, wired or wireless, and may have numerous different configurations including a star configuration, token ring configuration or other configurations. Furthermore, the network 126 may include a local area network (LAN), a wide area network (WAN) (e.g., the Internet), or other interconnected data paths across which multiple devices may communicate. In some embodiments, the network 126 may be a peer-to-peer network. The network 126 may also be coupled to or include portions of a telecommunications network for sending data in a variety of different communication protocols. In some embodiments, the network 126 may include Bluetooth communication networks or a cellular communications network for sending and receiving data including via short messaging service (SMS), multimedia messaging service (MMS), hypertext transfer protocol (HTTP), direct data connection, WAP, email, etc.

The master camera module 102 includes a lens 103, a sensor 104, memory 105, one or more processors 106, a master camera control unit 107, an master image signal processor (ISP) 108, and a master streaming service 109. The master camera control unit connects the master camera module 102 to a plurality of slave camera modules 102a-102n allowing the master camera module to control the plurality of camera modules 102a-102n using a multi camera controller 110 and a master proxy camera controller 112. In the example shown in FIG. 1, each camera module included in the plurality of camera modules includes a lens 103a, 103n; sensor 104a, 104n; memory 105a, 105n; processor 106a, 106n; camera control unit 107a, 107n; ISP 108a, 108n; and a slave streaming service 109a, 109n. The slave camera control unit included in each slave camera module included in the plurality of camera modules comprises a proxy camera controller 112a, 112n receiving instructions from the master proxy camera controller 112 and a mono camera controller 111a, 111n for modifying one or more camera settings or camera component positions in response to instructions received by the proxy camera controller 112a, 112n.

Connection links 130-138 connect the components of the digital camera device by carrying messages and signals between the components of the digital camera device. The digital camera device described herein may include three types of communication mechanisms, including a first communication mechanism for data communication between the different camera modules (e.g., a bus for communication between the different camera modules), a second communication mechanism for data communications between the camera modules and the imaging system, networks, and other systems and components connected to the digital camera device (e.g., a bus for communication between the camera modules and other internal or external connected systems or components), and a third communication mechanism for centrally controlling the operation of the camera modules (e.g., a control bus for controlling operations of the camera modules). Connection links 130-138 may represent a wired connection (e.g., a USB cable, an Ethernet cable, a HDMI cable, a RCA cable, Firewire, CameraLink, Thunderbolt or custom bus to transmit image data) or a wireless connection (e.g., wireless fidelity (Wi-Fi), Bluetooth, etc.).

The lens 103 may be an optical device capable of transmitting and refracting lights and converging or diverging a beam of light. For example, the lens 103 may be a camera lens. The camera modules may have one or more lenses configured to manipulate light passing through the aperture bound for the image sensor 104. The lens shape may be spherical, aspheric, double aspheric, or some combination. Additionally, the lens 103 may be a telephoto, standard angle, wide angle, ultra wide-angle (e.g., fish-eye lenses that capture 3d images and videos with a wide field of view), or some combination. Additionally, more than one lens 103 may be included in each camera module. Lenses included in the plurality of camera modules may have unique specifications (e.g., focal lengths, distortion centers, skew coefficients, and distortion coefficients). The specifications for each of the lens is typically determined by a calibration process.

The sensor 104 may be any device that senses physical changes. For example, the sensor may be an image sensor that receives left passing through the lens 103. The image sensor captures light and converts the captured light into an electrical signal. Example image sensors include, but are not limited to, semiconductor charge-coupled devices (CCD), active pixel sensors in complementary metal-oxide-semiconductor (CMOS), and N-type metal-oxide-semiconductor (NMOS, Live MOS), etc. In one example the CMOS sensor is a Sony 1/2.5 type "Exmor R" sensor with approximately 8.51 million effective pixels. The Exmor R sensor is capable of 4K (3840×2160) output at 60 frames per second in ADC 10-bit mode or 30 frames per second in ADC 12-bit mode. The digital overlap-type (DOL) high dynamic range (HDR) function of the Exmor R is supported at 30 frames per second and the aspect ratio is 16:9. Each of the image sensors included in the plurality of camera modules may have unique specifications (e.g., sensor size, resolution, frame rate, etc.). These specifications are typically determined through a calibration process.

The sensor 104 may also include a depth sensor. In some embodiments, the depth sensor determines depth using structured light, such as a speckle pattern of infrared laser light. For example, the depth sensor may include the PrimeSense depth sensor. In another embodiment, the depth sensor determines depth using or time-of-flight technology that determines depth based on the time it takes a light signal to travel between the camera and a subject. The depth sensor may be used to determine a depth map, object distance, or other depth information.

The sensor 104 may also include is a motion detector. For example, the motion sensor may be a gyroscope that measures orientation of the master camera module 102. In another example, the motion sensor is an accelerometer that is used to measure acceleration of the master camera module 102. In yet another example, the motion sensor includes location detection, such as a global positioning system (GPS), location detection through triangulation via a wireless network, etc.

In other examples, the sensor 104 may include an audio sensor, for example, a microphone for recording audio. Even if the digital camera device has a separate microphone, including a microphone in each camera module may be valuable for generating 3D audio (e.g., A 3D Spatial Surround Audio) to play with the 3D video. In embodiments having multiple cameras with each camera or group of cameras associated with a microphone, on playback, the digital camera device may synchronize the switching between cameras used to capture the visual aspects of a scene with the switching between microphones used to capture the audio associated with the visual aspects of the scene. A more comprehensive list of example sensors that may be incorporated in the digital camera device include special sensors (e.g., inertial measurement units, gyroscopes, accelerometers, other motion sensors, altimeters, and magnetometers); acoustic sensors (e.g., microphones and transducers); optical sensors (e.g., structured light capture cameras, stereoscopic capture cameras, photometric capture cameras, modulated light capture cameras, visible light sensors (e.g., RGB cameras), ultraviolet (UV) cameras, near infrared cameras, infrared cameras, ambient light sensors, time of flight (TOF) sensors, and optical emitters); touch sensors (e.g., force sensors, capacitive touch sensors, resistive touch sensors, and thermal touch sensors); location sensors (e.g., GPS systems, beacons, trilateration systems, and triangulation systems); and emissions based sensors (e.g., lidar systems, dot field projectors, vertical cavity surface-emitting laser sensors and CMOS laser sensors).

In embodiments having camera as optical sensors, the image signal processor (ISP) 108 receives an electrical signal from the image sensor and performs demosaicing to determine pixel color from the electrical signals. In some embodiments, the ISP 108 controls autofocus, exposure, and white balance. In some embodiments, the ISP 108 compresses raw video data for faster transmission. In some other embodiments, the master streaming service 109 or the imaging system 125 compresses raw video data. In some embodiments, the ISP 108 executes processes for training or inferencing a machine learning module for image correction, image enhancement, predicting depth information, performing stereo reconstruction or executing another CV function. The ISP 108 may embed the device identifier of the camera module (e.g. the serial number) in the raw video data. In embodiments including non-camera sensors, the ISP 108 may embed the device identifier of a non-camera sensor in sensor data processed by the ISP 108.

Post processing by the ISP 108, video and image data generated camera modules may be processed by a master streaming service 109. In some embodiments, the master streaming service 109 includes a master streaming client and a master streaming server. The master streaming client produces image and video files from image data captured by the camera modules. In some embodiments, the master streaming client may also encode image and/or video files into image and/or video streams. The master streaming client may create a video and/or image stream by passing image data to a codec through a series of data buffers. The codec encodes image data into a video or image stream provided to the master streaming server over a series of data buffers. In some embodiments, the codec is a jpeg encoder generating image streams. In other embodiments, the codec is a media codec generating video streams.

The master streaming client may embed depth information, calibration data, playback instructions, timing information and other metadata into an image and/or video file. In some embodiments, the master streaming client embeds information in the file header. The master streaming client may also encode depth information, calibration data, playback instructions, timing information and other metadata into an image and/or video stream. Depth information includes disparity data, depth data (e.g., a depth value for each pixel or a depth map), and a depth confidence metric (e.g., a standard deviation, confidence score, confidence threshold, confidence level, percent error, variance, skewness, kurtosis, or correlation coefficient). Calibration data includes calibration parameters, distortion correction factors, calibration metadata 300, aggregate calibration data 900, and/or dynamic calibration metadata 330. Other metadata includes device identifiers, camera settings, camera settings, device identifier and/or sensor data generated by other sensors and associated with one or more camera identifiers.

One or more components of the imaging system 125 may read the embedded or encoded information to perform one or more functions of the digital camera device. In some embodiments, the 3D rendering engine 223 reads embedded or encoded information (e.g., depth information) to generate one or more 3D models. In other embodiments, the remote streaming service 224 reads embedded or encoded information (e.g., timing data and playback instructions) to generate previews and display images and videos.

The master streaming server transmits image and video files and/or streams generated by the master streaming client the imaging system 125. In some embodiments, the streaming server includes a TCP connection for sending a TCP stream to a second TCP connection included the imaging system. In some embodiments, the second TCP connection provides the TCP stream to a remote streaming service 224 including a remote streaming client. In some embodiments, the remote streaming client includes a codec. The codec may decode images and video streams provided by the TCP connection for editing and playback. Additionally the codec may encode edited streams and/or files for transmission or storage.

In some embodiments, the master streaming service 109 transmits image frames generated by all camera modules to the imaging system 125. In one arrangement, a streaming server included in each slave camera module transmits image frames to the master streaming client. The master streaming client then assembles frames from the plurality of camera modules into image files and/or streams and video files and/or streams. The master streaming server then transmits image files and/or streams and video files and/or streams including image frames from every capturing camera module to the imaging system 125. Image frames from slave camera modules are transmitted to the master streaming service by "slave streaming service to master streaming service" 137 connection links. Image frames from the master streaming service are distributed of the imaging system 125 by a "master streaming service to imaging module" 138 connection link. In other arrangements, streaming services within each camera module independently transmit image files and/or streams and video files and/or streams to the imaging system.

The processor 106 may comprise arithmetic logic units, microprocessors, general purpose controllers, digital signal processors (DSPs), programmable controllers, application specific integrated circuits (ASICs), programmable logic devices (PLDs), a processor array, logical circuitry, or some other processing elements configures to execute software code, manipulate data structures, perform computations, send and receive data from memory, and/or provide in sensor data in the form of in memory streams, an encoded, compressed, or uncompressed file format, or any other form suitable for transmission to an imaging system 125, network 126, server device 127, or some other memory or processing resource. The processor 106 can be embodied as a single- or multi-processor system executing an operating system that can implement a high-level module, e.g., a manager, to logically organize the information as a hierarchical structure of named directories, files and special types of files called virtual disks at the storage devices. The processor 106 may process data signals and may include various computing architectures including a complex instruction set computer (CISC) architecture, a reduced instruction set computer (RISC) architecture, or an architecture implementing a combination of instruction sets. Although a single processor is illustrated in the master camera module 102 the master camera module 102 may include multiple processors including on or more CPUs, GPUs, and/or NPUs.

The memory 105 includes a non-transitory memory that stores data for providing the functionality described herein. The memory 105 may be a dynamic random access memory (DRAM) device, a static random access memory (SRAM) device, flash memory or some other memory devices. In some embodiments, the memory 105 may include one or more camera memory cards for storing raw video data (e.g., image frames) captured by the master camera module 102. Example memory cards include, but are not limited to, a secure digital (SD) memory card, a secure digital high capacity (SDHC) memory card, a secure digital extra capacity (SDXC) memory card, and a compact flash (CF) memory card, etc.

As illustrated in FIG. 1, the digital camera device may include a first slave camera module 102a and a second slave camera module 102n. The first slave camera module 102a includes a lens 103a, sensor 104a, memory 105a, camera control unit 107a, ISP 108a, and a streaming service 109a. Similarly, the second slave camera module 102n includes a lens 103n, sensor 104n, memory 105n, processor 106n, camera control unit 107n, ISP 108n, and streaming service 109n. These components are similar to their counterparts in the master camera module 102. Therefore, the description will not be repeated herein. Additionally, the camera setting adjustment, calibration, distortion correction, and re-calibration routines described below are typically illustrated using the master camera module 102 and the master camera control unit 107. These illustrations are for explanation purposes only and the invention is not limited to these examples. Similar camera setting adjustment, calibration, distortion correction, and re-calibration routines may be performed on the first slave camera module 102a using the camera control unit 107a, on the second slave camera module 102n using the camera control unit 107n, and additional camera modules included in the digital camera device using similar camera control unit structures.

Camera modules included in digital camera device embodiments may have many customizable camera settings. Some camera settings require physical movement of one or more camera modules or module components (e.g., baseline, aperture, zoom, focus, iris, relative camera rotation, shutter speed, etc.) Other camera settings are determined by the physical characteristics of the image sensor or controlled by firmware or software instructions dictating how electrical signals captured by the image sensor are processed during and post capture as part of the image reproduction process (e.g., aspect ratio, resolution, white balance, gain, stabilizer, offset, binning, subsampling etc.). In some embodiments, camera settings can be set using a user interface included in an imaging system 125 and displayed on a client device 124.

In one example, to modify camera settings, the desired settings are received through a user interface. Upon receiving a set of desired settings, the client device 124 sends a data message including the desired camera settings to the master camera control unit 107 through a "client device to camera module" 136 connection link. The multi camera controller 110 receives the data message and processes the message into camera setting adjustment instructions. The multi camera controller 110 distributes camera setting adjustment instructions to the master mono camera controller 111 and the master proxy camera controller 112 via an "intra master camera control unit" 131 connection link. To adjust the camera settings on the other camera modules, the master proxy camera controller 112 communicates the camera setting adjustment instructions to proxy camera controllers 112a, 112n included in the first slave camera module 102a, the second slave camera module 102n and all other camera modules included in the digital camera device via a "master proxy controller to proxy controller" 130 communication link. To initialize adjustment of the camera settings in each module, the proxy camera controllers 112a, 112n in the first and second slave camera modules distribute camera setting adjustment instructions to the mono camera controllers 111a, 111n in the first and second slave camera modules 102a, 102n. To drive physical movement of one or more modules or one or more camera device components, the mono camera controllers draw electrical signal from a power supply and distribute it to one or more motors included in the camera device and/or a central motor 121.

In one embodiment, camera setting adjustment instructions may include values for one or more camera settings (e.g., baseline, aperture, zoom, focus, iris, relative camera rotation, shutter speed, aspect ratio, resolution, white balance, gain, stabilizer, offset, binning, subsampling, etc.), or the difference between a current value and a desired value for one or more camera settings. Camera setting adjustment instructions may also include one or more device identifiers corresponding to camera modules having one or more camera settings that must be adjusted to provide the desired camera settings. The camera setting adjustment instructions may also include a unit of time specifying a moment in time the camera module will begin or continue capture using the modified camera settings, calibration adjustment instructions describing the calibration parameters that need to be adjusted in order to calibrate the camera module at a position corresponding to the desired camera settings, and a request for a message from master mono camera controller 111 and the proxy camera controllers 112a, 112n in the first and second slave camera modules confirming receipt of the data message sent from the master proxy camera controller 112 the adjustment.

Figure 10:
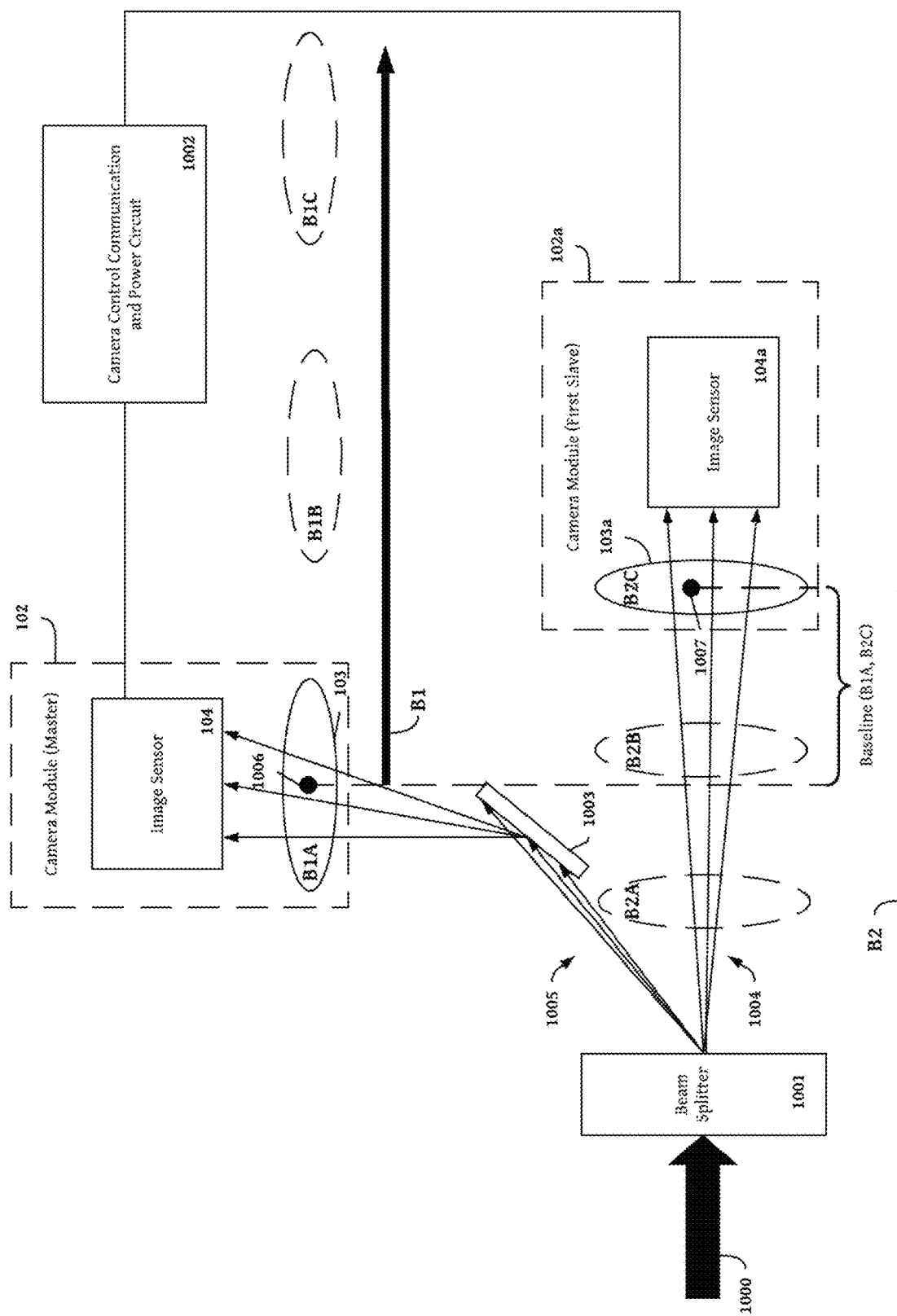
FIG. 10 shows an example digital camera device embodiment having two axis for adjusting baseline.

To adjust camera settings requiring physical movement of one or more camera modules or module components, the multi camera controller 110 sends a data message to the system control unit 120 instructing the battery 122 to provide an electrical signal to the motor to drive the camera module and/or camera module components to the position corresponding to the desired camera settings. Data messages between the multi camera controller 110 and the system control unit 120 are sent via a "master camera control unit to system control unit" 136 connection link. Electrical signal driving an internal camera module motor to move the position of one or more camera modules or module components may be distributed to camera modules via a "control unit to camera module" 132 connection link. Other examples may include a system motor 121 driving one or more camera modules to a position determined by one or more camera settings. As shown in FIG. 10, a system motor 121 may execute a baseline camera setting adjustment by moving the position of one or more camera modules. The system motor 121 may be used in combination with one or more internal camera module motors, wherein the internal module motors drive movement of camera module components upon receiving electrical signal form a power supply, for example, a battery 122. The internal module motors may adjust to position of one or more lenses and/or apertures to adjust, for example, the camera module's aperture, zoom, focus, iris, relative camera rotation, shutter speed, etc.

In some examples the power supply is a battery 122. In other examples power may be supplied to the digital camera device by a different power source. For example, one or more of a wall outlet, generator, power inventor or any combination of these elements provides power for a load such as the camera modules or other sensor devices. The power source may be alternating current ("AC") or direct current ("DC"). In some implementations, the power source may be an AC power supply that is converted to a DC power supply. For example, AC voltage from a generator or wall outlet is routed through a power invertor to provide DC voltage for the camera modules or sensor devices. The power source may also include a power step down element to refine the power supply to a voltage level compatible with one or more loads. For AC voltage, the power step down element may include one or more step-down transformers or any other element or combination of elements configured to step down AC voltage. For DC voltage, the power step down element may include one or more series voltage dropping resistors, a voltage divider network or any other element or combination of elements configured to step down DC voltage. For example, AC voltage from a generator or wall outlet is routed through a power inventor to provide DC voltage, and this DC voltage is routed through one or more series voltage dropping resistors to drop the DC voltage to a level appropriate for powering the camera modules.

Adjustments to one or more camera settings may require adjusting calibration metadata in order to maintain the quality or captured images and video. In particular, adjustments to camera settings that change the position of one or more camera modules or camera module components often require modifications to camera module calibration. In high quality image and video capture systems, calibration of stereo camera modules and multi-camera systems is extremely sensitive. Therefore, slight changes in the position of one or more camera modules or camera module components can disturb calibration. Fortunately, calibration in the digital camera device described herein is a dynamic rather than static process allowing calibration metadata to be changed in real time to maintain capture quality across a range of camera settings and capture conditions.

To modify calibration metadata in conjunction with changes to camera camera settings, calibration adjustment instructions may be included in camera setting adjustment instructions distributed to one or more mono camera controllers (e.g., the master mono camera controller 111, the second mono camera controller 111a, the third mono camera controller 111n, or additional mono camera controllers included in the plurality of camera modules). In one example, the calibration adjustment instructions include a set of calibration parameters impacted by changes to camera settings required to configure the camera module to capture content using desired camera settings. Calibration adjustment instructions may also include a device identifier describing the camera module receiving the calibration adjustment instructions and a calibration file identifier describing the calibration file associated with the camera module requiring modifications to the calibration metadata.

In one example, upon receiving the calibration adjustment instructions, the master mono camera controller 111 requests updated calibration metadata from a calibration file stored in memory 105, wherein the updated calibration metadata corresponds to a calibration point having the desired camera settings. If a calibration file contains calibration metadata for a calibration point having the desired camera settings, updated calibration metadata is returned to the master mono camera controller 111. The master mono camera controller 111 then instructs an internal camera motor or system motor 121 to move the master camera module 102 and/or one or more components of the master camera module (e.g., lens 103 or sensor 104) to a calibration position corresponding to the desired camera settings. The ISP 108 and/or processor 106 are also instructed to capture image data and generate images and/or video content using the updated calibration metadata provided by the master mono camera controller 111.

If a calibration file does not contain calibration metadata for a calibration point having the desired camera settings, the master mono camera controller 111 may send a request for real time calibration metadata to a sensor aggregator 123 in the camera control unit 120. The sensor aggregator collects requests for real time calibration metadata from all of the camera modules and distributes the batch of requests to a camera calibration system 222 within the imaging system 125 for processing. The camera calibration system processes the requests to generate real time calibration metadata form each requesting camera module. The real time calibration metadata is delivered to the sensor aggregator 123 for distribution back to the master mono camera controller 111 and all other mono camera controllers requested real time calibration metadata. In one example the real time calibration metadata is generated by the camera calibration system 222 according to the method described below in FIG. 10, wherein the calibration file including calibration metadata is either stored in the imaging system or provided to the camera calibration system 222 by a mono camera controller within a request for real time calibration metadata. The request for real time calibration metadata may include all calibration metadata included in a calibration file or a selection of calibration metadata corresponding to calibration points having camera camera settings most proximate to the desired camera settings. Post generation, interpolated calibration may be stored in on camera module memory or in storage on the imaging system for future reference.

Upon receiving the real time calibration metadata, the master mono camera controller 111 instructs an internal camera motor or system motor 121 to move the master camera module 102 and/or one or more components of the master camera module (e.g., lens 103 or sensor 104) to a calibration position corresponding to the desired camera settings. The ISP 108 and/or processor 106 are also instructed to capture image data and generate images and/or video content using the real time calibration metadata provided by the master mono camera controller 111. Real time calibration metadata distributed to other mono camera controllers will initialize similar processes executed within the other camera modules included in the digital camera device.

Imaging System

FIG. 2 is a high level block diagram illustrating an example client device 124 and imaging system 125 according to an embodiment of the invention. The client device 124 includes an imaging system 125, a communication unit 210, memory 212, a processor 213, a storage device 211, and a display 216. The above components are communicatively coupled to an interconnect 215, for example, a high-bandwidth system bus, such as an Advanced High-performance Bus (AHB) matrix interconnects the electrical components of the 3D camera. Other possible interconnect 215 implementations include, for example, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (19E) standard 1394 bus (sometimes referred to as "Firewire") or any other data communication system.

A processor 213 may comprise an arithmetic logic unit, a microprocessor, a general purpose controller, digital signal processors (DSPs), programmable controllers, application specific integrated circuits (ASICs), programmable logic devices (PLDs), logical circuitry, or some other processing elements configures to execute software code, manipulate data structures, perform computations, send and receive data from memory, provide electronic display signals to a display 216 and/or otherwise process sensor data. The processor 213 can be embodied as a single- or multi-processor system executing an operating system that can implement a high-level module, e.g., a manager, to logically organize the information as a hierarchical structure of named directories, files and special types of files called virtual disks at the storage devices. The processor 213 may process data signals and may include various computing architectures including a complex instruction set computer (CISC) architecture, a reduced instruction set computer (RISC) architecture, or an architecture implementing a combination of instruction sets. Although a single processor is illustrated in the client device 124 shown in FIG. 2, the client device 124 include multiple processors including on or more CPUs, GPUs, and/or NPUs. The processor 213 is coupled to the interconnect 215 for communication with the other components. Other processors, operating systems, sensors, displays and physical configurations may be possible.

A memory 212 may include a non-transitory memory that stores data for providing the functionality described herein. The memory 212 may be a dynamic random access memory (DRAM) device, a static random access memory (SRAM) device, flash memory or some other memory devices. In some embodiments, the memory 212 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 212 may store the code, routines and data necessary for the imaging system 125 to provide its functionality. The memory 212 is coupled to the interconnect 215 for communication with the other components.

The communication unit 210 may transmit data to any of the entities that comprise the digital camera device 100 depicted in FIG. 1. Similarly, the communication unit 210 may receive data from any of the entities that comprise the digital camera device 100 depicted in FIG. 1. The communication unit 210 is coupled to the interconnect 215 for communication with other components of the client device. In some embodiments, the communication unit 210 includes a port for direct physical connection to a network, such as a network 126 of FIG. 1 or to another communication channel. For example, the communication unit 210 may include a port such as a USB, SD, RJ or similar port for wired communication with a client device. In some embodiments, the communication unit 210 includes a wireless transceiver for exchanging data with the client device, camera modules, other sensors, or other communication channels using one or more wireless communication methods, including IEEE 802.11, IEEE 802.16, BLUETOOTH® or another suitable wireless communication method.

In some embodiments, the communication unit 210 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 210 includes a wired port and a wireless transceiver. The communication unit 210 also provides other conventional connections to a network for distribution of data using standard network protocols including TCP/IP, HTTP, HTTPS and SMTP, etc.

The storage device 211 can be a non-transitory storage medium that stores data for providing the functionality described herein. The storage device 211 may be a dynamic random access memory (DRAM) device, a static random access memory (SRAM) device, flash memory, or some other memory devices. In some embodiments, the storage device 211 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 211 is communicatively coupled to the interconnect 215 for communication with other components of the client device. In some embodiments, the storage device 211 may store data that was temporarily stored in the memory 212.

In some embodiments, the storage device 211 includes multiple ports having input/output (I/O) interface circuitry that couples to the disks over an I/O interconnect arrangement, e.g., a conventional high-performance, Fibre Channel (FC) link topology. In various embodiments, the I/O interface and the and the storage device 211 can be integrated into one device configured to connect to a switching fabric, e.g., a storage network switch, in order to communicate with other devices and the mass storage devices.

In one non-limiting example, the image data captured by the plurality of camera modules can be rendered as 3D content on a display 216 included in the client device 124. In one example the display 216 is a high resolution LCD or OLED display screen that can project images and video sequences including full HD, 8K ultra HD, 720p, 1080p, 1080i, and 4320p content. In other embodiments, the display 216 includes a 3D or holographic display screen capable of displaying content in 3D or 2D, for example, a light field display having diffractive lightfield backlighting (DLB) (e.g., a nano-textured diffractive light field backlighting holographic display or other two or four view display having multiple LCD layers with a directional backlight). The light field display systems may produce a 3D effect by rendering many different views (e.g., 64 or more) of the same object. Each view is perceptible at a particular viewing angle and may result from combining two unique stereo image or stereo video frame pairs. In some examples, the light field display is a 5.7 inch 2560×1440 pixel, 4-view display by Leia.

Alternatively, the display 216 may be a stereo display projecting stereo views of images and video sequences side by side. The display 216 may also be a VR display, (e.g., a head mounted display (HMD) or other headset). To view content captured by the digital camera device using a VR display, content captured from a plurality of cameras modules may be stitched together and projected on the VR display according to motion information, (e.g., sensatory data from a gyroscope). In some embodiments, the plurality of camera modules are arranged with each camera pointing in a different direction to capture a scene from a plurality of points of view. The different points of view can be stitched together to create a 180 degree or 360 degree ultra wide field of view landscape view of the scene and each pixel in the landscape view may represent a slightly different direction relative to the neighboring pixels. During playback, the imaging system may leverage the different directions and points of view included in the landscape view to project different perspectives of a scene. Using the different perspectives, the imaging system may also be able to generate depth information at many different viewing directions. This depth information may be used to render 3D content on the display 216. In some embodiments the client device 124 does not include a display 216 and instead the imaging system 125 projects images and video sequences on an external display system (e.g., a separate display device connected to the client device 124, network 126, or server device 127).

The imaging system 125 may contain one or more software modules for providing the functionality described below. In the embodiment shown in FIG. 2, the imaging system includes and image rectification module 221, a camera calibration module 222, a rendering engine 223, a playback/preview pipeline 224, an image signal processing module 225, a vision processing module 226, an application processing pipeline 227, and a user interface 228.

The image signal processing module 225 can be software including routines for pre-processing an indexing image data captured by the plurality of camera modules. In some embodiments, the image signal processing module 225 can be a set of instructions executable by the processor 213 to provide the functionality described below for pre-processing and indexing image data captured by the plurality of camera modules. In some embodiments, the image signal processing module 225 can be stored in the memory 212 of the computing device 200 and can be accessible and executable by the processor 213. The image signal processing module 225 may be adapted for cooperation and communication with the processor 213 and other components of the computing device 200 via an interconnect 215.

Embodiments of the digital camera device may capture a large volume of sensor data from a variety of sensor types. For most applications, only a subset of the sensor data is required, therefore indexing operations are required to efficiently use captured sensor data. Additionally, sensor data may be captured in a variety of file and in memory stream formats. Many of these formats are incompatible with each other, therefore additional pre-processing steps may be required to merge or otherwise process combinations of sensor data. To address these issues, the image signal processing module 225 may index sensor data using one or more indices including a sensor id corresponding to the sensor capturing the sensor data, the type of sensor data, the time of capture, the intended application of the sensor data, and a group id identifying combinations of sensors commonly used for specific applications. The image signal processing module may also perform extract, transform, and/load operations to covert image data from one format to another, to clean sensor data by removing noise or inaccuracies, or combine sensor data from multiple formats into one file, one in memory stream, or one compressed format. One or more smoothing filters or sampling functions may also be applied by the image signal processing module 225 to sensor data to remove noise and other imperfections.

Image signal processing module 225 embodiments processing image may also perform one or more pre-processing operations that are specific to image data. In one embodiment, the image signal processing module 225 performs pre-processing operations to correct and/or enhance image data. For example, the image signal processing module 225 corrects the field shading, enhances RGB color data, sharpens image resolution, adjusts color contrast levels, adjusts white balance, stabilizes a video sequence, corrects lens distortion, corrects occlusion zones, or performs other image or video sequence corrections or enhancements. The image signal processing module 225 may correct and/or enhance image data by applying one or more interpolation functions or extrapolation functions to image data included in an image or video sequence. In one example, the image signal processing module 225 corrects occlusion zones and color shading by interpolating the RGB color data in the surrounding the occlusion zone or mis-shaded area.

The image signal processing module 225 may also normalize sensor data, calibration metadata, or camera setting values to expedite other image processing functions of the imaging system. In one example, the image signal processing module 225 performs one or more normalization functions to shift or rescale image data, calibration metadata, or camera setting values, to a notionally common scale (e.g., 0 to 1). Normalized data may be written in memory 212 or a storage device 211 for use in other image processing functions performed by the imaging system 125. The image signal processing module 225 may normalize calibration metadata in advance- of or after-interpolation and/or rectification processing.

In one possible implementation, the image signal processing module 225 normalizes one or more calibration parameters included in calibration metadata by dividing parameter values by the pixel dimensions of an image sensor (e.g., for an image sensor having a 1920×1080 pixel resolution, dividing the x coordinates of the distortion centers and focal lengths by 1920 and the y coordinates of the distortion centers and focal lengths by 1080). This normalization operation allows the image rectification module 221 and/or rendering engine 223 to use the calibration parameters to rectify and project captured content on any resolution display having the same aspect ratio. For projection on display screens having the same aspect ratio as the capturing image sensor (e.g., 16:9), normalization may be done during the calibration phase to provide calibration files including normalized values for calibration parameters. Alliteratively, calibration metadata must be normalized in real time for projection on display screens having different aspect ratios (e.g., 1440×1080 pixels with a 4:3 aspect ratio) relative to the capturing image sensor.

The camera calibration module 221 can be software including routines for calibrating camera modules, determining calibration metadata, and adjusting camera module calibration. In some embodiments, the camera calibration module 221 can be a set of instructions executable by the processor 213 to provide the functionality described below for camera calibration, recalibration, and adjustment of calibration metadata. In some embodiments, the camera calibration module 221 can be stored in the memory 212 of the computing device 200 and can be accessible and executable by the processor 213. Camera calibration module 221 may be adapted for cooperation and communication with the processor 213 and other components of the computing device 200 via an interconnect 215.

To capture and project high quality images and videos, camera modules included in the digital camera device must be calibrated with a high degree of accuracy. In one example, camera modules are calibrated using a calibration profile. The camera calibration module 221 may generate a calibration profile using a manual and/or digital calibration process. Calibration profiles may include a calibration metadata for optimizing the quality and accuracy of image data captured by the camera modules. Calibration metadata is described in detail below in FIG. 3. In one example calibration process, the calibration module 221 estimates calibration metadata from a set of object points included in a calibration pattern (e.g., a chessboard), a first set of image points describing the projections of the calibration pattern points observed by the first camera, and a second set of image points describing the projections of calibration pattern points observed by the second camera. Calibration metadata generated by the calibration module 221 may include intrinsic calibration parameters (e.g., focal lengths, distortion centers, and distortion coefficients) and extrinsic calibration metadata (e.g., rotation matrices and projection matrices).

In other embodiments, intrinsic calibration metadata may be measured manually and the extrinsic calibration metadata calculated by the camera calibration module 221. In one example, the camera calibration module 221 generates a rotation matrix from the product of three elemental rotation matrices describe the rotational offset of a left camera module relative to a right camera module in three dimensions (i.e., offset about the x, y, and z axes). The three elemental rotation matrices are generated using Euler angles (i.e., pitch, yaw, and roll) that define the rotational offset angles between the coordinate systems of the left and right stereo camera modules. The camera calibration module 221 generates a translation vector (T) from the intrinsic calibration parameters. The translation vector (T) describes the vertical and/or horizontal offset between the coordinate systems of the left and right stereo camera modules.

The camera calibration module 221 may estimate the total re-projection error for all the points in all the available views from both camera and generate calibration metadata that minimizes the total re-projection error. In one example, the total re-projection error is measured by determining the Euclidean distance between a projected image point and a measured image point for every point included in the calibration images. In other embodiments, the total re-projection error is measured by determining the sum of the squared distances between the observed points and the projected points for every point included in the calibration images.

In some embodiments, one or more of the camera modules includes a fish eye lens. Without fish eye specific distortion factors, wide field of view images captured by the fish eye lens will appear heavily distorted when projected on a rectangular display screen. The camera calibration module 221 may generate one or more fish eye specific distortion factors using one or more fish eye distortion modules. The fish eye distortion factors are incorporated into the calibration metadata for undistortion of wide field of view images during projection. In one example, the fish eye distortion factors warp the edges of the wide filed of view images to make the images appear captured by a standard field of view lens. In other examples, the fish eye distortion factors apply a scale factor to wide field of view images during projection to project the undistorted portion of the wide field of view images.

In some embodiments, camera modules included in the digital camera device described herein have a plurality of customizable camera settings. To ensure the digital camera device captures the highest quality image and video, each unique value of each camera setting must be calibrated. Depending on the number of adjustable camera settings and their corresponding range of values, calibration at some or all of the camera settings may be impractical. Therefore, the camera calibration module 222 may calculate calibration metadata for camera settings that do map to calibration points. Operations performed by the camera calibration module 221 to calculate calibration metadata using a digital calibration process include interpolation and extrapolation functions and are described in detail below in FIGS. 5-6.

In some embodiments, the digital camera device is implemented in a mobile device (e.g., a smartphone). Mobile devices are constantly moving, frequently handled, and often left out in the open. Therefore the position of one or more camera modules included in a mobile device is very likely to change during the life of the device as a result of normal wear and tear. To extend the usable live of the camera device and ensure high quality image and video capture performance throughout the life of camera device, the camera calibration module 222 may re-calibrate camera modules using captured content and/or depth information (e.g., view disparity). The camera calibration module 221 may also calculate a depth confidence metric (e.g., a correlation coefficient or standard deviation) to further refine application of the re-calibration operations. In one example, the camera calibration module 221 re-calibrates a camera module by modifying calibration metadata using re-calibration data at or exceeding a confidence threshold. Operations performed by the camera calibration module 221 to calculate re-calibration data are described in detail below in FIGS. 7-8.

The image rectification module 222 can be software including routines for rectifying and projecting stereoscopic images and video frames. In some embodiments, the image rectification module 222 can be a set of instructions executable by the processor 213 to provide the functionality described below for rectifying and projecting stereoscopic images and video frames captured by the plurality of camera modules. In some embodiments, the image rectification module 222 can be stored in the memory 212 of the computing device 200 and can be accessible and executable by the processor 213. The image rectification module 222 may be adapted for cooperation and communication with the processor 213 and other components of the computing device 200 via an interconnect 215.

Rectification is important for most applications of stereoscopic images or video sequences. For example, rectification is an essential preliminary step in producing depth information from stereo image disparity and projecting left and right stereo views as 3D. In some embodiments, four rectification matrices describe stereo camera rectification. Right and left rectification transform matrices (R1, R2) map the image planes of the left and right cameras on the same image plane, thereby making all the epipolar lines parallel and significantly simplifying stereo correspondence calculations. Right and left image projection matrices (P1, P2) describe the new rectified coordinate systems for the left and right camera modules. Applying the image projection matrices (P1, P2) to the coordinates of image points included in captured, unrecitified right and left images projects the image points in rectified form as projection points. The image projection matrices P1, P2 are used to ensure that the left and right images are vertically aligned, and satisfy an epipolar geometry. Once the stereo images or video sequences satisfy an epipolar geometry, depth information can be determined via disparity analysis and a 3D effect is observable in projected stereo content.

The image rectification module 222, may generate rectification matrices for rectifying and projecting stereo images and or video frames using a variety of techniques. In one example, the image rectification module 222, calculates rectification transform matrices (R1, R2) and image projection matrices (P1, P2) for the left and right camera modules using the calibration metadata. The image rectification module 222 may calculate a right image projection matrix (P1) and a right rectification transform matrix (R1) from a camera rotation matrix (R), camera translation vector (T), and a right camera matrix (K1) containing the intrinsic calibration parameters for a right stereo camera module. Similarly, the image rectification module 222 may generate a left image projection matrix (P2) and left rectification transform matrix (R2) from a camera rotation matrix (R), a camera translation vector (T), and a left camera matrix (K2) containing intrinsic calibration parameters for a left stereo camera module. Rotation, projection transform, and projection matrices generated by the image rectification module 222 may be written in memory 213 or a storage device 211.

To project rectified images for disparity analysis or display, the image rectification module 222, may distribute projection matrices for one or more stereo camera modules to a playback/preview pipeline 224. Upon receiving the projection matrices, the playback/preview pipeline 224 may instruct a processor 213 (e.g., a GPU shader) to project pixels of a left stereo image or video frame using a left image projection matrix (P2) and to project pixels of a right stereo image using a right projection matrix (P1). Alternatively, the image rectification module may provide projection matrices and projection instructions to a processor 213 directly.

The vision processing module 226 can be software including routines for generating depth information from stereo image data. In some embodiments, the vision processing module 226 can be a set of instructions executable by the processor 213 to provide the functionality described below for generating depth information from stereo image data captured by the plurality of camera modules. In some embodiments, the vision processing module 226 can be stored in the memory 212 of the computing device 200 and can be accessible and executable by the processor 213. The vision processing module 226 may be adapted for cooperation and communication with the processor 213 and other components of the computing device 200 via an interconnect 215.

Depth information is required for most functions of the digital camera device including generating 3D content and other downstream applications leveraging image data including object tracking, facial recognition, object classification, gesture tracking and control, object counting, 2D to 3D conversions, 3D scanning, and SLAM. The vision processing module (VPM) 226 determines depth information from image data captured by the camera modules. Depth information from the VPM 226 describes the distance separating physical points included in captured scenes from the capturing camera module. In one 3D camera embodiment, the VPM 226 determines depth information in two parts. First, the VPM calculates disparity data describing the view disparity between rectified right and left views. The VPM then uses the disparity data to determine depth data for each pixel in an image.

Disparity refers to the difference in location of an object in two right and left views due to the parallax effect caused by the orientation of two stereo camera modules. Parallax is an observable difference in the apparent position of an object viewed along two different lines of sight and may occur in stereo camera systems including two camera modules separated by a constant distance in a particular direction (e.g., horizontal separation or vertical separation). In some embodiments, the parallax effect is adjustable by changing the baseline camera setting or varying the convergence projection setting (i.e., the depth of the zero disparity plane). Mathematically, the disparity of a pixel is equal to the shift value that leads to a minimum sum of squared differences for that pixel (i.e., the lowest difference between the sum of squared differences and the sum of absolute differences).

The VPM 226 may generate disparity maps using a block matching or semi block matching algorithm. Alternatively, the VPM 226 may generate disparity maps using a machine learning module trained on a dataset comprising disparity maps or ground truth images of scenes included a variety of different objects and backgrounds wherein the objects are captured a many different distances away from the capturing device. To enhance the quality of disparity data, the VPM 226 may apply one or more smoothing operations during an algorithmic process for generating disparity data. The VPM 226 may apply one or more smoothing filters to disparity data generated using a machine learning approach.

Using the disparity data, the VPM 226 calculates depth information for each pixel captured by the camera modules. In one example, the VPM 226 derives depth information for a pixel from the disparity data by calculating the product of the camera baseline, focal length, and the inverse of the disparity data for the pixel of interest. The VPM may repeating this process for every pixel to generate a depth information for the full image. In other embodiments, the VPM 226 determines depth using a point cloud matching algorithm. For each selected point in the first image, the VPM 226 matches the region around the selected point to image regions in the second image surrounding each of many candidate match points. The point in the second image with the lowest matching error is taken to be the matching point to the point in the first image. The VPM 226 then computes the depth for the location of the point in the first image based on the location of the point in the first image and the location of its match in the second image. To improve processing speed and/or reduce power consumption, the VPM 226 may include hardware acceleration instructions executing operations on one or more parallel processor implementations (e.g., a GPU, NPU, DSP, ASIC, or FPGA).

The application processing module (APM) 227 can be software including routines for providing functionality using depth information. In some embodiments, the application processing module 227 can be a set of instructions executable by the processor 213 to provide the functionality described below for performing downstream functions using depth information. In some embodiments, the application processing module 227 can be stored in the memory 212 of the computing device 200 and can be accessible and executable by the processor 213. The application processing module 227 may be adapted for cooperation and communication with the processor 213 and other components of the computing device 200 via an interconnect 215. The APM 227 may include hardware acceleration instructions for executing operations on one or more parallel processor implementations (e.g., a GPU, NPU, DSP, ASIC, or FPGA).

The application processing module (APM) 227 combines captured image data with depth data produced by the VPM 226 to perform useful functions. In one example, the APM 227 produces a 3D scan of a scene captured by the digital camera device by combining captured image data with depth information. The APM 227 may also track objects using a SLAM, optical flow, visual odometry or other object tracking techniques. The APM 227 may also combine image data and depth information with other sensor data to produce navigational or other control instructions for a robot or autonomous vehicle. The APM 227 may also combine image and depth information with audio information and/or location information to enhance 3D content display by generating video files having location specific audio, wherein audio is paired with video based on the proximity of the audio sensor to the capturing camera module. In location specific audio files generated by the APM 227, for each video frame, the sound sensor providing the audio changes in concert with the camera module capturing the image data shown in the frame.

The APM 227 may leverage one or more machine learning models to perform additional tasks. The APM 227 may combine image data and depth information with one or more machine learning models to enhance image quality and/or depth accuracy. In some embodiments, the APM 227 leverages a database trained on RGB images to predict color for occlusion zones in images and videos captured by the camera modules. In other examples, the APM 227 leverages a database trained on RGB images with depth information (e.g., ground truth depth) to identify flat and/or featureless objects (e.g., roads, solid color walls, black screens, etc.) and estimate the depth information for the identified objects. The APM 227 may also use one or more machine learning models trained using a database of human faces to perform facial recognition on images captured by the camera modules. Facial recognition performed by the APM 227 may include age, gender, and ethnicity classification. Similarly, the APM 227 may leverage machine learning models trained using a database of object images to perform object counting and object identification tasks including people counting, car counting, bus or train counting, assembly line productivity estimates, manufactured part counting, and dangerous object identification. Machine learning models that may be generated by the APM 227 include baysian classifiers, support vector machines (SVM), random forests, decision trees, neural networks (NNs), CNNs, CRNNs, HRNN, and HRNNs with attention vectors, node2vec and other graph based systems, and other methods implemented in a machine learning framework (e.g., Keras, Scikitlearn, MXNet, or Tensorflow).

The 3D rendering engine 223 can be software including routines for generating 3D content from image data and depth information provided by the VPM 226. In some embodiments, the 3D rendering engine 223 can be a set of instructions executable by the processor 213 to provide the functionality described below for generating 3D content from RGB images and depth information. In some embodiments, the 3D rendering engine 223 can be stored in the memory 212 of the computing device 200 and can be accessible and executable by the processor 213. The 3D rendering engine 223 may be adapted for cooperation and communication with the processor 213 and other components of the computing device 200 via an interconnect 215. The 3D rendering engine 223 may include hardware acceleration instructions for executing operations on one or more parallel processor implementations (e.g., a GPU, NPU, DSP, ASIC, or FPGA).

3D content can be created using a variety of methods. In some embodiments, the 3D rendering engine 223 creates an observable 3D effect by projecting side by side stereo views on a HMD or other VR display device. Viewers observe 3D content by seeing the left stereo view with their left eye and the right stereo view with their right eye. In other embodiments, the 3D rendering engine 223 projects right and left stereo views on the same display device by displaying right and left views in an alternating pixel pattern. A diffractive coating, lens, film, or screen underlayment is then applied to the display device in order to render the alternating right view left view pattern as 3D content by bending the right view toward the right eye and the left view toward the left eye. The 3D rendering engine 223 may also processes image data (e.g., RGB color images) to depth information (e.g., a depth map) to generate 3D content wherein every pixel contains the distance to a point in the imaged scene. In these embodiments, the 3D rendering engine produces 3D content without rendering two views. Instead the depth information may be combined with image data to produce 3D versions of the captured scene is real time.

The user interface 228 can be software including routines for interacting with the imaging unit and sensors included in the digital camera device. In some embodiments, the user interface 228 can be a set of instructions executable by the processor 213 to provide the functionality described below for interfacing with the imaging unit and sensors of the digital camera device. In some embodiments, the user interface 228 can be stored in the memory 212 of the computing device 200 and can be accessible and executable by the processor 213. The user interface 228 may be adapted for cooperation and communication with the processor 213 and other components of the computing device 200 via an interconnect 215.

The user interface 228 controls multiple sensors and modules for processing sensor data included in the digital camera device. In some examples the user interface 228 is a digital interface comprising digital buttons for selecting and inputting control commands to digital camera device components. The user interface 228 may display current settings for a selected component and/or show preview illustrating how the device will capture a scene if configured using the new settings. The user interface 228 may support real time changes to one or more digital camera device settings even during capture. Embodiments of the user interface 228 may include analog or mechanical control mechanisms (e.g., physical buttons). Current settings, the range of possible settings, and the setting type may be printed above or proximate to the set of physical buttons. Other embodiments of the user interface 228 include a digital display screen with physical buttons for inputting control commands.

The remote streaming service (RSS) 224 can be software including routines for generating video and image files and playing and previewing content captured by the digital camera device. In some embodiments, the RSS 224 can be a set of instructions executable by the processor 213 to provide the functionality described below for generating video and image files including 3D content files from RGB images and depth information. In some embodiments, the RSS 224 can be stored in the memory 212 of the computing device 200 and can be accessible and executable by the processor 213. The RSS 224 may be adapted for cooperation and communication with the processor 213 and other components of the computing device 200 via an interconnect 215. The RSS 224 may include hardware acceleration instructions for executing operations on one or more parallel processor implementations (e.g., a GPU, NPU, DSP, ASIC, or FPGA).

The digital camera device delivers content to many different devices having different types of displays. Each device may only read certain file types or have display hardware configured to receive a specific form of content. The remote streaming service 224 may include a remote streaming client and a remote streaming service. The remote streaming client generates content files from image data received from the master streaming service 109. The remote streaming server configures content files generated by the remote streaming client for display on a variety of devices. In some embodiments, the remote streaming server included in the RSS 224 project images, video sequences, and other sensor generated content on a display 216 included in the digital camera device. Embodiments of the RSS 224 may also project previews of captured content on a display 216 included in the digital camera device. Previews of image and video files may be projected in real time as the content is being captured. In other embodiments, the RSS 224 projects previews before capture using a current set of camera settings. To project images and playback video content, the PPM 224 may use one or more calibration files and/or calibration profiles from the camera calibration module 221 and/or image projection matrices and/or rectification matrices from the image rectification module 222.

In some embodiments, the RSS 224 may project 3D content according to instructions and/or content files received from the 3D rendering engine 223. The remote streaming client may generate 3D content files by incorporating one or more 3D models generated by the 3D rendering engine 223. Alternatively, the remote streaming client may generate 3D content files including rectified stereoscopic right and left views received from the image rectification module 222. 3D content files produced by the remote streaming client may be encoded or otherwise configured for transmission by the remote streaming server. The remote streaming server may also preview and or project 3D content on a display 216.

Embodiments of the RSS 224 may also provide content to a plurality of devices through a network 126. To facilitate content delivery, the RSS 224 may encode video sequences using one or more streaming protocols (e.g., real time streaming protocol—RTSP), digital multimedia container formats (e.g., MP4) or other encodings. The RSS 224 may also encode 3D content generated by the 3D rendering engine 223 into MP4, four view, or another digital multimedia container format. Metadata including calibration data, synchronization data, sensor data, image data, and/or rendering and playback data may be embedded into a images and/or video files produced by the remote streaming client. In other examples, the remote streaming client encodes metadata including calibration data, synchronization data, sensor data, image data, and/or rendering and playback data into a video stream or digital multimedia file along with images, videos, and 3D content. Sensor data may include gyroscope data for tracking movement of one or more devices.

The remote streaming service 224 may interface with a content delivery network to facilitate streaming content generated by the digital camera device to a plurality of devices. In some embodiments, the RSS 224 distributes content to a content delivery network including a transcoder formatted for adaptive bit rate streaming. The transcoder may dynamically encode input streams received from the RSS 224 over a range of resolutions and facilitate playback of digital camera device content to a plurality of different devices over a content network streaming content at different and/or variable bit rates. The transcoder may encode digital camera device content using a variety of output protocols (e.g., Apple HLS, Adobe HDS, MPEG-DASH, Microsoft smooth streaming, Adobe RTMP, RTSP/RTP, and MPEG-TS).

The RSS 224 may also format content for projection on a VR display. In some embodiments, the RSS 224 stiches images from a plurality of camera modules together and pairs the stitched images with gyroscope data corresponding to a HMD. Upon playback, the section of the stitched images projected by the RSS 224 depends on orientation of the HMD. As the operator changes the location of the HMD, the section of the stitched images displayed by the RSS 224 correspondingly changes. For example, if the HMD moves to the right a stitched image section to the right of center is displayed. The RSS 224 may also segment image content and selectively pair a segment of image content with gyroscope data. When a display device shifts orientation, the RSS 224 may shift one or more segments having associated with gyroscope data to mirror the movement of the device.

Digital Camera Device Calibration

Calibration in stereo camera systems is critically important for capturing high quality image data, delivering a perceivable 3D effect, and calculating accurate depth information. In modern high-resolution camera systems, even slight calibration errors can have a significant impact on picture quality and disparity measurements because calibration errors effect each pixel and therefore get repeated thousands of times for each 4k image. For stereo cameras and other multi-camera systems, camera calibration occurs in two phases. First, each individual camera module is calibrated to account for subtle differences between lenses, image sensors, and other components of each camera introduced at manufacture and assembly. Then, stereo calibration accounts for the position of each camera module included in a stereo camera system to maintain alignment of captured stereo images. Stereo calibration is also used during playback to project captured stereo images on a display screen. In most stereo camera systems, calibration parameters must be tracked and adjusted in eight or more axes to minimize re-projection error. These axes can include the pitch and yaw Euler rotation angles for two camera modules at capture and projection.

Poor calibration interferes with the image sensor's ability capture high quality image data by optimizing the image sensor for capture using module specifications that do not reflect the actual camera module specifications. Calibration errors also disturb the vertical and/or rotational alignment between the right and left channels during projection thereby reducing or eliminating the perceivable 3D effect. Poor projection created by ineffective calibration can also produce screen glare and exacerbate eye fatigue making it difficult to view a 3D display for long time periods or damaging eyes forced to view an ineffectively calibrated 3D display for long periods. Calibration error misaligns the stereo camera modules thereby disturbing epipolar lines and reducing the accuracy of view disparity calculations needed for depth data. Therefore, stereo camera systems having calibration errors are unable to accurately measure depth.

The calibration methods implemented by the camera calibration module 221 described herein adjust for variations in camera components and stereo camera alignment created during manufacturing and assembly. The camera calibration module 221 may also include a re-calibration process for adjusting calibration parameters throughout the life of the digital camera device. In some embodiments the re-calibration process uses depth information generated by the VPM 225 to detect calibration errors and quantify changes to one or more calibration parameters. The camera calibration module 221 may also determine one or more virtual calibration points to calibrate camera modules at camera settings that are uncalibrated during the initial calibration process. The camera calibration module 221 may also account for different lens types by adjusting one or more distortion parameters.

In some embodiments, the digital camera device captures image data from two or more different camera modules. The digital camera device can store calibration metadata including calibration parameters for performing intrinsic camera calibration and stereo calibration in a static calibration file. Intrinsic camera calibration is performed on every camera module individually and stereo calibration is performed on each stereo camera. The static calibration file may be supplemented, appended, and/or updated by the camera calibration module 221 during the life of the digital camera device.

Figure 3:
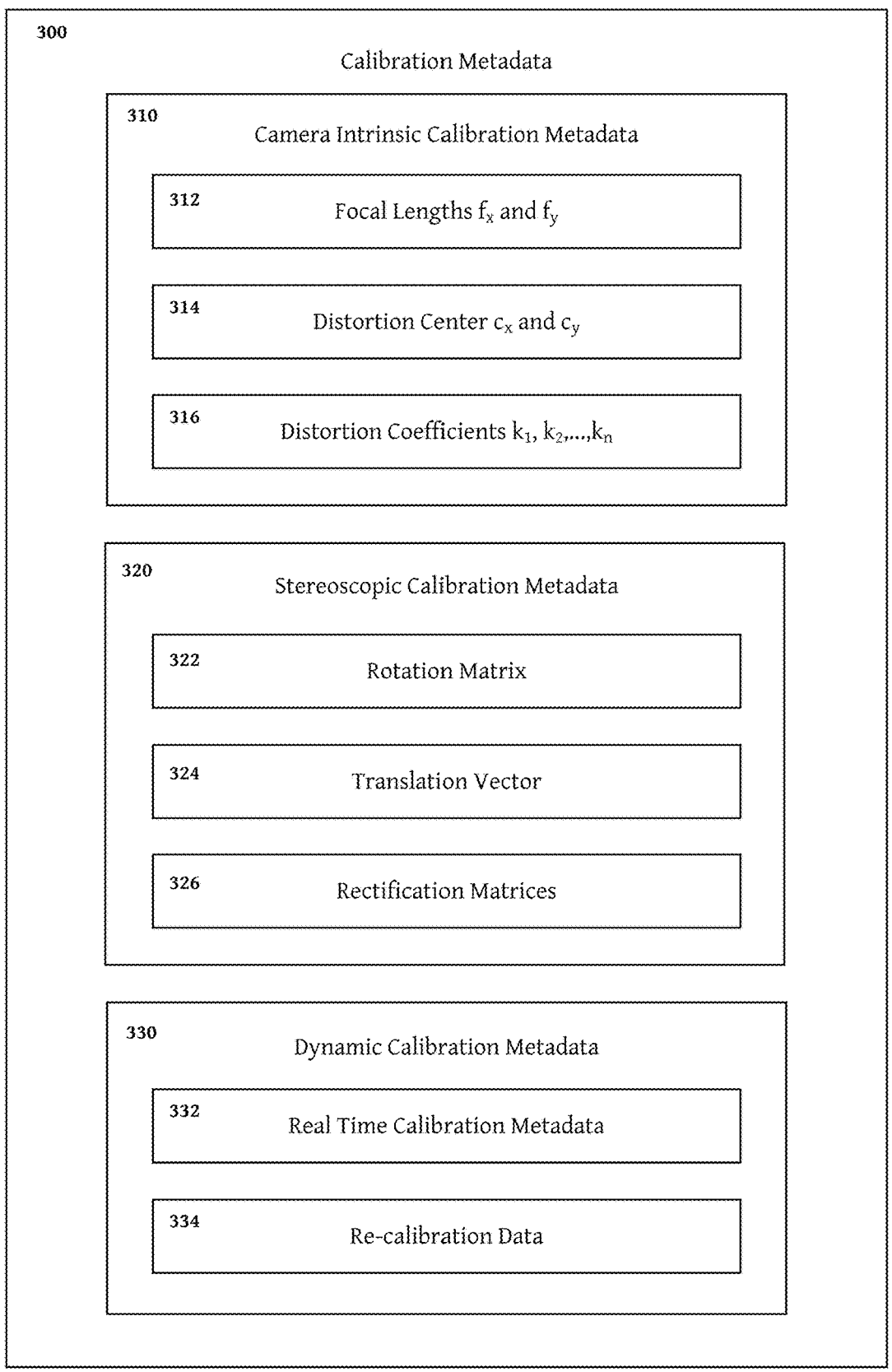
FIG. 3 shows a sample set of calibration metadata including various types of information for a sample stereoscopic device.

FIG. 3 shows a sample set of calibration metadata including various types of information for calibrating stereo camera module(s) included in the digital camera device. At manufacture time, two types of calibration metadata 300 (also referred to as calibration information) are determined for each stereo camera module(s), in order to properly capture and render the final 3D images or videos perceived by the users. At manufacture time, each camera module is calibrated to determine its camera intrinsic calibration metadata 310. Furthermore, stereoscopic calibration metadata 320 (also referred to as extrinsic calibration metadata), which relates to the relevant relationship between the two camera modules, is also determined.

In some embodiments, the camera intrinsic calibration metadata 310 for a camera module (which includes a lens and an image sensor) can include intrinsic calibration parameters including focal length ($f_x$, $f_y$), distortion center ($c_x$, $c_y$), and distortion coefficients ($k_1$, $k_2$, . . . , $k_n$). Due to routine manufacturing variations, each of the camera modules has a unique set of camera intrinsic calibration metadata.

The $f_x$ and $f_y$ parameters 312 describe the focal lengths of the lens in the x and y directions that are perpendicular to each other. The focal lengths are the distances over which initially collimated light rays are brought to a focus, and measures how strongly the lens converges or diverges lights. A lens with a shorter focal length can bend the light rays more sharply. Lenses that are not perfectly circular, for example, some fisheye lenses, may distort or bend the light in slightly different ways in the x direction versus the y direction. Thus, the focal length at the x direction $f_x$ can be different from the focal length at the y direction $f_y$ for aspheric and other asymmetrically curved lenses.

The $c_x$ and $c_y$ parameters 314 describe the distortion center of the projection in the image frame captured by the lens. Since lenses including some aspheric and fisheye lenses may not have prefect circular symmetry, the distortion center denoted by $c_x$ and $c_y$ may not be positioned at the geometric center of the image frame.

The $k_1$, $k_2$, . . . , $k_n$ parameters 316 are distortion coefficients that describe the levels of lens distortion, as a function of the radius from the center of the captured image frame to the edge of the frame. In some embodiments, n can be, for example, between 1 and 16, depending on how precise the calibration needs to be and the characteristics of the particular lens. The $k_1$, $k_2$, . . . , $k_n$ parameters essentially describe how much distortion an image pixel has as a location of the pixel moves from the center of the image to the edge of the image. In some embodiments, the $k_1$, $k_2$, . . . , $k_n$ parameters are defined radially and do not depend on the circular angle of the pixel location. The distortion coefficients are variable depending on the type of lenses used in the camera module. For example, different polynomial lens distortion models having different numbers of distortion coefficients with different values and orders of magnitude are used to describe distortion levels for fisheye and non-fisheye lenses.

There are various reasons why each camera module has its own set of camera intrinsic calibration metadata. In some embodiments, the distance between the left lens and the left image sensor may be slightly shorter than the distance between the right lens and the right image sensor. Alternatively, due to the manufacturing variance of the lenses, the left lens may have an optical distortion profile and/or focal length that are different from the optical distortion profile and/or focal length of the right lens.

In addition to the camera intrinsic calibration metadata 310 for calibrating each camera module individually, stereo camera devices may also be stereo calibrated to determine stereoscopic calibration metadata 320 for each stereoscopic pair of camera modules. The stereoscopic calibration metadata 320 describes the relative position between two stereo camera modules. The stereoscopic calibration metadata 320 includes a mapping of coordinates between the right and left image channels. From this set of coordinate points, projection matrices, rectification matrices, and an optical distortion relationship for two stereo camera modules can be determined. The distortion relationship is used to correct lens distortion and the projection and rectification matrices are used to rectify the images.

Ideally, the two lenses of a stereo camera are perfectly aligned next to each other. However, in an actual digital camera device product, any of the lenses may be slightly off-center from the perfectly aligned location or slightly rotated away from the perfectly aligned orientation. The stereoscopic calibration metadata can be used to correct the captured images and offset the distortion caused by imperfect alignment between those two lenses. After applying the distortion model, it appears as if two lenses with perfect alignment took the images. This correction improves the stereo 3D effect since human eyes are very sensitive to the distortion differences between left and right channels.

In some embodiments, the set of stereoscopic calibration metadata 320 includes a rotation matrix 322 and a translation vector 324. The rotation matrix 322 describes a rotational correction to align an image captured by one camera module to another image captured by another camera module so that the image planes of the left and right channels are on the same plane. The translation vector 324 describes a projection operation that ensures the image frames from the left and right channels are vertically aligned.

In some embodiments, stereo camera modules may be stacked on top of each other and aligned on the same vertical plane. The translation vector 324 for calibrating stereo cameras having this orientation may describe a projection operation that ensures the image frames from the left and right channels are horizontally aligned. Additionally, the set of stereoscopic calibration metadata 320 can include other compensation metadata that relates to image sensors. For example, the image sensor of the left channel may have slightly different color balance than the image sensor of the right channel. Based on a color calibration test, the camera can store color-mapping metadata as portion of the stereoscopic calibration metadata to equalize the color balance between the right and left image sensors to provide a uniform color profile.

In order to enhance the stereoscopic 3D effect, it is desirable to eliminate the optical distortion difference between the left and right channels of the 3D video due to the manufacturing variances. After a 3D camera device is manufactured, the camera modules, including the lenses and the image sensors, can be tested through a calibration process to detect the distortion differences between the left and right channels, represented by the sets of camera intrinsic calibration metadata and the stereoscopic calibration metadata. During a calibration process at the manufacturing site, the stereo camera system modules can capture 3D stereoscopic images and/or videos of several pre-determined reference objects (also referred to as calibration targets) at different angles, and generate calibration metadata based on the images or videos of the reference objects.

When the stereo camera modules capture images and videos, the calibration metadata may be stored within the 3D stereoscopic images or videos in real time. Using the embedded or encoded calibration metadata, the captured 3D stereoscopic images or videos can be played back with the correct offset derived from the calibration metadata. The calibration metadata are also referred to as a calibration vector. Each element of the calibration vector stores one entry or type of the calibration metadata.

In some embodiments, calibration metadata 300 also includes dynamic calibration metadata 330. Unlike conventional camera devices, calibration in digital camera device embodiments described herein is not a static process. Instead, calibration is dynamic and evolves during the life of the device. Dynamic calibration metadata 330 includes real time calibration metadata 332 and re-calibration data 334 generated by the imaging system 125. Real time calibration metadata 332 comprises calibration parameters for non-integer and uncalibrated camera settings. Re-calibration data includes pixel position coordinates correcting calibration errors when applied to image pixel data during the process of mapping image pixels to display pixels. Re-calibration data further includes re-calibration parameters describing a stereoscopic calibration position without from calibration errors.

Figure 9:
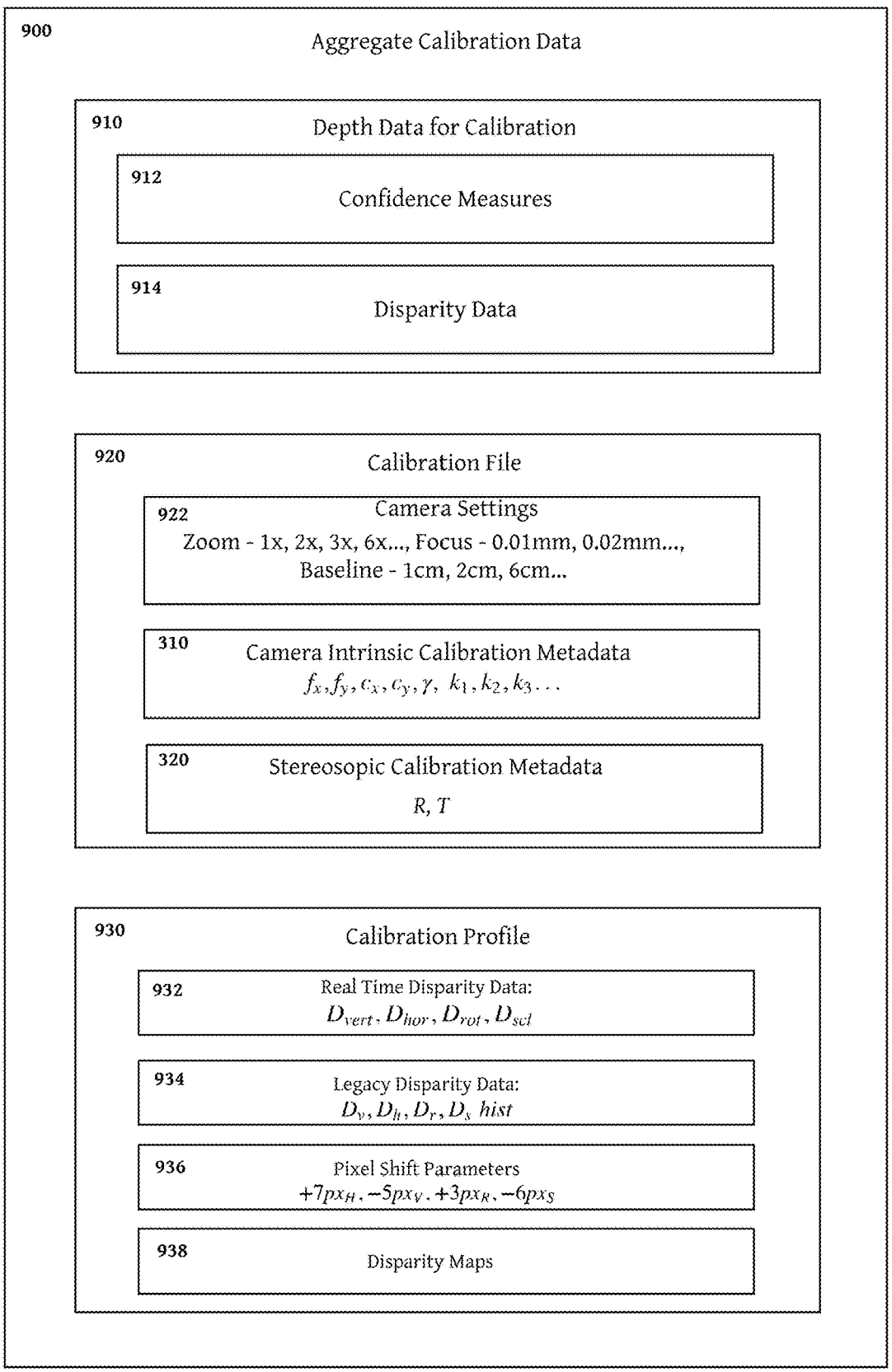
FIG. 9 shows an example set of aggregate calibration data including various formats of aggregate calibration data.

In some embodiments calibration metadata may be stored as aggregate calibration data 900. As shown in FIG. 9, aggregate calibration data includes depth data for calibration 910, calibration files 920, and calibration profiles 920. Depth data for calibration includes disparity data including alignment disparity values and confidence metrics describing a level of certainty associated with each item of depth data for calibration. Calibration files 920 store calibration metadata 300 used for calibrating camera modules included in digital camera device embodiments including camera intrinsic calibration metadata 310 and stereoscopic calibration metadata 320. Within the calibration files 920, calibration metadata 300 may be associated with one or more camera settings. Calibration profiles are generated during the re-calibration processes described below and include real time disparity data 932, legacy disparity data 934, pixel shift parameters 936, and disparity maps 938. Depth data for calibration 910, calibration files 920, and calibration profiles 930 are described in more detail below.

Undistortion During Playback

During playback of the 3D video file, a playback device (e.g., the digital camera device disclosed herein or another device such as a computer, a smart phone, virtual reality headset, or smart television) can extract calibration metadata 300, calibration files, calibration profiles, and/or dynamic calibration metadata 330 from an image and/or video file. For example, the metadata can be extracted from the metadata header of the video file, or decoded from one or more frames of the video though a video steganography technique as a stereoscopic video player running on the playback device processes the video.

A stereoscopic video playback device can run a playback process to render a stereoscopic 3D video on a display 160 (e.g., a computer screen, a virtual reality ("VR") headset, or a mobile phone having a stereoscopic or holographic display). In some embodiments, the functionalities and components of the stereoscopic video player can be included in the playback and preview module 224. In some embodiments, the PPM 224 may process each of the stereoscopic frames. For optimal playback, the video player included in the PPM 224 may require capture parameters and other metadata associated with the camera that captured the frames. For example, the player may require knowing details about the camera's image sensors and calibration metadata to properly render the stereoscopic frames. If the camera processed the video frames prior to the frames being encoded into the video file, the player may also need to know the parameters of the image processing algorithms that processed the frames.

Time stamp information may also be embedded into a video frame or encoded into an image and/or video file. During playback the player may read the time stamp information to sequence the frames of a video stream and/or and associate one or more frames with one or more sets of calibration metadata 300. By reading the time stamp information and associating the frames with their corresponding time stamp information, the player can render the frame using the calibration metadata 300 that corresponds to the frame even if the calibration metadata 300 changes between frames in an video sequence.

Figure 4:
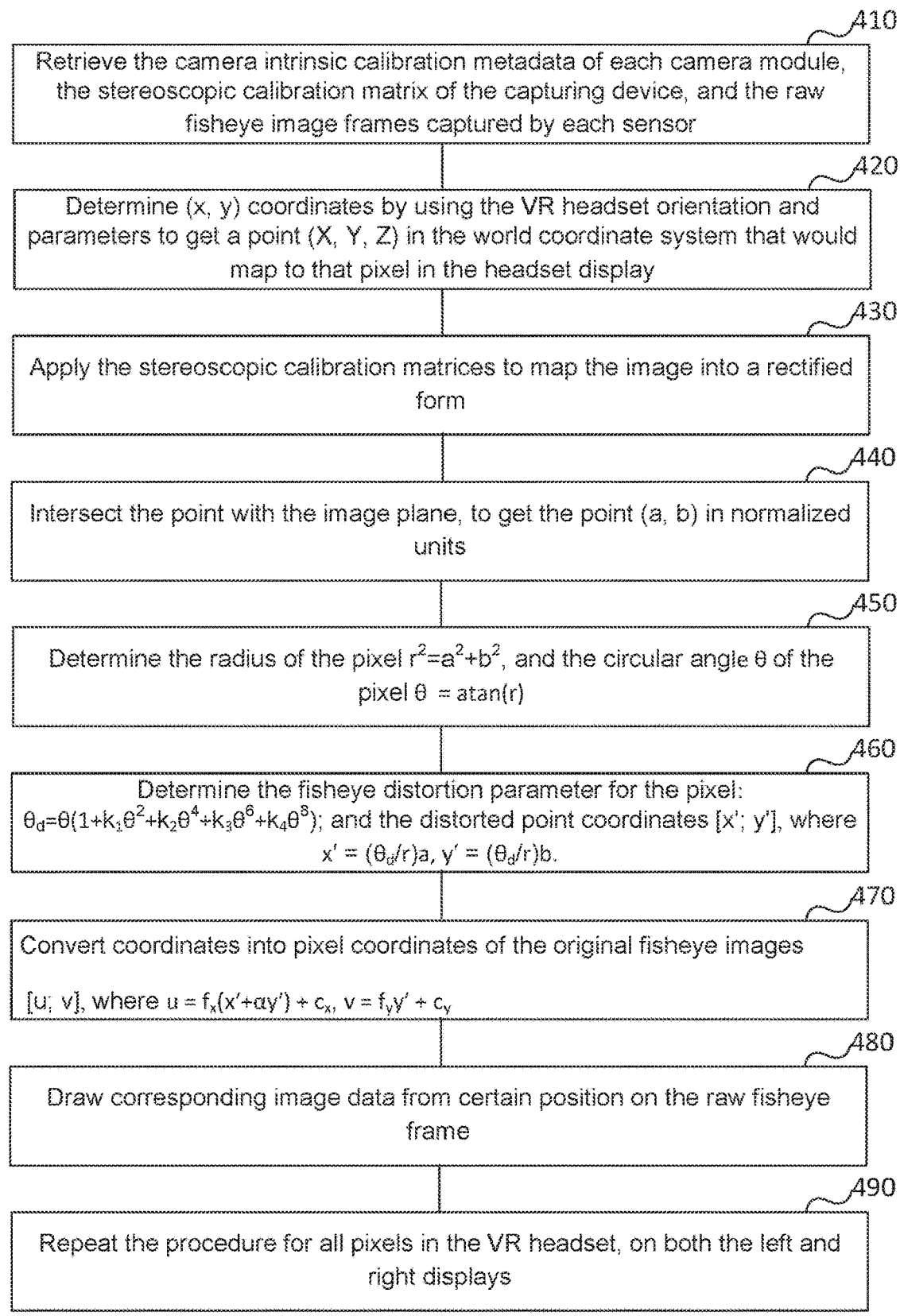
FIG. 4 shows a sample process of playing back a wide angle stereoscopic video using embedded calibration metadata.

FIG. 4 shows a sample process implemented by the PPM 224 for undistorting images captured by camera modules having wide field of view lenses (e.g., fish eye lenses). In the embodiment described by FIG. 4, the undistorted images are displayed on a computer, smart phone, VR headset, or other display device. The pixels projected on the display device may be selected from a group of stitched images showing a scene in a wide FOV or ultra wide FOV.

At block 410, to render a stereoscopic 3D image (or a stereoscopic 3D video frame) onto a computer, smart phone, VR headset, or other playback device, the PPM 224 retrieves the camera intrinsic calibration metadata of each camera module, the stereoscopic calibration matrix of the capturing device, and the raw image frames captured by each sensor. In some embodiments, the PPM 224 may retrieve additional parameters about the playback device, such as gyroscope data describing its current orientation (e.g., represented by an orientation matrix), its field of view, and, if the display device is a VR headset, the offset between the two eye locations of the VR headset.

Rendering stereo image frames is generally done pixel-by-pixel for each display pixel on a computer, smart phone, VR headset or other playback device. In embodiments displaying to a VR headset, the PPM may render each pixel of a stereo image frame displayed on a VR headset (also referred to as display pixels), by identifying one or more corresponding pixels from the captured image frames (also referred to as image pixels or frame pixels). The PPM 224 repeats the pixel-by-pixel matching for both left and right channels until the complete frame is rendered. In some embodiments, the display pixel to image pixel matching is performed by the camera calibration module 221. To correct calibration errors, the camera calibration module 221 may modify the position of one or more display pixels and/or image pixels according to the projection matrices. For each pixel, the PPM 224 can use the current orientation of the VR headset to determine the latitude and longitude of that pixel relative to the center of the VR headset (also referred to as a head center location of the VR headset or other playback device). The orientation can be described using, e.g., an orientation matrix or any equivalent description about the direction.

In some alternative embodiments, the PPM 224 can use a pinhole camera model to intersect the pixel with the image plane, to get the pinhole camera model projected coordinates. Other camera models (e.g., Bouguet's model that accounts for circular distortion caused by the lens system) may also be used to obtain projected coordinates. The PPM 224 can then use the position coordinates of that pixel to map it into the coordinates of the raw image. The pixels of the left display of the VR headset or other playback device are mapped to the left camera module's image (left channel), and the pixels of the right display of VR headset or other playback device are mapped to the right module's captured image (right channel). For example, assuming (a, b) are the (x, y) coordinates of an original pixel, which are mapped onto the image plane, such that (0, 0) is the center of the image. At block 420, the playback process can determine (x, y) coordinates by using the orientation of the VR headset or other playback device and parameters to get a point (X, Y, Z) in the world coordinate system that would map to that pixel in the headset display.

At block 430, the playback process can then apply the calibration matrices to this point, to map the image into a rectified form. In some embodiments, rectification occurs in two steps. First a camera calibration module 221 determines a rotation matrix (R) and a translation vector (T) needed to stereo calibrate a pair of stereo camera modules. Using the rotation matrix and the translation vector, an image rectification module 222 then rectifies the left and right channel frames on the same image plane so that the left and right channel frames appear as though they were captured from the same image plane. To perform rectification, the image rectification module 222 may generate image rectification transform matrices (R1, R2) and image projection matrices (P1, P2). The rectification transform matrices (R1, R2) are responsible for mapping the image planes of the left and right frames to be on the same plane. The image projection matrices (P1, P2) are used to ensure that the left and right images are vertically aligned, and satisfy an epipolar geometry. In some embodiments, the left and right frames can be assigned their own rotation and projection matrices, (e.g., R1, P1 for the right camera module and R2, P2 for the left camera module) respectively, such that when applied the frames will be rectified to a common image plane that is halfway between the left and right planes. Coordinates from the unrectified left frame, for example, can be mapped to the rectified plane by pre-multiplying the coordinate by R*P. Similarly, the inverse of R*P can be used to map points from the rectified frame to an unrectified frame.

At block 440, the PPM 224 can then intersect the point with the image plane, to get the point (a, b) in normalized units. At block 450, the PPM 224 determines the radius of the pixel which can be defined by the equation: $r^2=a^2+b^2$; and the circular angle θ of the pixel which can be defined as: θ=a tan(r).

At block 460, for camera modules having a wide angle fisheye lens, the camera calibration module 221 determines the fisheye distortion parameter for the pixel: $\theta_d=\theta(1+k_1\theta^2+k_2\theta^4+k_3\theta^6+k_4\theta^8)$. The camera calibration module 221 may then provide the fisheye distortion parameter to the PPM 224. Alternatively, the camera calibration module 221 may append the fisheye distortion parameter to a calibration file stored in memory 212 or storage 211. Using the fisheye distortion parameter, the PPM 224 may calculate the distorted point coordinates [x'; y'], where $x'=(\theta_d/r)a$, $y'=(\theta_d/r)b$. Alternatively, the image rectification module 222 may determine the distorted point coordinates and pass them to the PPM 224 directly or write the distorted point coordinates to memory 212 or storage 211.

At block 470, the PPM 224 may convert the distorted point coordinates into pixel coordinates of the original fisheye images. The final pixel coordinates are vector [u; v], where:

$$u=f_x(x'+\alpha y')+c_x$$

$$v=f_y y'+c_y$$

At block 480, with those final pixel coordinates, the PPM 224 can draw corresponding image data from certain position on the raw fisheye frame. The [u, v] coordinates need not be integers. The PPM 224 can use interpolation in the source fisheye image if the [u, v] coordinates are not integers. With those coordinates, the PPM 224 pulls the [u, v] pixel from the fisheye image, and displays that pixel value on the computer, smart phone, VR headset, or other playback device at the original pixel point that is being rendered. At block 490, the PPM 224 repeats this procedure for all pixels in the computer, smart phone, VR headset, or other playback device. In embodiments displaying to a VR headset, the PPM 224, displays pixel values from the right and left fisheye images on the corresponding left and right displays of the VR headset. In addition, the playback process can update the pixels at the refresh rate of the headset. In some embodiments, the above processing implemented in the PPM can be performed efficiently by a graphics processing unit (GPU), though it could also be done on a central processing unit (CPU).

Digital Calibration for Uncalibrated Camera Settings

In some embodiments, camera modules may have a plurality of adjustable camera settings (e.g., baseline, aperture, zoom, focus, iris, relative camera rotation, shutter speed, aspect ratio, resolution, white balance, gain, stabilizer, offset, binning, subsampling, etc.). The number of possible camera setting values and interdependence between two or more camera settings and calibration parameters make manual calibration at every camera setting impractical. To calibrate camera modules at every integer and non-integer camera setting value, a digital calibration process may be implemented in the camera calibration module 221. In one embodiment, the camera calibration module 221 interpolates existing calibration metadata to determine calibration parameters for non-integer and uncalibrated values of one or more camera settings.

Figure 5:
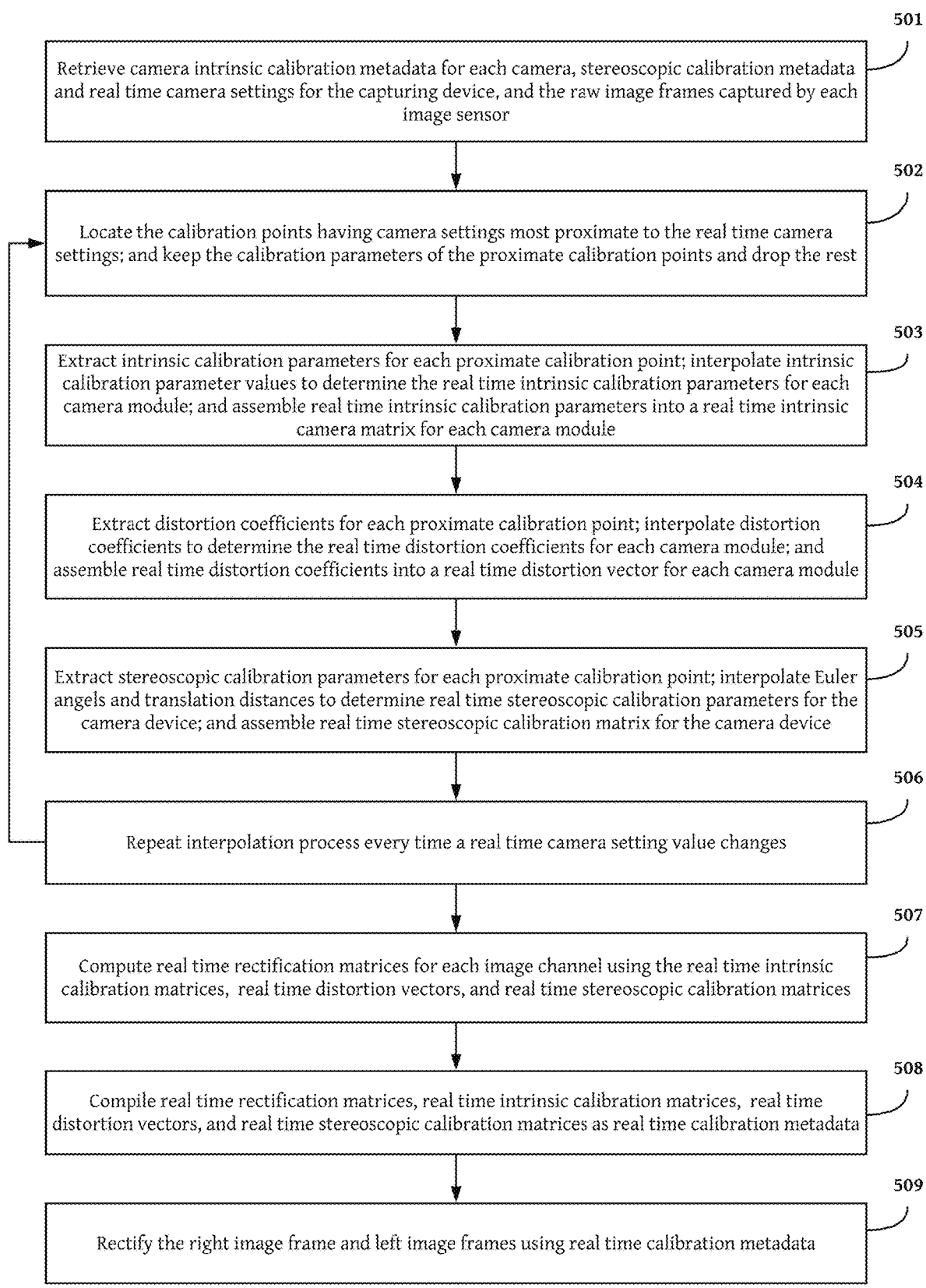
FIG. 5 shows an example process for performing digital calibration of non-integer and uncalibrated capture settings.

FIG. 5 displays an example digital calibration process for calculating calibration parameters for non-integer and uncalibrated camera setting values. The image rectification module 222 can use the real time calibration metadata generated by the digital calibration process to rectify right and left image frames. In some embodiments, the camera calibration module 221 initializes the digital calibration process described below upon receiving a request for digital calibration from one or more of the master camera control unit 107 or salve camera control units.

At Block 501, one or more camera settings for one or more camera modules are set to a non-integer and/or uncalibrated value. Camera setting values that are uncalibrated do not correspond to a calibration point described by calibration parameters measured during a manual calibration process. To begin calculation of calibration parameters for the non-integer and/or uncalibrated camera settings, the camera calibration module 221 retrieves camera intrinsic calibration metadata for each camera module; stereoscopic calibration metadata and current camera settings for the capturing stereo cameras; and the raw image frames captured by the digital camera device.

To select the calibration parameters to use in the digital calibration process, the camera calibration module 221 loads the calibration file(s) of the capturing camera modules in memory. In some embodiments, the calibration file(s) contains calibration metadata for all manually calibrated calibration points. Calibration metadata for each manually calibrated calibration point is associated with unique camera setting values. The calibration metadata and the corresponding camera setting values are loaded into memory as a matrix of intrinsic and extrinsic calibration parameters and a list, array or matrix of camera setting values. The camera calibration module 221 iterates through the camera settings values to select the camera settings that are most proximate to the current camera settings of the digital camera device. Calibration parameters associated with calibration points having the most proximate camera setting values are then extracted from the matrix of intrinsic and extrinsic calibration parameters and stored in memory. All other calibration metadata may be excluded.

In other embodiments, the camera calibration module 221 may assemble a mesh grid by plotting calibration metadata and/or associated camera settings for each calibration point included in a calibration file(s). The mesh grid may be a multi dimensional space with having an axis for each unique calibration parameter and/or camera setting. The calibration points to use in the digital calibration process may be selected by plotting the current digital camera device camera settings in the mesh grid and selecting the calibration points associated with camera settings having the smallest combined Euclidian distance from the current camera settings.

After selecting the calibration points to use in the digital calibration process, the camera calibration module 221 processes calibration metadata associated with the selection of calibration points to generate real time calibration metadata describing a calibration position for non-integer and uncalibrated camera settings. At block 503, the intrinsic calibration parameters (e.g., $f_x$, $f_y$, $c_x$, $c_y$, and $\gamma$) are extracted from the calibration metadata for the left image channel and the right image channel included in the calibration file stored in memory. In some embodiments, intrinsic calibration metadata is extracted from from an intrinsic calibration parameter matrix ($K_1$, $K_2$). With the calibration parameters for the most proximate calibration points, the camera calibration module 221 may then derive the calibration parameters for non-integer and uncalibrated camera settings. In some embodiments, the camera calibration module 221 applies an interpolation function to the intrinsic calibration parameters for calibration points having camera setting values most proximate to the current camera settings to derive the real time calibration parameters that map to the current camera settings. Real time calibration parameters are then assembled into a real time intrinsic camera matrix (e.g., $K_L'$, $K_R'$) for each image channel.

In some embodiments, calibration metadata may include a distortion vector distinct from the intrinsic calibration parameter matrix ($K_1$, $K_2$). At block 504, the camera calibration module 221 generates distortion coefficients for the current camera settings. In some embodiments, the camera calibration module 221 extracts distortion coefficients (e.g., $k_1$, $k_2$, $k_3$) associated with calibration points having camera setting values most proximate to the current camera setting values from a calibration file stored in memory. To calibrate stereo camera systems, distortion coefficients for each stereo camera are extracted. With the extracted distortion coefficients, the camera calibration module 221 then generates distortion coefficients for non-integer and uncalibrated camera settings. In some embodiments, the camera calibration module 221 applies an interpolation function to the distortion coefficients corresponding to calibration points having camera settings most proximate to the current camera settings to derive real time distortion coefficients (e.g., $k_1'$, $k_2'$, $k_3'$) that map to the real time camera settings. The real time distortion coefficients are then assembled into a real time distortion vector ($D_L'$, $D_R'$) for each image channel.

To calibrate stereo camera systems, stereoscopic calibration metadata is derived in conjunction with intrinsic calibration metadata. At block 505, the camera calibration module 221 generates real time stereoscopic calibration parameters for non-integer and uncalibrated current camera settings. To derive real time stereoscopic metadata, the camera calibration module 221 first extracts stereoscopic metadata for one or more calibration points having camera settings most proximate to the current camera settings. In some embodiments, the stereoscopic calibration metadata is extracted from a calibration file stored in memory. From the calibration file, the camera calibration module 221 extracts one or more stereoscopic calibration parameters (e.g., $\theta_x$, $\theta_y$, $\theta_z$, $T_x$, $T_y$, $T_z$) from the rotation (e.g., $R_1$, $R_2$) and translation vectors (e.g., $T_1$, $T_2$) associated with the calibration points having the most proximate camera setting values.

With the extracted stereoscopic calibration parameters, the camera calibration module 221 then generates real time stereoscopic calibration parameters for non-integer and uncalibrated camera settings. In some embodiments, the camera calibration module 221 applies an interpolation function to the extracted stereoscopic calibration parameters to derive real time stereoscopic calibration parameters that map to the current camera settings (e.g., $\theta_x'$, $\theta_y'$, $\theta_z'$, $T_x'$, $T_y'$, $T_z'$). The interpolated Euler angles (e.g., $\theta_x'$, $\theta_y'$, $\theta_z'$) are then used to generate the real time elemental (e.g., Rx', Ry', Rz') and combined (e.g., R') rotation matrices for the camera device. The interpolated translation values (e.g., $T_x'$, $T_y'$, $T_z'$) are also assembled into a real time translation vector (e.g., T). The real time translation vector and rotation matrix are then combined with the real time distortion vectors and real time intrinsic calibration matrices for each image channel to generate real time calibration metadata that maps to a virtual calibration point having the current camera settings.

With the real time calibration metadata from the camera calibration module 221, the image rectification module 222 may then rectify and project images captured using non-integer and uncalibrated camera settings. At block 507, the real time intrinsic calibration metadata and the real time distortion vectors are used to compute the real time rectification matrices (i.e., image rectification transform and image projection matrices) for each image channel. At block 508, the real time intrinsic calibration metadata, real time distortion vectors and real time rectification matrices are complied as real time calibration metadata. At block 509, the image rectification module 222 then uses the real time calibration metadata to rectify the right and left image frames. The image rectification module 222 and/or the PPM 224 may also use real time calibration metadata to project image pixels of the right and left camera modules as display pixels.

In some embodiments, to perform image rectification, the image rectification module 222 applies the right real time intrinsic calibration matrix ($K_R'$), the right real time distortion vector ($D_R'$), the right rectification matrix ($R_2'$) and the right projection matrix ($P_2'$) to a right image frame. The image rectification module 222 then applies the left real time intrinsic calibration matrix ($K_L'$), the left real time distortion vector ($D_R'$), the left rectification matrix ($R_2'$), and the left projection matrix ($P_2'$) to the left image frame to generate a rectified left image.

As described in block 506 and illustrated by the connection between block 506 and block 502, the digital calibration process must be completed every time a camera setting for one or more camera modules is set to a non-integer or uncalibrated value. Once the real time calibration metadata is derived, the rectification steps shown in blocks 507-509 are performed to rectify images captured at non-integer and uncalibrated camera settings.

In some embodiments, to improve the calibration efficiency by reducing the number of digital calibration process performed by the camera calibration module 221, real time calibration metadata generated for non-integer and uncalibrated camera setting values may be appended to the calibration file or saved elsewhere in memory or storage. Appending real time calibration metadata into the calibration file ensures a digital calibration process will only be performed once for each non-integer and uncalibrated camera setting value.

Digital Calibration Implementations

Digital calibration in digital camera device embodiments may be implemented by a series of communications and data transmissions between the camera modules included in the capture array 101 and software modules included in the imaging system 125. In some embodiments, the communications and data transmissions may occur in two routines. One routine moves adjusts the camera settings and requests digital calibration if calibration for one or more camera settings is not included in a calibration file. A second routine performs digital calibration and transmits calibration metadata to the camera modules included in the capture array.

Figure 6:
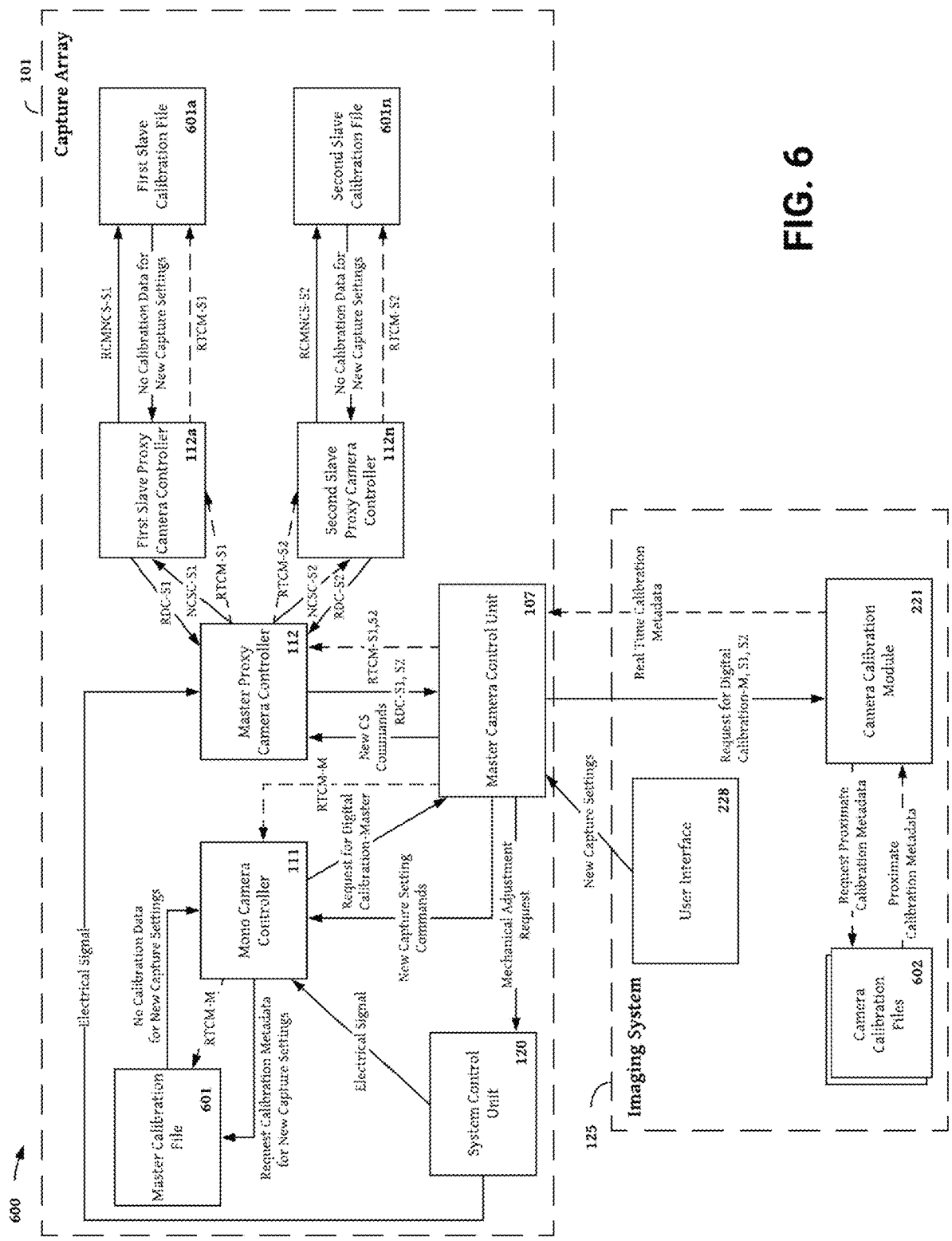
FIG. 6 shows an example communication scheme for generating and distributing real time calibration type dynamic calibration data.

FIG. 6 illustrates one example composition of communication and data transmissions performed by the digital camera device to execute a digital calibration process described herein. In the figure, solid lines represent communications and data transmissions performed to adjust camera settings and request digital calibration data. Dashed lines represent communications and data transmissions performed during digital calibration and transmission of calibration metadata.

In some embodiments, an operator enters new camera settings into a user interface 228 included in an imaging system 125. Camera settings may include baseline, aperture, zoom, focus, iris, relative camera rotation, shutter speed, aspect ratio, resolution, white balance, gain, stabilizer, offset, binning, subsampling, etc. The master camera control unit 107 receives new camera settings and generates new camera setting ("CS") commands instructing one or more camera controllers to configure one or more camera modules to capture content using the new camera settings. In some embodiments, the master camera controller 107 distributes new camera setting commands to the mono camera controller 111 and the master proxy camera controller 112 directly as shown. In other embodiments, the master camera controller 107 may distribute new camera setting commands to a multi camera controller 110 as suggested by the configuration of FIG. 1. The multi camera controller 110 may then transmit the new camera setting commands to the mono camera controller 111 and the master proxy camera controller 112.

If configuring one or more camera modules to have the new camera settings requires changing the position of one or more camera modules or camera module components, the master camera control unit 107 may transmit a mechanical adjustment request to the system control unit 120. The mechanical adjustment request may include instructions for drawing an electrical signal from a battery 122 included in the system control unit 120. The electrical signal may be used to power a motor that converts electrical energy into mechanical energy for moving one or more camera modules or camera module components. In some embodiments, the mechanical adjustment request specifies how much power to supply and a time period for supplying power to one or more motors included in one or more camera modules. Power in the form of an electrical signal may be transmitted over a wired connection to the mono camera controller 111 for distribution to one or more motors included in a master camera module and/or to the master proxy camera controller 112 or slave proxy camera controllers for distribution to one or more motors included in a slave camera module.

New camera settings commands received by the master proxy camera controller 112 are copied and distributed to each slave proxy camera controller included in a camera module having at least one camera setting modified by the new camera settings. In the embodiment shown in FIG. 2, the capture array includes one master camera module and two slave camera modules. Therefore, the master proxy camera controller 112 copies the new camera setting commands and distributes one copy to the first slave proxy camera controller 112a and one copy to a second slave proxy camera controller 112n. In FIG. 6 new camera setting commands for the first slave camera module are abbreviated "NCSC-S1" and new camera setting commands for the second slave camera module are abbreviated "NCSC-S2".

In other embodiments the user interface 228 may allow operators to control the camera settings of each camera module individually. In these embodiments, new camera settings may include a camera module identifier describing the camera module to configure with the new camera settings. New camera settings commands may also include a camera identifier and the master camera control unit 107 or multi camera controller 110 will send only new camera setting commands having a master camera identifier to the mono camera controller 111 and only new camera settings commands having one or more slave camera identifier(s) to the master proxy camera controller 112. In some embodiments, the master proxy camera controller 112 may then separate the new camera setting commands by slave camera identifier and transmit new camera setting commands to only the slave camera module identified by the camera identifier.

In response to receiving the new camera setting commands the mono camera controller 111, the first slave proxy controller 112a, and the second slave proxy controller 112n may attempt to calibrate the master and/or slave camera modules for capture using the new camera settings. To perform calibration, calibration metadata must be obtained from a calibration file and applied to frames captured by each camera module. The mono camera controller 111 may request calibration metadata for new camera settings from the master calibration file 601 and the slave proxy camera controllers may request calibration metadata from the slave calibration files. For non-integer and uncalibrated camera settings, no calibration metadata will exist in the calibration files. If no calibration exists for the new camera settings, the mono camera controller 111 and the slave proxy camera controllers will generate a request for digital calibration. The mono camera controller 111 may transmits a request for digital calibration-master to the camera control unit 107 directly. The first slave proxy camera controller 112a and the second slave proxy camera controller 112n may transmit requests for digital calibration for slave 1 and slave 2 to the master camera control unit 107 through the master proxy camera controller 112. As shown in FIG. 6, a request for digital calibration for the first slave module is abbreviated as "RDC-S1" and a request for digital calibration for the second slave module is abbreviated as "RDC-S2".

In some embodiments, the master camera control unit 107 finishes the camera setting adjustment and digital calibration request routine by transmitting the request(s) for digital calibration from the master, first slave, second slave, etc. camera modules to the camera calibration module 221. With the digital calibration requests, the camera calibration module 221 may request proximate calibration metadata for each requesting camera module from a comprehensive set of calibration files 602. The comprehensive set of calibration files 602 may include a calibration file for every camera module included in the capture array. From the camera calibration files 602, the camera calibration module may extract calibration metadata associated with calibration points for each requesting camera module having camera settings most proximate to the new camera settings. To perform digital calibration processes incorporating interpolation operations, the camera calibration module 221 extracts calibration metadata for at least two calibration points from a calibration file for every requesting camera module. In other examples the camera calibration module 221 may extract calibration metadata for a greater of fewer number of calibration points included in a calibration file for each camera module requesting digital calibration. In other embodiments, calibration metadata for each requesting camera module may be received directly from the camera modules. Calibration metadata may be included in the digital calibration request and may incorporate all calibration metadata or a selection of proximate calibration metadata made by one or more camera controllers.

With the calibration metadata for each requesting camera, the camera calibration module 221 generates real time calibration metadata. In some embodiments, the real time calibration metadata includes calibration parameters describing a calibration point for calibrating a camera module configured with non-integer and/or uncalibrated camera settings. The camera calibration module 221 may generate real time calibration metadata for each camera module requesting digital calibration using the digital calibration process described above in FIG. 5. After generating real time calibration metadata, the camera calibration module 221 distributes real time calibration metadata to the master camera control unit 107.

In some embodiments, the master camera control unit 107 distributes real time calibration metadata for calibrating the master camera module directly to the mono camera controller 111 and real time calibration metadata for calibrating the slave camera modules directly to the master proxy controller 112. In other embodiments a multi camera controller 110 may receive real time calibration metadata from the camera calibration module 221 and/or the master camera control unit 107 and transmit the real time calibration metadata to the mono camera controller 111 and the master proxy camera controller 112. In FIG. 6, real time calibration metadata for the master camera module may be abbreviated as "RTCM-M" and real time calibration metadata for the slave camera modules may be abbreviated as "RTCM-S1, S2".

To distribute real time calibration metadata to the slave camera modules, the master proxy camera controller 112 may copy the real time calibration metadata for the slave camera modules and distribute one copy to the first salve proxy camera controller 112a and one copy to the second proxy camera controller 112n. In other embodiments, the real time calibration metadata may include a camera identifier describing the camera module to calibrate with the real time calibration metadata. The master camera control unit 107 or multi camera controller 110 may send only new real time calibration metadata having a master camera identifier to the mono camera controller 111 real time calibration metadata having one or more slave camera identifier(s) to the master proxy camera controller 112. In some embodiments, the master proxy camera controller 112 may then separate the real time calibration metadata by slave camera identifier and transmit real time calibration metadata to only the slave camera module identified by the camera identifier.

With the real time calibration metadata for the master camera controller, the mono camera controller 111 may calibration the master camera module by applying the real time calibration metadata to image frames captured using non-integer and/or uncalibrated new camera settings. In some embodiments, the mono camera controller 111 may write the real time calibration metadata for the master camera module to the master calibration file 601. Next time the master camera module is configured to have the same non-integer and/or uncalibrated camera settings specified by the new camera settings the mono camera controller 111 will be able to calibrate the master camera module by obtaining the real time calibration metadata, thereby avoiding subsequent execution of the digital calibration process for the same camera settings.

With the real time calibration metadata for the first and second slave camera modules, the first slave proxy camera controller 112a and the second slave proxy camera controller 112n may calibrate the first slave camera module and the second slave camera module respectively by applying the real time calibration metadata to image frames captured using non-integer and/or uncalibrated new camera settings. In some embodiments, the first slave proxy camera controller 112a and the second proxy camera controller 112n may write the real time calibration metadata to the first salve calibration file 601a and the second slave calibration file 601n respectively. Next time the first and/or second slave camera module is configured to have the same non-integer and/or uncalibrated camera settings specified by the new camera settings one or more of the slave camera controllers will be able to calibrate the first and/or second slave camera module by obtaining the real time calibration metadata, thereby avoiding subsequent execution of the digital calibration process for the same camera settings.

Re-Calibration of Calibration Metadata

After initial calibration, calibration metadata for most stereo cameras remains static throughout the life of the device. In some embodiments of the digital camera device including stereo cameras, however, it is desirable to re-calibrate one or more camera modules and/or stereo cameras by updating the calibration metadata. Situations where re-calibration is desirable include after the stereoscopic device is dropped; when one or more components within the device move, age, or wear down; or when internal or external conditions disturb the alignment of one or more stereo camera modules.

Slight changes to the position of one or more lenses, image sensors, or other camera module components can significantly impact the stereoscopic and intrinsic calibration parameters used to rectify and project images captured by stereo cameras included in embodiments of the digital camera device. Therefore, it is desirable to have a digital re-calibration process that modifies calibration metadata in real time to correct for changes in the position of one or more camera module components. By automatically correcting stereoscopic calibration parameters and other calibration metadata over time, the re-calibration processes described herein prolong the usable life of stereo cameras, improve the quality of images and video frames produced by the digital camera device, and enhance the accuracy of depth information generated from view disparity captured by stereo cameras.

It is also desirable to have digital re-calibration processes generating one or more calibration parameters automatically independent of manual calibration or specialized calibration equipment (e.g., a calibration station or fabricated calibration target). In some embodiments, the stereo cameras included in the digital camera device can use a digital re-calibration process to generate calibration metadata out of the box using pre-determined baseline values for camera intrinsic calibration parameters and captured images or video frames. Using image data (e.g., color data, pixel positional information, captured object locations, and/or the view disparity observed in stereoscopic images or video frames) captured by a stereo camera, digital re-calibration processes can establish new and/or optimize baseline calibration metadata in real time. Using the digital re-calibration processes described herein to automatically generate new stereoscopic calibration parameters without manual calibration alleviates dependence on factory calibration of stereoscopic calibration parameters post manufacture, thereby reducing the cost and time of manufacture for stereo cameras.

Additionally, the digital re-calibration processes optimize stereoscopic calibration parameters for actual conditions encountered by users rather than generic factory conditions used in traditional manual calibration methods. By determining and or adjusting calibration metadata during actual device use, the digital re-calibration processes personalize stereo camera functionality and enhance the accuracy of image rectification, the quality of images and videos produced by the camera device, the accuracy of depth information derived from view disparity. Digital re-calibration processes described herein may be implemented in the camera calibration module 221. In some embodiments, to perform re-calibration, the camera calibration module 221 leverages depth and view disparity information generated by the VPM 226.

Stereoscopic calibration parameters depend on precise measurements of relative positions between the left and right camera modules in a stereo camera. The x, y, and z translation parameters and pitch, yaw, and roll rotational angle parameters define the position of each camera module. For accurate calibration, every parameter of the position must be known for each camera module. Over time, the position of one or more camera modules may shift. Position changes that are not accounted for in the calibration process poison rectification by offsetting the alignment of images and videos generated by the left and right camera modules. Poor rectification as a result of inaccurate calibration destroys the quality of projected stereo images and video frames rendered during playback. Depth sensing and other processing tasks performed using view disparity are also inaccurate when performed on poorly rectified images. Additionally, calibration errors may depress user experience by causing screen glare or eye fatigue when users attempt to view images and video frames projected on a display screen using poorly rectified images or video frames.

In mobile embodiments of the digital camera device (e.g., smart phones wearable electronics, laptops, and portable digital cameras), small shifts in the position of one or more embedded camera modules are common. Camera modules incorporated in stationary devices can also move even when used in controlled environments as a result of constant vibration within internal electronics environments and frequent temperature fluctuation of internal device components. Despite the tendency of camera modules to shift position over time and the interdependence between camera position and rectification, no real time method of tracking position changes of stereo camera modules currently exists. Even if there was a way to detect shifts in the position of one or more camera modules, rectification and projection cannot be improved without a mechanism for adjusting calibration parameters to account for movement of one or more camera modules. The digital re-calibration processes described herein improve device manufacture, image quality, depth information accuracy, and user experience by automatically detecting calibration errors and, if necessary, adjusting calibration parameters in real time to account for changes in the position of one or more camera modules or camera module components.

In most instances, stereo camera calibration happens at a factory using a calibration station having a mechanical mechanism that moves multiple cameras to a variety of positions. Each position offers a different perspective of a calibration target allowing devices placed on the calibration station to capture the target from many different perspectives. Stereoscopic calibration parameters derived from these calibration methods are typically stored in a static calibration file that remains unchanged throughout the life of a camera device. Absent methods of detecting when and how to modify calibration parameters within calibration files to correct calibration errors, the lifespan of stereo camera devices is limited. Without a mechanism for automatically adjusting camera calibration parameters to account for shifts in the position of one or more camera modules or camera module components, stereo camera devices must be replaced or manually recalibrated when the position of one or more camera modules changes.

The digital re-calibration processes described herein provide solutions for detecting movement in the position of camera modules within a stereo camera device. The real time digital re-calibration processes also adjust the stereoscopic calibration parameters in real time according to detected position shifts. The digital re-calibration processes functions independently of gyroscopes, accelerometers, or other sensors and hardware for detecting camera motion. Instead, a three stage process is performed on captured image data to generate a calibration profile that tracks device rectification accuracy over time. Stage 1 collects and manipulates a subset of captured image data to prepare image data for further analysis while managing the amount of power, memory, and computational resources consumed by a re-calibration process. Stage 2 filters image data to exclude inaccurate and/or noisy image data from the re-calibration process thereby avoiding unnecessary or erroneous identification of calibration errors and corresponding changes to calibration parameters. Stage 3 identifies calibration errors and determines how to adjust calibration metadata to correct the error.

In some embodiments, the multi-stage process is repeated every time new image data is captured by a stereo camera included in the digital camera device. A record of stereo camera performance including identified calibration errors and re-calibration data describing calibration metadata adjustments may be saved in a calibration profile. Aggregating performance data into calibration profiles and weighting calibration metadata adjustments according to the aggregate performance data ensures re-calibration occurs gradually. Resolving calibration errors over time and gradually improving the accuracy of image rectification avoids abrupt shifts in camera position and significant changes in camera performance, thereby allowing undisturbed use of the device during re-calibration.

In some embodiments, the digital re-calibration process occurs in real time and leverages calibration data derived from images and video frames previously captured by the stereo camera. By using actual image data captured by users instead of calibration target images captured in a controlled factory environment, the digital re-calibration methods create a unique calibration profile for every device that changes over time based on the particular way the device is used. The calibration profile optimizes camera calibration and rectification for scenes frequently captured by the device. By determining and/or optimizing calibration parameters using a downsampled stream of all photos captured by the camera device rather than a small subset of photos captured during a factory calibration process, the digital re-calibration processes optimize calibration parameters for common scene characteristics (e.g., amount of light, color settings, and number of objects) and frequently used camera settings (e.g., focus, baseline, and zoom).

In some embodiments, the digital re-calibration processes are flexible and can be configured to track and adjust any stereoscopic calibration parameter defining camera position including x, y, and z translation and pitch, yaw, and roll rotational angles. To promote compatibility and interoperability with other software included in the digital camera device, embodiments of the camera calibration module 221 may implement execution of one or more digital re-calibration processes on the same processor used to render stereo images. Therefore the auto re-calibration subsystem can work on any digital camera device embodiment that captures and renders stereo images. Processing optimizations (e.g., compression functions, downsampling functions, and hardware acceleration) may also be incorporated into one or more digital re-calibration processes by the camera calibration module 221 to ensure the digital re-calibration processes can run in parallel with sensor control, camera setting adjustment, image capture, rectification, view disparity measurement, depth calculation, depth data processing, 3D content rendering, preview, playback, and other operations performed by the digital camera device. Digital re-calibration processes may be extensible to any stereoscopic device including 3D cameras, stereo cameras, and multi-camera systems including two or more stereo camera pairs. Calibration metadata including re-calibration data generated by an digital re-calibration process may be embedded in captured and/or projected images and/or video frames generated by the digital camera device.

The digital re-calibration processes described herein, determine re-calibration data by comparing image data included in right and left image frames. Digital re-calibration processes may be implemented on the camera calibration module 221. In one some embodiments, the camera calibration module 221 can incorporate view disparity measured by the VPM 226 to generate re-calibration data describing how to correct one or more calibration errors observed in images and video frames generated by a stereo camera device. View disparity measures the difference in position of objects included in images or video frames captured by right and left camera modules included in a stereo camera. Re-calibration data can include one or more calibration parameters and revised position data for one or more image pixels, display pixels, stereo image sections, or stereo image frames.

In some embodiments, the camera calibration module 221 assembles re-calibration data and or image data into a calibration profile describing the performance of a stereo camera device overtime. Calibration profiles are used to re-calibrate the camera modules in real time to improve rectification and projection of images and video frames. Calibration profiles may also include disparity maps for identifying calibration errors and classifying the type of calibration error occurring in a stereo camera device. Additional digital re-calibration processes may incorporate other comparisons between image data included in right and left stereo image frames into a calibration profile, for example, disparity between object size, pixel position, color contrast, and/or image texture.

In some embodiments, the camera calibration module 221 determines re-calibration data by processing image data captured in stereoscopic images and video frames. Image data may include color data, captured object locations, pixel position data, or other aspect included in images and video frames. Re-calibration data may include calibration parameters, color correction instructions, and/or pixel position data. In some embodiments correcting color data, the camera calibration module 221 processes color contrast information included in image data by comparing color contrast information for objects in a recently captured image and/or video frame with color contrast information generated from previously captured images and/or video frames. Image frames including pixels and or groups of pixels (i.e., image sections) having contrast information that significantly varies from previously captured contrast information stored in a calibration file are identified as having a color error. The camera calibration module 221 may generate re-calibration data correcting color errors by scaling the contrast information in the pixels with the color error using a weighted average of the contrast information included in a calibration profile. In some embodiments, the contrast information of the pixels having the color error are scaled by obtaining the product of the contrast information having the color error and the weighted average of contrast information included in a calibration file.

In other embodiments, the camera calibration module 221 corrects distortion and calibration errors using re-calibration data. The camera calibration module 221 may identify a distortion error by selecting pixels including an object known to have a rectangular shape but appears curved in the captured image. To undistort the image, the camera calibration module 221 may generate re-calibration data including a model for correcting distortion. The re-calibration data may then be combined with the distortion coefficients included in the calibration file to obtain updated distortion coefficients. The image rectification module 222 and/or the PPM 224 the project the captured image using the updated distortion coefficients to remove the distortion error.

In other embodiments, the camera calibration module 221 may adjust camera intrinsic calibration metadata and/or stereoscopic calibration metadata in real time using re-calibration data. The camera calibration module 221, may calculate re-calibration data from the view disparity observed for pixels, points, and/or objects included in image frames captured by the left and right camera modules. In this example, vertical, horizontal, and/or rotational view disparity of captured objects may be incorporated in the calibration profile and updated in real time. Calibration metadata including one or more stereoscopic calibration parameters may then be adjusted according to the view disparity data recorded in the calibration profile.

Figure 7:
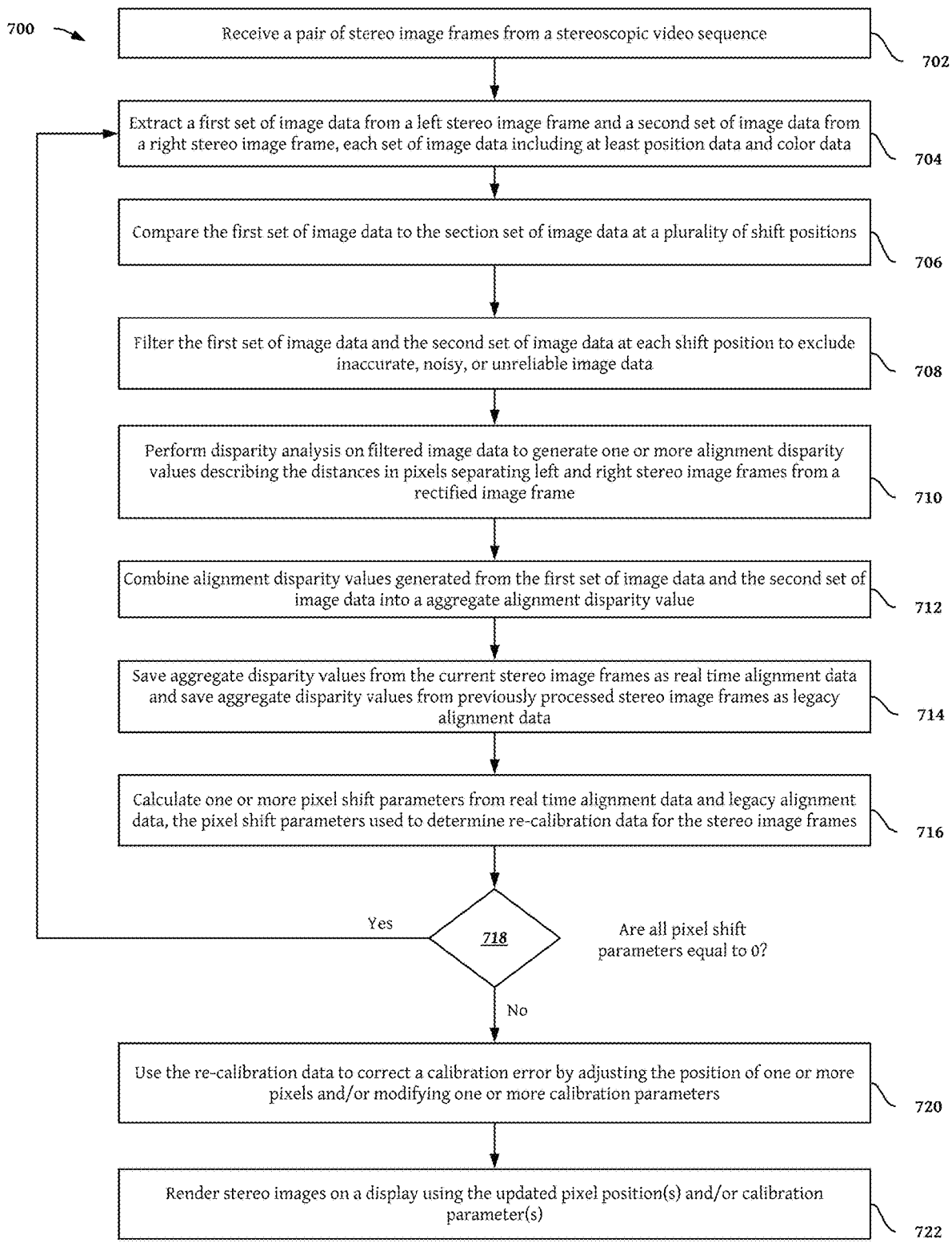
FIG. 7 shows an example process for performing re-calibration for one or more camera modules.

FIG. 7 illustrates one non-limiting example of a digital re-calibration method 700 implemented in a camera calibration module 221. In some embodiments, camera modules included in a stereo camera are first calibrated using a manual calibration process. The manual calibration process may generate calibration metadata included in a calibration file. When powering up the stereo camera, the calibration metadata is loaded from the calibration file to configure the camera for capture.

At step 702, to begin re-calibration, the camera calibration module 221 receives stereo image frames captured by calibrated camera modules. The stereo image frames may refer to static images and/or video frames included in a captured video sequence. In one embodiment, the re-calibration subsystem receives a pair of stereo image frames extracted from a stereoscopic video sequence. In some embodiments, the camera calibration module 221 receives a constant stream of stereo images during stereo camera capture. The rate the camera calibration module receives stereo images may be a factor of the stereo camera's frame rate of capture. In some embodiments, the camera calibration module 221 receives one new frame per second of capture at a frame rate of 30 frames per second. Therefore, the rate of receipt by the camera calibration module 221 is downsampled by a factor of 30 relative to capture frame rate of the stereo camera. In other examples, the rate of receipt for new frames by the camera calibration module 221 is equal to the capture frame rate. In other embodiments, the rate of receipt is any downsampled factor of the capturing frame rate other than 30.

In some embodiments, the image signal processing module 225 and/or the camera calibration module 221 may perform pre-processing tasks on the stereo image frames. In some embodiments, pre-processing includes dividing the stereo image frames into a plurality of image sections with each image section including a group of image pixels comprising the stereo image frame. In other embodiments, pre-processing includes normalizing at least one of color data or position data included in image data or one or more calibration parameters included in calibration metadata.

At step 704, the camera calibration module 221 then extracts image data from each received stereo image frame. In some embodiments, the image data may include at least position data and color data for every pixel included in the left and right image frame captured by the stereo camera. In embodiments wherein the stereo image frames are processed by dividing the image frames into a plurality of image sections, the camera calibration module 221 performs re-calibration methods on each image section included in the image frame. Alternatively, as described in FIG. 7, the camera calibration module 221 may perform re-calibration methods on entire image frames.

To identify calibration errors, at step 706, the camera calibration module 221 compares the view disparity between the left and right image frames at multiple calibration positions. In some embodiments, the camera calibration module 221 represents multiple calibration positions using shift positions created by incrementally shifting the first image frame relative a second image frame along a calibration axis. Each shift position represents the image frames projected using a different value for one or more calibration settings. Therefore at each shift position, the alignment between color data included in the first stereo image and the second stereo image is different.

In some embodiments, the camera calibration module 221 modifies one or more coordinates of the position data included in the first set of image data to shift the alignment of color data included in the right and left image frames to a plurality of shift positions. Numerous shift functions may be used to create the shift positions. Each shift function operates on one or more coordinates of position data and/or stereoscopic calibration parameters to shift the alignment of color data in defined pixel increments. Depending on the position data coordinates and/or stereoscopic calibration parameters modified by the shift function, image data included in the image frames is manipulated in a variety of ways including horizontal shifts, vertical shifts, rotational shifts, and scalar shifts. Rotational shifts may occur along pitch (i.e., clockwise, counterclockwise), yaw (i.e., into and out of the page around a horizontal axis), and roll (i.e., into and out of the page around a vertical axis) rotational axes.

For stereo camera embodiments having side by side orientation (i.e., separated by a Euclidian distance in a lateral or longitudinal plane), modifying the position data may shift the vertical alignment of color data included in a stereo image frame relative to color data included in a second stereo image frame. Shift positions created by modifying the vertical alignment of color data simulate changing the pitch rotation angle included in a rotation matrix and/or the vertical translation component of the translation vector. For stereo camera embodiments having a stacked orientation with one camera module positioned (i.e., separated by a Euclidian distance in a vertical or latitudinal plane), modifying the position data may shift the horizontal alignment of color data included in a stereo image frame relative to color data included in a second stereo image frame. Shift positions created by modifying the horizontal alignment of color data simulate changing the yaw rotation angle included in a rotation matrix and/or the horizontal translation component of the translation vector. In other embodiments, the camera calibration module 221 modifies one or more angles of rotation included in a rotation matrix to incrementally shift the alignment of color data included in a stereo image frame relative to color data included in a second stereo image frame along one or more rotational axes (e.g., pitch, yaw, or roll). Shift positions created by modifying angles of rotation simulate changing the pitch, yaw, or roll rotation angles.

To exclude inaccurate, noisy, and unreliable image data from the digital re-calibration process, the camera calibration module 221 filters image data included in the first and second image frames at each shift position. At step 708, the camera calibration module 221 may filter the image data by applying one or more filtering functions. In some embodiments, filtering at each shift position is necessary because operations performed by shift functions on image data may change one or more components of the image data and/or the relationship between a first set of image data (e.g., image data included in a right stereo image frame) and a second set of image data (e.g., image data included in a left stereo image frame). Example filtering functions may include correlation filtering functions, standard deviation filtering functions, depth filtering functions, and other filtering functions leveraging statistical or algorithmic comparisons between two or more sets of image data. Disparity analysis is performed on image data that passes the filtering process. Image data that fails the filtering process is excluded form further analysis.

In some embodiments, the camera calibration module 221 implements a filtering sequence including at least one of a correlation filtering function, a standard deviation filtering function and a depth filtering function. The correlation filtering function assess the similarity of image data included in right and left image sections at each shift position to ensure the stereo camera system was functioning properly when generating image data used for re-calibration. The standard deviation filtering function rejects image sections including very close, flat, and/or featureless aspects of a scene (e.g., a close object, solid color wall, road, or sky) by excluding image data without a threshold level of variance. The depth filtering function excludes image data incorporating close objects because extreme horizontal and/or vertical shifts are applied to this image data elsewhere in projection process interfere with digital re-calibration.

In some embodiments, the camera calibration module 221 applies a correlation filtering function by calculating a correlation coefficient (e.g., an r value) for image data included in a right image frame and image data included in a left image frame at each shift position. The correlation coefficient (e.g., an r value) generated by the correlation filtering functions describes the relatedness between the two input variables (i.e., color vectors for right and left image sections). Absent problems during capture, image data included in the right and left image frames is largely the same with only small differences attributable to minor calibration errors and/or view disparity created by the difference in position of the right and left camera modules. Therefore, the camera calibration module 221 accepts image data generating correlation coefficients close to 1 (e.g., r values between 0.8 and 1) as valid image data. Whereas, the camera calibration module 221 excludes image data generating low correlation coefficients (e.g., r values that are less than 0.8) as noisy, inaccurate, or unreliable image data.

In some embodiments, the camera calibration module 221 applies a standard deviation filtering function by calculating the standard deviation of image data included in one pixel with a right or left image section relative to an average of the image data included in all pixels within the right or left image frame. Standard deviation quantifies the amount of variation or dispersion in a set of values. A low standard deviation (e.g., below 50) indicates the data points are close to the mean (i.e., the expected value) of the set. A high standard deviation (e.g., greater than 100) indicates the data points are spread out over a wider range of values.

In some embodiments, the standard deviation filtering function excludes image data including close, flat, and/or featureless aspects. Image data with close, flat, and/or featureless objects have very high correlation coefficients at every shift position because the color data included in the image sections is identical at each shift position. Therefore, this image data will pass a correlation filtering function. Disparity analysis conducted on this image data, however, is misleading because inaccurate disparity values receive the same high correlation coefficient as accurate disparity values. The standard deviation filtering function catches image data including close, flat, and/or featureless objects because the color data included in this image data remains constant at every shift position containing the same featureless aspect. Therefore, image data including close, flat, and featureless objects has a very low standard deviation. Rejecting image data having a low standard deviation (e.g., 25 or fewer), thereby excludes image sections including close, flat, and/or featureless aspects.

In some embodiments, the camera calibration module 221 applies a depth filtering function by calculating the distance of an object included in image data. Only image sections including objects that are an infinite distance away from the stereo camera module can provide a true measure of view disparity for the right and left camera modules attributable to calibration errors. Image sections containing nearer objects positioned in front of the zero disparity plane and captured in different pixels are generated using horizontal and/or vertical shifts that account for the different positions of the right and left camera modules. The closer an object is to a capturing stereo camera module, the greater the horizontal and/or vertical shifts that must be applied to render stereoscopic right and left views of a scene. For close objects, the magnitude of the shifts required to render the right and left views far exceeds the magnitude of any misalignment due to calibration error. As a result, it is difficult to identify and/or separate shifts due to calibration error from shifts needed to generate left and right views of a scene including close objects. Additionally, very close objects may be difficult to capture clearly infocus thereby increasing the likelihood performing disparity analysis on image data including close objects will interfere with re-calibration by providing inaccurate adjustments to one or more calibration parameters. Therefore, it is desirable to filter out image sections including close objects.

In some embodiments, the camera calibration module 221 performs a depth filtering function by determining a depth metric for each set of image data then comparing the depth metrics to a depth filtering threshold. A depth metric (e.g., depth maps, disparity maps, distance units, point clouds) describes the distance between the stereo camera device and the objects included in image data. In some embodiments depth metrics are generated by the VPM 226 and passed to the camera calibration module 221 or written to memory or storage. In other embodiments, a depth metric is equivalent to 1/the horizontal shift (in pixels) applied by the 3D rendering engine 223 and/or the PPM 224 to render images captured by the stereo camera module that include close objects. Possible depth filtering thresholds used by the camera calibration module 221 to evaluate depth metrics include 20 cm for camera modules having small zoom ranges and short focal lengths and 1 m for camera modules having moderate to large zoom ranges and average to long focal lengths.

In some embodiments, the camera calibration module 221 applies three or more filtering functions to image data. For filtering routines including three or more filtering layers, image data may be required to pass at least three filtering thresholds to be incorporated into a disparity analysis. Alternatively, image data may only need to pass a majority or at least one of the three filtering thresholds (e.g., 2 of 3 or 1 of 3). In embodiments where image data is required to meet or exceed a subset of the filtering functions, the applied filtering functions may be the same or different (e.g., image data must pass both the depth filtering function and the standard deviation filtering function; image sections must pass the correlation filtering function and at least one other filtering function; or image sections must pass and any two filtering functions).

In some embodiments, the camera calibration module may implement one or more filtering algorithms to programmatically provide specific filtering rules. The filtering algorithms may also be programmed to dynamically vary the filtering rules based on one or more parameters of the image data (e.g., contrast; textures; disparity; and/or amount of horizontal shift, vertical shift, or rotational shift) or digital re-calibration process (e.g., desired filtering accuracy, available power or computational resources, and/or frame down-sampling rate). Additionally, one or more filtering algorithms may automatically detect the optimal filtering rules according to one or more image quality functions, stereoscopic device performance algorithms, and/or machine learning models.

Disparity analysis is the process of determining the distance and/or direction separating the right and left image frames from a rectified image plane. As shown in box 710, one example disparity analysis generates one or more alignment disparity values describing the distance in pixels separating the left and right image frames from a rectified image frame. In some embodiments, the alignment disparity values are associated with a direction (e.g., left, right, up, down, diagonal, vertical, horizontal, lateral, longitudinal, latitudinal, etc.) or a calibration axis (e.g., pitch rotation axis, yaw rotation axis, roll rotation axis, etc.) describing how to apply the alignment disparity value in order to correct a calibration error. The camera calibration module 221 may generate unique alignment disparity values for the right and left image frames. Alternatively, the camera calibration module 221 may generate unique alignment disparity values for every pixel and/or image section included in the right and left image frames.

In some embodiments, the camera calibration module 221 performs disparity analysis on image data at every shift position. Therefore, alignment disparity values describe the distance and/or direction separating a stereo image frame from a rectified image frame at each shift position including image data passing the filtering process described above. In this way, the shift positions may act as test re-calibration positions revealing the alignment of image data at several shift increments. Typically, the number of pixels of shift observed in the shift position having the smallest alignment disparity value is proximate to the pixel shift parameter needed to correct a calibration error.

As described herein, the term "rectified image frame" refers to a rectified form of a left stereo image frame and/or a right stereo image frame wherein the left and right stereo image frames appear as though the frames were captured from the same image plane and are oriented in an alignment that satisfies an epipolar geometry (i.e., allows a series of straight epipolar lines to be drawn across the right and left stereo image frames). To satisfy an epipolar geometry, the right and left stereo image frames may be aligned in vertical, horizontal, rotational, and/or scalar directions. In most examples, a rotation matrix is responsible for mapping the image planes of the left and right frames to the common rectification image plane. One or more translation vectors are used to ensure that the left and right images are vertically and/or horizontally aligned and satisfy an epipolar geometry.

In embodiments wherein the camera calibration module 221 performs disparity analysis on stereo images having two or more shift positions, more than one alignment disparity value is generated for each pair of image frames. At block 712, the camera calibration module 221 may apply an alignment disparity value aggregation function to combine disparity values generated for each shift position into an aggregate disparity value. In other embodiments, the camera calibration module 221 performs disparity analysis on every pixel and/or image section included in a right and left image. After combining the alignment disparity values at every shift position for each pixel and/or image section, the camera calibration module 221 may use the aggregate alignment disparity values to generate an alignment disparity map. The alignment disparity map may display each calculated aggregate alignment disparity value over the pixel or image section containing the image data processed to generate the aggregate alignment disparity value.

In some embodiments, the camera calibration module 221 performs programmatic analysis on the patterns of magnitude, direction, position, and other parameters of the aggregate alignment disparity values included in the alignment disparity maps to identify calibration errors occurring in the stereo camera system. The camera calibration module 221 may also perform calibration error classification using a calibration error model implementing one or more calibration error classification algorithms. Non-limiting example calibration error algorithms include recognizing alignment disparity maps containing a uniform vertical disparity having a similar magnitude and direction throughout all image sections as having a vertical calibration error and recognizing disparity maps containing a uniform horizontal disparity having a similar magnitude and direction throughout all image sections as having a horizontal calibration error.

Other calibration error classification algorithms implemented in the camera calibration module 221 may recognize disparity maps including opposite corners having alignment disparities with opposing directions (e.g., a cluster of negative alignment disparity values in a top left corner and a cluster of positive alignment disparity values in a bottom right corner) with a section of zero alignment disparity in the center region as having a first type of rotation calibration error; alignment disparity maps having an increasing or decreasing gradient of negative or positive alignment disparities at two or more edges of the alignment disparity map (e.g., alignment disparity values along a left edge increasing from −5 in the top corner to −1 in a middle or lower edge section and alignment disparity values along a right edge decreasing from +5 in the top corner to +1 in a middle section as having a second type of rotation calibration error; recognize alignment disparity maps having a gradient of alignment disparity values increasing or decreasing in a diagonal, vertical, or horizontal direction across all image sections (e.g., alignment disparity values that gradually decrease in a horizontal direction from +5 on the left side of the alignment disparity map to 0 on the right side of the alignment disparity map) as having a first type of scale calibration error; and recognize maps having positive or negative alignment disparity values along one or more edges coupled with zero alignment disparity sections in the middle and/or other irregular patterns of alignment disparity values included in the alignment disparity map as having a second type of scale calibration error.

In some embodiments, the camera calibration module 221 performs the re-calibration process continuously on image frames as they are captured. To track performance of a stereo camera, image data and alignment disparity values for captured image frames may be stored in a calibration profile. At block 714, the camera calibration module 221 assembles a calibration profile by saving aggregate alignment disparity values, raw alignment disparity values, alignment disparity maps, and/or image data generated from the most recently processed pair of image frames as real time alignment data and aggregate alignment disparity values, raw alignment disparity values, alignment disparity maps, and/or image data generated from previously processed images as legacy alignment data.

With the calibration profile including real time alignment data and legacy alignment data, the camera calibration module 221 calculates pixel shift parameters at step 716. In some embodiments, the pixel shift parameters describe how to modify one or more image sections or image frames to correct calibration errors. The camera calibration module 221 may calculate pixel shift parameters by obtaining a weighted sum of the alignment disparity values included in the legacy alignment data and the alignment disparity values included in the real time alignment data. In some embodiments, the camera calibration module 221 calculates a pixel shift parameter by applying a weight of 0.7 to the legacy alignment data and a weight of 0.3 to the real time alignment data and obtaining the sum of the two weighted values. Depending on the desired rate of re-calibration, the weights applied to legacy alignment data and real time alignment data may be different. For example, to accelerate the rate of re-calibration, the weight applied to legacy alignment data may be lowered (e.g., to 0.5, 0.3, 0.1, etc.) and the weight applied to the real time alignment data may be increased (e.g., to 0.5, 0.7, 0.9, etc.).

In some embodiments, the pixel shift parameters reveal whether or not the stereo camera needs re-calibration. At decision point 718, if the calculated pixel shift parameters are equal to zero, the calibration camera module 221 will repeat the above process of extracting image data, comparing image data at shift positions, filtering image data, and performing disparity analysis for the next set of pixels or images. Alternatively, if one or more pixel shift parameter(s) are not equal to zero, a calibration error is detected and the camera calibration module 221 corrects the calibration error using the pixel shift parameters.

At step 720, the camera calibration module 221 corrects calibration errors by adjusting the position of one or more pixels included in one or more stereo image frames. The proper adjustment to apply to image frames to correct calibration errors may be described by re-calibration data. In some embodiments, the camera calibration module 221 determines re-calibration data for the image frame using the pixel shift parameters. Re-calibration data may include modified calibration parameters and/or revised pixel position data. To generate pixel position type re-calibration data, the camera calibration module 221 may extract one or more location coordinates from an image frame. In some embodiments, the location coordinates describe mappings between image pixels and display pixels in terms of pixels. For example, a pixel may have pixel position data comprising the location coordinates: 100, 500. In this example, the location coordinates describe the location of the image pixel on the display screen in pixels with the origin in the lower left corner of the screen (e.g., 100 pixels right of the lower left corner and 500 pixels up from the bottom). To correct calibration errors, pixel position type re-calibration data may indicate changes to the location coordinates or provide substitute location coordinates.

In one example, a pixel shift parameter of +6 vertical is determined from disparity analysis. To correct the calibration error, the camera calibration module 221 generates pixel position type re-calibration data adjusting the alignment of the stereo image frame pixels in a vertical direction. In some embodiments, only one stereo image frame may move to correct the calibration error. In other embodiments, both stereo image frames may move to correct the calibration error. To make the +6 vertical adjustment by only moving on frame, the camera calibration module 221 increases the vertical location coordinate of every pixel in one stereo image frame by 6 pixels. For example, the pixel having pixel position data comprising location coordinates 100, 500 will be changed to 100, 506 by the camera calibration module 221. In this example the pixel position type re-calibration data for the first image frame may be expressed as changes to the original pixel position coordinates (e.g., 000, 006), new pixel position coordinates (e.g., 100, 506), and/or a normalized or angular variation of the changes to the original or new coordinates. Angular pixel position coordinates are expressed in degrees of field of view and are calculated by obtaining the product of an angular conversion factor and a pixel position coordinate. In some embodiments, an angular conversion factor ($AC_y$, $AC_x$) is calculated in each dimension where:

$$AC_y = \theta_{fov\text{-}y}/PD_y$$

$$AC_x = \theta_{fov\text{-}x}/PD_x$$

$\theta_{fov\text{-}y}$ is vertical field of view
$\theta_{fov\text{-}x}$ is horizontal field of view
$PD_x$ is horizontal pixel dimension
$PD_y$ is vertical pixel dimension With the angular conversion factor, the pixel position coordinates may then be converted into angular pixel position coordinates by scaling a horizontal pixel dimension by a horizontal angular conversion factor and scaling a vertical pixel dimension by a vertical angular conversion factor.

In other embodiments, the camera calibration module 221 may correct calibration errors by moving both stereo image frames. For example, to make the +6 vertical adjustment, the camera calibration module 221 increases the vertical location coordinate of the pixel position data for pixels in one image frame by 3 pixels and decreases the vertical location coordinate of the pixel position data for pixels in a second image frame by 3 pixels. Specifically, for the example pixel at 100, 500 the camera calibration module 221 changes the pixel position coordinates of the pixel in the first image to 100, 503 and the pixel position coordinates of the corresponding pixel in the second image to 100, 497. Similar to embodiments changing pixel position coordinates of one image frame, the pixel position type re-calibration data for varying the position of two image frames may be expressed as changes to the original pixel position coordinates (e.g., [000, 003], [000, 00-3]), new pixel position coordinates (e.g., [100, 503], [100, 497]), and/or a normalized or angular variation of the changes to the original or new coordinates.

In other embodiments, the camera calibration module 221 may use the pixel shift parameters to calculate calibration type re-calibration data. To correct calibration errors, the camera calibration module may modify one or more calibration parameters for one or more capturing camera modules according to the calibration type re-calibration data. In some embodiments, calibration type re-calibration data includes new calibration parameters or adjustments to one or more existing calibration parameters. In some embodiments, the camera calibration module 221 adjusts one or more stereoscopic calibration parameters (e.g., a component of a translation vector or angle embedded in a rotation matrix).

Calibration type re-calibration data including adjustments to one or more components of a translation vector may be obtained by applying a pixel shift parameter directly to the translation vector by obtaining the sum of a pixel shift parameter (e.g., +6 pixels vertically) and the corresponding translation vector component (the vertical component of the translation vector). Calibration type re-calibration data for varying the position of one or more image frames may be expressed as changes to the original calibration parameters, new calibration parameters, and/or a normalized or angular variation of the changes to the original or new calibration parameters.

In other embodiments, calibration type re-calibration may include adjustments to one or more Euler angles included in a rotation matrix. To correct calibration errors by adjusting one or more Euler angles, the camera calibration module 221 converts a pixel shift parameter into a rotation shift value by obtaining a rotational conversion factor and scaling the pixel shift parameter by the rotational conversion factor. In some embodiments, the rotational conversion factor ($RC_x$, $RC_y$, $RC_z$) is calculated in each dimension where:

$$RC_x = \theta_{Ex}/PD_x$$

$$RC_y = \theta_{Ey}/PD_y$$

$$RC_z = \theta_{Ez}/PD_z$$

$\theta_{Ex}$ = yaw Euler Angle
$\theta_{Ey}$ = pitch Euler Angle
$\theta_{Ez}$ = roll Euler Angle
$PD_x$ is horizontal pixel dimension
$PD_y$ is vertical pixel dimension
$PD_z$ is 1

With the rotational conversion factor, the pixel shift parameter may then be converted into a rotational shift parameter by scaling a horizontal pixel shift parameter by a horizontal rotational conversion factor $RC_x$ and a vertical pixel shift parameter by a vertical rotational conversion factor $RC_y$. To correct calibration errors using calibration type re-calibration data comprising rotational shift parameters, the camera calibration module 221 extracts the original Euler angle form a rotation matrix and applies a rotational shift parameter to a corresponding Euler angle by obtaining the sum of the shift parameter and the Euler angle. For example, obtaining the sum of a horizontal rotation shift parameter and a yaw Euler angle. In other embodiments, calibration type re-calibration data may include a substitute Euler angle to replace the original Euler angle extracted from the rotation matrix. With the modified Euler angles, the camera calibration module 221 then calculates an updated rotation matrix using the modified Euler angles generated from the re-calibration data.

To project corrected images, at step 722 the RSS 224 renders image pixels from the stereo image frames on a display using the updated pixel position coordinate(s) and/or calibration parameter(s) included in the re-calibration data. In embodiments having calibration type re-calibration data comprising modified Euler angles incorporated into an updated rotation matrix and or updated translation vectors, the image rectification module 222 generates re-calibration rectification and projection matrices using the updated rotation matrix and or translation vectors. The RSS 224 then projects the image pixels as display pixels using the re-calibration projection matrices. In embodiments having position type re-calibration data, the RSS 224 projects image pixels as display pixels using the new pixel position coordinates.

Re-Calibration Implementations

Re-calibration in digital camera device embodiments may be implemented by a series of communications and data transmissions between the camera modules included in the capture array 101 and software modules included in the imaging system 125. In some embodiments, the communications and data transmissions may occur in two routines. One routine determines projection and capture re-calibration data using depth information generated from disparity analysis performed on captured image frames. A second routine distributes capture re-calibration data to camera modules to correct calibration errors that occur during capture of image and video content.

Figure 8:
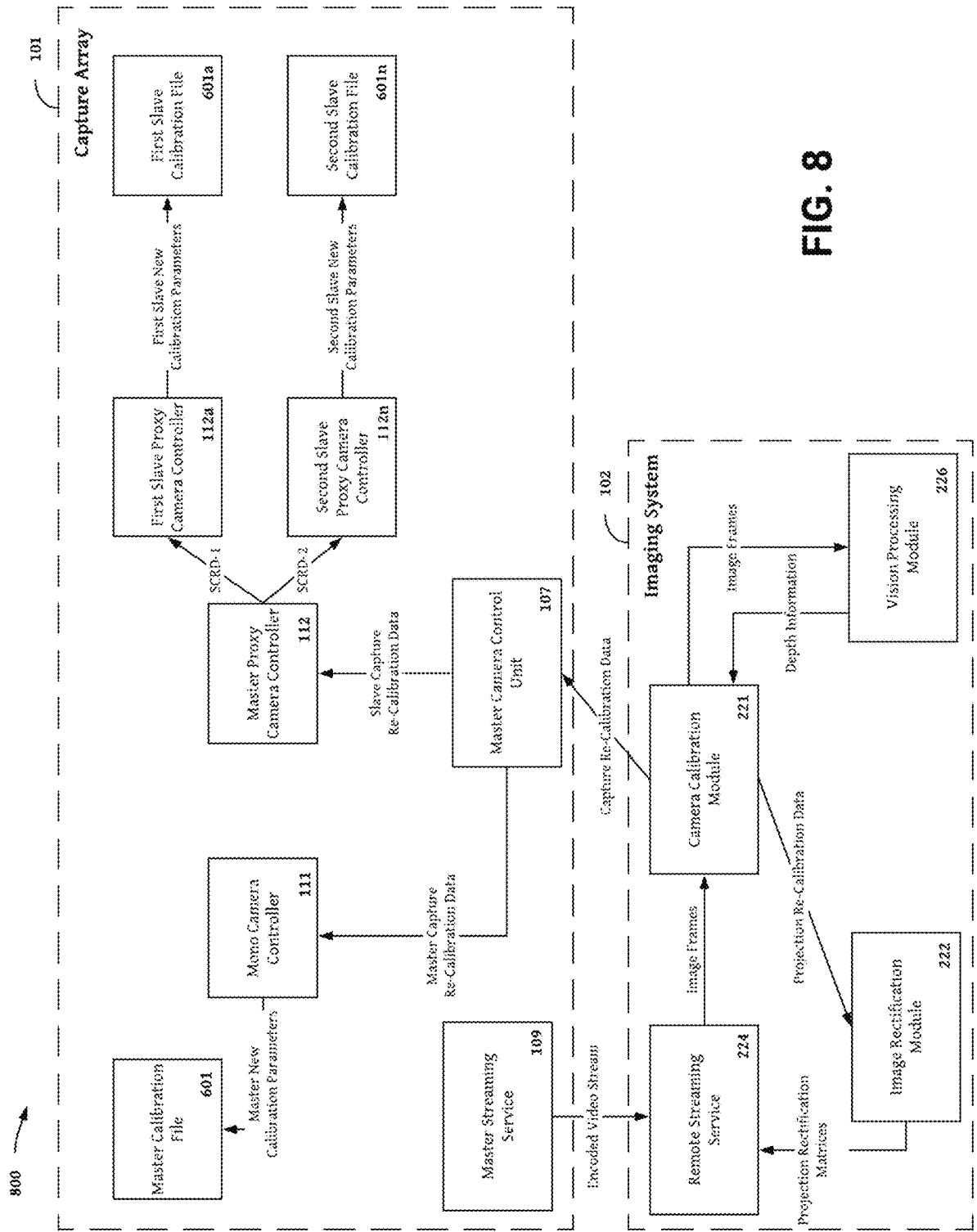
FIG. 8 shows an example communication scheme for generating and distributing re-calibration data type dynamic calibration data.

FIG. 8 illustrates one example composition of communication and data transmissions performed by the digital camera device to execute a re-calibration process described herein. In the figure, the imaging system 102 generates re-calibration data using images and video frames captured by camera modules in the capture array. Projection re-calibration data is then distributed to the image rectification module and remote streaming service to correct calibration errors that occur during projection of image pixels as display pixels. Capture re-calibration data is then distributed to the camera modules included in the capture array to correct calibration errors that occur during capture.

In some embodiments, the camera calibration module 221 receives image frames from a remote streaming service 224. To generate re-calibration data from video streams, the remote steaming service 224 may include a streaming client extracting image frames included in an encoded video stream received from a master streaming service 109 within the master camera module. The streaming client may extract image frames from a video stream at a specific frame rate (e.g., 1 frame per second). In some embodiments, the frame rate is variable and may be configured by an operator by changing one or more re-calibration settings within the digital camera device, imaging system, and/or one or more components thereof. The frame rate for image frame extraction may not exceed the frame rate of capture (e.g., 30 frames per second) by the camera modules. In other embodiments, re-calibration data may be generated from images provided to the remote streaming service 224 by the master streaming service 109. Images and video streams received by the camera calibration module 221 may include stereoscopic image and video streams including at least two stereo image frames from a stereoscopic camera included in the digital camera device.

The camera calibration module 221 processes image frames received from the remote streaming service 224 by performing the re-calibration methods described above. In some embodiments, the camera calibration module 221 extracts image data from each of the stereo image frames; shifts the image data to a plurality of shift positions; compares image data at the plurality of shift positions; filters the image data to exclude inaccurate, noisy, or unreliable image data; performs disparity analysis on filtered image data to generate alignment disparity values; and aggregates alignment disparity values to generate re-calibration data. To augment one or more steps of the re-calibration process, the camera calibration module 221 may also transfer image frames to the VPM 226 for depth processing.

In some embodiments, depth information generated by the VPM 226 filters out image data including close objects. In other embodiments, the VPM 226 may generate a disparity map to augment or verify disparity analysis performed by the camera calibration module. The VPM 226 may also produce one or more depth metrics describing depth information produced from image frames. Depth metrics may be provided to the camera calibration module 221 to enhance the accuracy, speed, and/or efficiency of the re-calibration process. Example depth metrics include depth resolution, course range resolution, and depth confidence metrics. Depth resolution describes the resolution of disparity and/or depth maps generated by the VPM 226. Course range resolution and aggregate course range resolution describe the accuracy of disparity and or depth maps for one or more pixels or the entire image frame respectively. Depth confidence metrics including standard deviation and correlation coefficients describe a level of certainty associated with depth information generated by the VPM 226.

In one example, the camera calibration module 221 uses depth confidence metrics and depth information provided by the VPM 226 to filter image data. Depth information generated by the VPM 226 may be used to detect image frames including objects within 1 m of the capturing device. Depth confidence metrics may be used to tune the depth filter by excluding frames generating depth information below a confidence metric threshold. Alternatively, the camera calibration module 221 may conduct disparity analysis on image frames including objects within 1 m of the capturing device if the confidence metric associated with the depth information is below a confidence metric threshold. In some embodiments, the confidence metric threshold is adjustable by an operator changing one or more settings of the digital camera device, the imaging system, and/or one or more components thereof.

Re-calibration data generated by the camera calibration module 221 may be divided into two categories. Projection re-calibration data corrects calibration errors occurring as image pixels are mapped to display pixels during projection. Capture re-calibration data corrects calibration errors occurring during image capture by a camera module. In some embodiments, to correct re-calibration errors during projection, the camera calibration module 221 distributes projection re-calibration data to the image rectification module 222. From the projection re-calibration data, the image rectification module 222 generates rectification and projection matrices for projecting image frames to a rectification plane wherein the right and left image frames appear as though the frames were captured from the same image plane and are vertically aligned to satisfy an epipolar geometry. In some embodiments, the image rectification module 222 transmits rectification matrices for projection to the remote streaming service 224, wherein a remote streaming client embeds the rectification matrices for projection in video and image files. To correct calibration errors during playback, a display device reads the embedded rectification matrices for projection and uses the embedded matrices for projection to map image pixels to display pixels.

In some embodiments, to correct re-calibration errors during capture, the camera calibration module 221 distributes capture re-calibration data to the master camera control unit 107. Capture re-calibration data may include re-calibration data for each camera module included in the capture array 101. Optionally, the camera calibration module indexes re-calibration data by a unique device identifier for each camera module. Using the unique device identifier, master camera control unit distributes capture re-calibration data associated with the mater camera module to the mono camera controller 111 and capture re-calibration data associated with one or more slave camera modules to the master proxy camera controller 112. Using one or more unique device identifier(s) for one or more slave camera module(s), the master proxy camera controller 112 distributes slave capture re-calibration data associated with the first slave camera module to the first slave proxy camera controller 112a and optionally, slave capture re-calibration data associated with the second slave camera module to the second slave proxy camera controller 112n.

With the master capture re-calibration data, the mono camera controller 111 extracts new calibration parameters for the master from the master capture re-calibration data and updates the master calibration file 601 with the new calibration parameters. The first slave proxy camera controller 112a extracts the first slave new calibration parameters from the first slave capture re-calibration data and updates the first slave calibration file 601a with the new calibration parameters. Optionally, the second slave proxy camera controller 112n extracts the second slave new calibration parameters form the second slave capture re-calibration data and updates the second slave calibration file 601n with the new calibration parameters. To correct calibration errors in the master camera module at capture, the image sensor of the master camera module is calibrated using the master calibration file 601 including the new calibration parameters. To correct calibration errors in the slave camera modules at capture, the image sensor of the first salve camera module is calibrated using the first slave calibration file 601a including the new calibration parameters and optionally the second slave camera module is calibrated using the second slave calibration file 601n including the new calibration parameters.

Digital Camera Device Embodiments

Example digital camera device embodiments include two or more camera modules for capturing different scene perspectives. In some embodiments, the camera modules are connected to an imaging system that processes image frames captured by the camera modules. The camera modules may be controlled by commands input into a user interface included in the imaging system. The control commands may be distributed to controllers included in the camera modules and image frames captured by the camera modules transmitted back to the imaging system through a master slave architecture. In some embodiments, the master slave architecture includes one master camera module that distributes commands to the plurality of slave camera modules through a series of proxy controllers. The master camera module may also include a master streaming service receiving image frames captured by the camera modules and distributing them to the imaging system.

Figure 11:
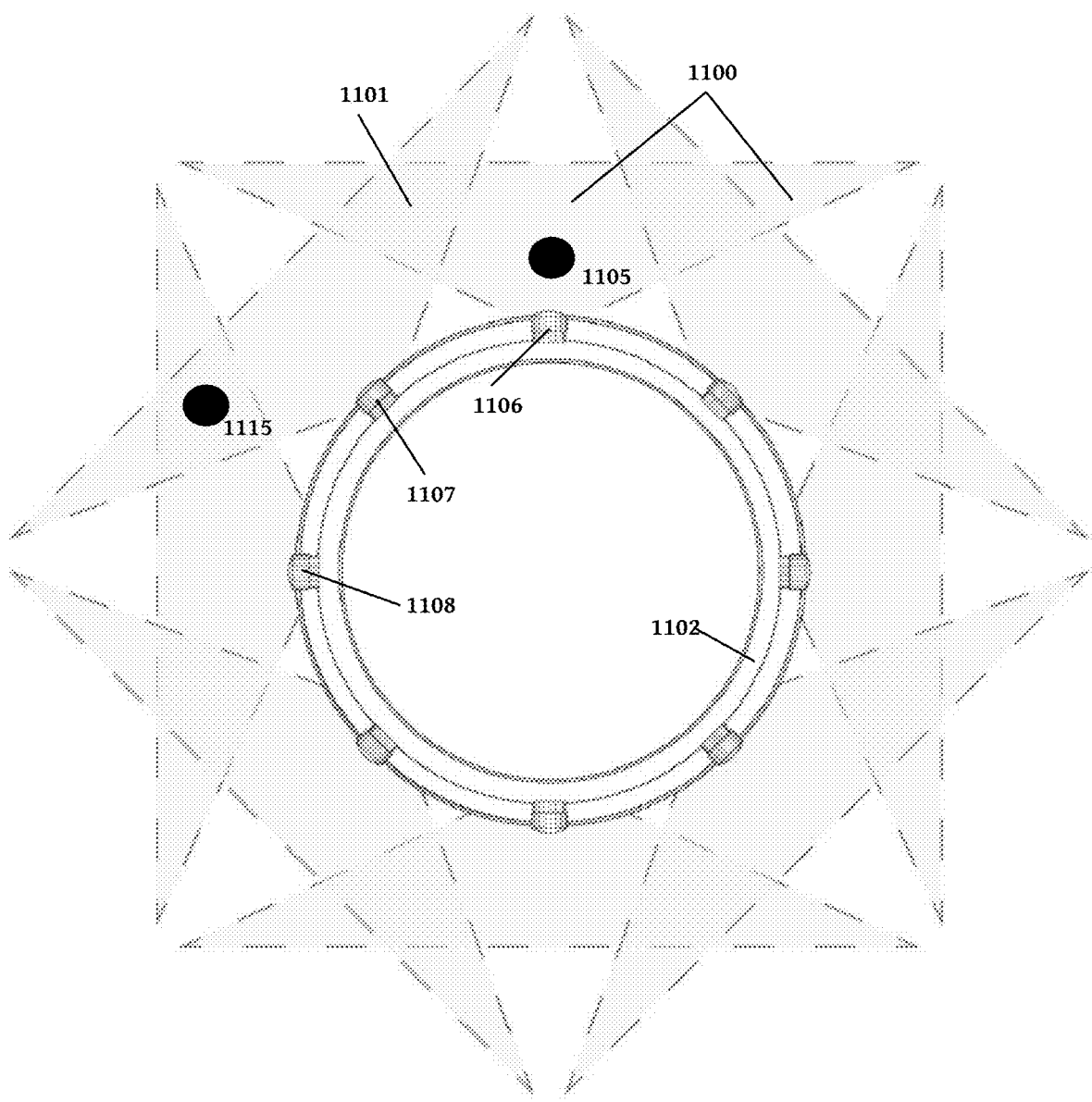
FIG. 11 shows an example digital camera device embodiment having 8 camera modules.
Figure 12:
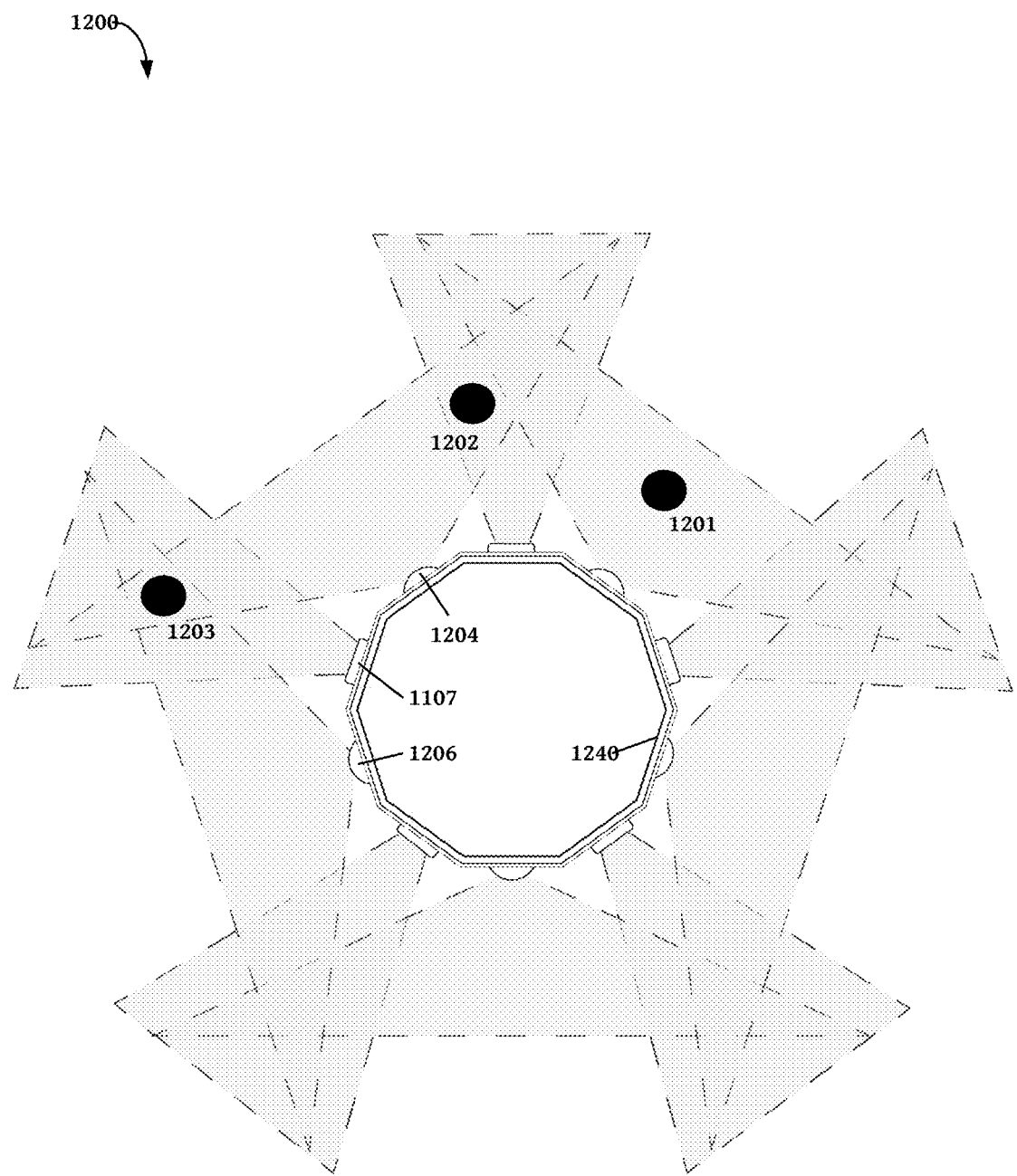
FIG. 12 shows an example digital camera device embodiment having 10 camera modules.

FIGS. 10-12 show example digital camera device embodiments. FIGS. 11-12 display multi-camera devices capturing different perspectives of a 360° scene. FIG. 10 shows and example dual camera device have to axis for adjusting baseline. The 3D camera device shown in FIG. 11 has eight camera modules having standard field of view lenses. Each of the camera modules has a field of view of, e.g., 60° to 110°. By combining the 8 stereoscopic image frames captured by the eight camera modules, scene aspects including depth can be captured with a 360° field of view. The 3D camera device shown in FIG. 12 includes ten camera modules. Five of the camera modules are standard field of view camera modules having standard angle lenses with a field of view between 60° and 110°. The remaining five camera modules are wide field of view camera modules having wide angle lenses having a field of view between 110° and 180°.

During video capture, the eight camera modules included in the digital camera device shown in FIG. 11 can be mounted on a 360° circular rig mount 1102 such the eight camera modules are facing eight different directions. The images and/or videos captured by the lenses and image sensors of the camera modules can be stitched together to generate a 360° field of view with depth. Image data captured by the digital camera device can be projected on a playback device including a gyroscope or other location sensor (e.g., smartphone, VR display, HMD, etc.). To create an interactive display wherein the image data displayed varies according to the orientation of a display device, image data is associated with location data captured by a location sensor. In some embodiments, when the playback devices moves to a different position or orientation (e.g., a HMD operator turns head to the right or walks to the left or a smart phone is angled up or down), the playback device plays back, in real time, a cropped portion of the 360° stitched video or image file based on the user's position and human vision field of view at the current position.

360° video and image files may be 3D video and/or image files generated by the 3D rendering engine 223 using image data captured by one or more camera modules and depth information generated by the VPM 226. In some embodiments, the 3D video and/or image files include one or more 3D models generated by the 3D rendering engine 223 (e.g., a 3D selfie image file including a 3D face model). 3D models included one or more 3D images or video files may also be associated with location data to create an interactive display wherein the orientation of one or more 3D models included in the a 3D video or image file changes based on the orientation of a playback device displaying the file. By associating image data and 3D models with location data captured by a playback device, the digital camera device embodiments shown in FIGS. 11-12 provide a sense of presence in a 360° virtual environment during playback of the stitched images and/or video and the 3D image and or video.

During the playback, depending on the user's position, the playback device may combine image pixels from multiple image channels captured by one or more stereo camera modules to generate 3D videos in real time. To rectify the image channels on the same image plane, the playback device switches between different sets of calibration metadata 300, calibration files, calibration profiles, and/or dynamic calibration data 330 in real time depending on the orientation of the viewer and/or the display device and the image channels used generate the 3D videos during playback. In some embodiments, camera modules are calibrated and or re-calibrated in real time on a frame-by-frame basis using calibration metadata 300, calibration files, calibration profiles, and/or dynamic calibration metadata 330. To enable real time re-calibration during capture, the camera calibration module 221 extracts and processes calibration metadata 300, calibration files, calibration profiles, and/or dynamic calibration metadata 330 from every camera module included in the capture array in real time. To enable real time switching between camera perspectives during playback, a streaming client within the RSS 224 embeds calibration metadata 300, calibration files, calibration profiles, and/or dynamic calibration metadata 330 for all capturing camera modules in video streams. Instructions for real time switching between the sets of calibration metadata 300, calibration files, calibration profiles, and/or dynamic calibration metadata 330 based on the orientation of the playback device are also embedded in the video streams produced by the streaming client.

In some embodiments, at a first time point during the playback of the stitched video files, the playback device is oriented in a direction corresponding to the point 1105 shown in FIG. 11. The playback device determines that at the first time point, only image data from the left and right image channels captured by the master standard field of view camera module 1106 are needed in order to project the binocular stereoscopic effect on the display screen and play back 3D videos to the viewer user. Therefore, to playback 3D video for this viewer orientation, the remote streaming service 224 embeds calibration metadata 300, calibration files, calibration profiles, and/or dynamic calibration metadata 330 for the master standard field of view camera module 1106 into a video file.

At a second time point during the playback of the combined 3D videos, the viewer is oriented in a direction corresponding to the point 1115 as illustrated in FIG. 11. To playback 3D videos at the second time point, the remote streaming service 224 embeds calibration metadata 300, calibration files, calibration profiles, and/or dynamic calibration metadata 330 for the right channel of the 3D video captured by the second slave standard field of view camera module 1108 and calibration metadata 300, calibration files, calibration profiles, and/or dynamic calibration metadata 330 for the left channel of the 3D video captured by the first slave standard field of view camera module 1107 in video files. The playback device then projects the video and/or image file using the embedded data to achieve the binocular stereoscopic effect and playback the 3D video.

In some embodiments, the image channel(s) providing image data and the set of calibration metadata 300, calibration files, calibration profiles, and/or dynamic calibration data 330 used to rectify and project the image data change in response to changes in the orientation of the playback device. For example, to switch between point 1105 and point 1115, the playback device switches the image channels providing image data from the left and right image channels captured by the master standard field of view camera module 1106 to the right image channel of the second slave standard field of view camera module 1108 and the left channel of the first slave standard field of view camera module 1107. To rectify and project images and video frames, the playback device switches from projecting image data using the embedded calibration metadata 300, calibration files, calibration profiles, and/or dynamic calibration metadata 330 corresponding to the master standard field of view camera module 1106 to projecting image data using the embedded calibration metadata 300, calibration files, calibration profiles, and/or dynamic calibration metadata 1108 corresponding to the first slave standard field of view camera module 1107 and the second slave standard field of view camera module 1108. The playback device may project multiple perspectives included in video and image files depending on the orientation of the viewer. Therefore, the playback device must switch between two or more images channels and embedded sets of the calibration metadata 300, calibration files, calibration profiles, and/or dynamic calibration metadata 330 in real time.

Images captured by different types of camera lenses and three or more camera modules may also be used to generate image and video files. FIG. 12 illustrates an example digital camera device incorporating 10 camera modules mounted on a 360° decagon rig mount 1240. Camera modules shown in FIGS. 11-12 are interchangeable and may include structured light capture cameras, stereoscopic capture cameras, photometric capture cameras, modulated light capture cameras, RGB cameras, ultraviolet (UV) cameras, near infrared cameras, and/or infrared cameras. Cameras included in digital camera device embodiments may have telephoto, standard angle, wide angle, and/or ultra wide-angle lenses.

As shown in FIG. 12, at a third time point, a device is oriented toward a direction corresponding to the point 1203. To project image data at the third time point, a playback device needs a video or image file including image data from the left channel of a first slave wide field of view camera module 1204, image data from a right channel of a second slave wide field of view camera module 1206, and image data from the right and left channels of a first slave standard field of view camera module 1107. The video and/or image file will also include embedded calibration metadata 300, calibration files, calibration profiles, and/or dynamic calibration metadata 330 for each image channel. To project a video or image file at the third time point a playback device projects image data using the embedded calibration metadata 300, calibration files, calibration profiles, and/or dynamic calibration metadata 330 for each image channel. In some embodiments, video files and image files including images and video frames from each of the four image channels are stitched and/or layered by RSS 224 to generate 3D video and image files. The 3D rendering engine 223 may also generate one or more 3D models using stitched, layered, or otherwise combined image frames. 3D models generated by the 3D rendering engine may also be associated with location data captured by a playback device to create an interactive 3D model that changes position in response to changes in the orientation of a playback device.

As the orientation of a playback device switches changes direction (e.g., from a direction corresponding to point 1203 at a third point in time, to a direction corresponding to point 1202 at a fourth point in time, and to direction corresponding to point 1201 at a fifth point in time), the playback device with switch image channels and sets of calibration metadata 300, calibration files, calibration profiles, and/or dynamic calibration metadata as needed to project video and image files. In some embodiments, a streaming client within the remote streaming service 224 creates video and image files including image data from multiple image channels by stitching, layering, or otherwise combining image frames from multiple image channels. To streamline projection, a streaming client may also embed calibration metadata 300, calibration files, calibration profiles, and/or dynamic calibration metadata for each of the capturing devices included in the digital camera device. Instructions for switching between calibration metadata 300, calibration files, calibration profiles, and/or dynamic calibration metadata 330 based on the orientation of the playback device may also be embedded by the streaming client. To provide a 360° interactive projection, image data and calibration metadata 300, calibration files, calibration profiles, and/or dynamic calibration metadata from all 10 cameras shown in FIG. 12 may be combined into video and or image files by the streaming client.

The 3D effect at a first (e.g., the first time point 1105) may be less than the 3D effect a second time point 1115, because of the different scene perspectives and fields of view for each camera module. Generally, however, human eyes do not notice the diminishing 3D effect because human eyes themselves have less 3D perception for their peripheral visions. Therefore, humans are used to the areas seen in their peripheral visions generally having less stereoscopic 3D effects. Combining images captured by more than one camera module by layering and/or stitching image data from multiple camera modules, may however, generate stereoscopic images and 3D videos having an enhanced depth effect at many different perspectives. Each camera module captures a different perspective of the scene. Therefore, to improve the depth effect at a viewer's current position, the image channels and corresponding calibration metadata 300, calibration files, calibration profiles, and/or re-calibration metadata 330 of the camera modules best capturing the scene aspect projected to the viewer at a given time point included in image and video files projected on the playback device. The more camera modules set up to capture a scene at different perspectives, the greater the likelihood that at least one camera module will have a perspective corresponding to the perspective of the viewer at her current orientation.

Although FIG. 11 shows eight camera modules and FIG. 12 shows ten camera modules, the routines for switching image channel and calibration metadata 300, calibration files, calibration profiles, and/or dynamic calibration metadata 330 may be applied to an arbitrary number of camera modules or stereoscopic devices. For example, two stereoscopic devices with 180° field of view can be used to create a 360° field of view image and video files. Alternatively, 16 cameras with normal lenses having a standard field of view between 60° and 110° can be used to create a 360° field of view image and video files that provide a realistic perspective from a variety of viewing angles.

Although FIGS. 11-12 shows multiple camera modules for recording a combined video having a field of view of 360°, in some embodiments, the video files having a field of view of 360° can be achieved by a panoramic scan using a single camera module or stereoscopic device. For example, a user can use the stereoscopic device to capture a continuous sequence of stereoscopic 3D images using a panoramic scanning motion. By stitching the continuous sequences of stereoscopic 3D images together, a playback device can recreate an image or video file having a field of view of 360°.

In some embodiments, the 360° stitching process can first re-project each 60° to 110° field of vide stereo pair generated by a standard filed of view camera module into a particular form, such as an equirectangular projection format. An equirectangular projection maps a sphere onto a rectangular image, such that the y coordinate is the latitude, and the x coordinate is the longitude, multiplied by a constant.

A 60° FOV image will only cover a portion of the recording sphere (one sixth of it). When the image is converted to an equirectangular format, the equirectangular form of the 60° FOV image fills a portion of the recording sphere. Once all of the images from each sensor for a particular eye channel (left or right) have been converted to an equirectangular format (or other projection format, as desired), those images in the equirectangular format can be stitched together using image or video stitching algorithms as a 360° recording sphere image for left or right eye channel.

The procedure described in the previous playback section can be used for re-projection. For each pixel in the destination projection, the process can determine the latitude and longitude coordinates of the pixel based on the (x, y) coordinates of the image. The process can then apply the stereoscopic calibration and then camera intrinsic calibration, to map the point of the pixel onto the source standard or wide angle image. Thus, the process can re-project the original standard or wide angle image into a different format, such as an equirectangular projection. This process applies the calibration metadata 300, calibration files, calibration profiles, and/or dynamic calibration metadata 330, and converts the images into a standard projection. After the stitching process, the calibration metadata 300, calibration files, calibration profiles, and/or dynamic calibration metadata 330 is no longer needed for stitching. The 360° stitching can then be done on those standard projected images. Even though each original camera module had its own unique calibration settings, by re-projecting using the calibration metadata and then stitching, the images can now be stitched together without further calibration.

In some embodiments, the baseline of the stereo camera modules is adjustable by varying the interocular distance between two camera modules. Changing the baseline varies the amount of depth in an image with higher baseline settings corresponding with the appearance of more depth between background and foreground objects and lower baseline settings corresponding with the appearance of less depth between background and foreground objects. FIG. 10 illustrates a digital camera device embodiment having two camera modules wherein each camera module has a unique axis for adjusting the baseline. Moving either camera module along a baseline axis will change the interocular distance between the two camera modules.

As shown in FIG. 10, one the digital camera device embodiment may include a master camera module 102 and a first slave camera module 102a. Light 1000 may enter the digital camera device through an opening having a beam splitter. In one example, the beam splitter is a fifty percent mirror that allows a first half 1004 of the light to pass to the first slave camera module 102a and reflects a second half 1005 of the light 1000 toward a mirror 1003. The first half 1004 of the light passes through a first slave lens 103a to a first slave image sensor 104a and a first slave ISP 108a converts light captured by the first slave image sensor into image data. The second half 1005 of the light is reflected by the mirror toward a master camera module 102a. The reflected light passes through the master lens 103 to a master image sensor 104 and a master ISP 108 coverts light captured by the first slave image sensor into image data.

In the embodiment shown in FIG. 10, the master camera module 102 is mounted above the first slave camera module 102a. The alignment allows for each camera module to have its own baseline axis for adjusting the interocular distance of the digital camera device. In the embodiment shown in FIG. 10, the master camera module 102 moves along a first baseline axis B1 and the first slave camera module moves along a second baseline axis B2. Three different positions for the master camera module 102 and the first slave camera module 102a are shown in the figure. The current position B1A for the master camera module is shown on the far left side of the first baseline axis B1 with two alternate positions indicated by dashed ellipses indicating the position of the master camera lens 103 at each alternate position. Specifically, the second position B1B for a master camera module is located toward the middle of the first baseline axis B1 and a third position B1C for a master camera module is located on the far right side of the first baseline axis B1.

The current position B2C for a first slave camera module is shown on the right side of the second baseline axis B2. Two alternate positions for a first slave camera module 102a are represented by dashed ellipses indicating the position of a first slave camera lens 103a at each alternate position. Specifically, the second position of B2B for a first slave camera module is located toward the middle of the second baseline axis B2 and a third position B2A for a first slave camera module is located on the left side of the second baseline axis B2. In some embodiments, the camera control communication and power circuit 1002 controls the position of the master camera module 102 and the first slave camera module 102a. The camera control communication and power circuit 1002 may include a system control unit 120, a master camera control unit 110, and/or a first slave camera control unit 107a.

In some embodiments, the camera control communication and power circuit 1002 controls movement of the master camera module 102 by sending a control message to the master camera control unit 110 over a wired or wireless connection and sending electrical power to a motor controlling the position of the master camera module on a first baseline axis B1. To control the movement of the first slave camera module 102a, the camera control communication and power circuit 1002 sends a control message to the first slave camera control unit 107a through a wired or wireless connection and sends electrical power to a motor controlling the position of the first slave camera module 102a along a second baseline axis B2. In other embodiments, the camera control communication and power unit 1002 sends control messages for controlling the first slave camera module 102a to the master camera control unit 110. Control message for the first slave camera module are then distributed to the first slave camera control unit 107a through a master proxy camera controller as illustrated in FIG. 1. In the example shown in FIG. 10, the baseline setting is calculated by obtaining the difference between the master camera module focal center 1006 and the first slave camera module focal center 1007.

We claim:

1. A digital camera device for capturing 3D content, the digital camera apparatus having variable camera settings and comprising:
a plurality of camera modules configured to capture one or more channels of stereoscopic video, the plurality of camera modules comprising a master camera module and a plurality of slave camera modules, the master camera module comprising:
a processor;
a memory;
a sensor;
a lens;
a master streaming service; and
a master camera control unit having a dual camera controller, a master mono camera controller and a master proxy camera controller, the master mono camera controller controlling operation of the master camera module, the master proxy camera controller interfacing with one or more slave proxy camera controllers to distribute control commands and dynamic calibration metadata to the plurality of slave camera modules,
an imaging system communicatively coupled to the master camera control unit and interfacing with the plurality of camera modules through a master streaming service to receive two or more channels of stereoscopic video, the imaging system comprising:
a camera calibration module instructing one or more processors to generate dynamic calibration metadata comprising one or more sets of calibration parameters for one or more camera modules, the dynamic calibration metadata including an identifier associating each set of calibration parameters with a particular camera module, the camera calibration module distributing the dynamic calibration metadata to the master camera control unit; and
the master camera control unit calibrating the plurality of camera modules by transmitting dynamic calibration metadata having the master camera module id to the master mono camera controller and dynamic calibration metadata having a slave camera module id to a slave camera within the plurality of slave camera modules identified by the slave camera module id.

2. The digital camera device of claim 1, wherein the dynamic calibration metadata further comprises real time calibration metadata describing calibration parameters for non-integer camera settings.

3. The digital camera device of claim 1, wherein the dynamic calibration metadata further comprises real time calibration metadata describing calibration parameters for uncalibrated camera settings.

4. The digital camera device of claim 1, wherein the dynamic calibration metadata further comprises re-calibration data including pixel position coordinates correcting calibration errors when applied to image pixel data during the process of mapping image pixels to display pixels.

5. The digital camera device of claim 1, wherein the dynamic calibration metadata further comprises re-calibration data including re-calibration parameters describing a stereoscopic calibration position without from calibration errors.

6. The digital camera device of claim 1, further comprising a vision processing module included in the imaging system, the vision processing module receiving one or more stereoscopic image frames from the plurality of camera modules and calculating depth information from the one or more stereoscopic image frames.

7. The digital camera device of claim 6, further comprising a 3D rendering engine included in the imaging system, the 3D rendering engine combining RGB color data with depth information generated by the vision processing module to create 3D content.

8. The digital camera device of claim 7, wherein the 3D content includes one or more 3D models of objects appearing in image data captured by the plurality of camera devices.

9. The digital camera device of claim 1, further comprising a remote streaming service included in the imaging system, the remote streaming service including a remote streaming client and a remote streaming server, the remote streaming client generating 3D image and video streams from 3D content created by the 3D rendering engine, the remote streaming server distributing 3D image and video streams to a plurality of client devices over a content steaming network.

10. The digital camera device of claim 1, further comprising a special sensor selected from the group comprising inertial measurement units, gyroscopes, accelerometers, other motion sensors, altimeters, and magnetometers.

11. The digital camera device of claim 1, further comprising an acoustic sensor selected from the group comprising microphones and transducers.

12. The digital camera device of claim 1, wherein the sensor is an optical sensor selected from the group comprising structured light capture cameras, stereoscopic capture cameras, photometric capture cameras, modulated light capture cameras, visible light sensors (e.g., RGB cameras), ultraviolet (UV) cameras, near infrared cameras, infrared cameras, ambient light sensors, time of flight (TOF) sensors, and optical emitters.

13. The digital camera device of claim 1, further comprising a touch sensor selected from the group comprising force sensors, capacitive touch sensors, resistive touch sensors, and thermal touch sensors.

14. The digital camera device of claim 1, further comprising a location sensor selected from the group comprising a GPS system, beacon, trilateration system, and triangulation system.

15. The digital camera device of claim 1, further comprising an emissions based sensor selected from the group comprising a lidar system, dot field projector, vertical cavity surface-emitting laser sensor and CMOS laser sensor.

16. The digital camera device of claim 1, wherein the plurality of camera modules comprises eight standard angle lens camera modules having a field of view between 60° and 110°, the eight standard angle lens camera modules mounted to a 360° circular rig.

17. The digital camera device of claim 1, wherein the plurality of camera modules comprises ten camera modules with five camera modules having a standard field of view between 60° and 110° and five camera modules having a wide field of view greater than 110°.

18. The digital camera device of claim 17, wherein the ten camera modules are mounted to a 360° decagon rig.

19. A digital camera apparatus for capturing 3D content, the digital camera apparatus having variable camera settings and comprising:
- a plurality of camera modules, the plurality of camera modules comprising a master camera module and a plurality of slave camera modules, the master camera module comprising:
  - a processor;
  - a memory;
  - a sensor;
  - a lens; and
  - a master camera control unit communicatively coupled to a mono camera controller included in each camera module, the plurality of camera modules configured to capture one or more channels of stereoscopic video,
- an imaging system communicatively coupled to the master camera control unit and interfacing with the plurality of camera modules to receive two or more channels of stereoscopic video, the imaging system comprising one or more processors configured to re-calibrate the plurality of camera modules using re-calibration data produced from one or more pairs of stereoscopic image frames extracted from the two or more channels of stereoscopic video, the re-calibration data distributed to the master camera control unit and including an identifier associating each set of re-calibration data generated by the master imaging system with every camera module capturing a stereoscopic image frame used to generate the set of recalibration data,
- the master camera control unit using the identifier to distribute re-calibration data to the camera module capturing a stereo image frame used to generate the re-calibration data,
- a mono camera controller included a camera module associated with the identifier receiving the re-calibration data and modifying one or more calibration parameters included in a calibration file using the re-calibration data to correct a calibration error.

20. A digital camera apparatus for capturing 3D content, the digital camera apparatus having variable camera settings and comprising:
- a plurality of camera modules configured to capture one or more channels of stereoscopic video, the plurality of camera modules comprising a master camera module and a plurality of slave camera modules, the master camera module comprising:
  - a processor;
  - a memory;
  - a sensor;
  - a lens; and
  - a master camera control unit interfacing with a master mono camera controller and a proxy camera controller to distribute instructions for controlling each camera module;
- an imaging system communicatively coupled a system control unit interfacing with the master camera control unit, the imaging system comprising a user interface and a camera calibration system,
- the user interface receiving one or more commands for modifying one or more camera settings of the plurality of camera modules,
- the camera calibration system instructing a processor to generate one or more modified camera settings from the one or more commands received by the user interface, for modified camera settings not associated with calibration metadata included in a static calibration file, the camera calibration system further instructing a processor to extract one or more sets of calibration metadata associated with camera settings proximate to the modified camera settings and generate one or more sets of real time calibration metadata describing how to calibrate the plurality of camera modules at the modified camera settings, the camera calibration system providing the optimal calibration metadata and the modified camera settings to the master camera control unit, and
- the master camera control unit instructing system control unit to adjust the position of each camera module in the plurality of camera modules to configure the digital camera apparatus to capture video channels with the modified camera settings, the master camera control unit further instructing the mono camera controller for every camera module to adjust the calibration of the camera, module as described by the real time calibration metadata.

* * * * *